(12) United States Patent
Osawa et al.

(10) Patent No.: US 8,284,684 B2
(45) Date of Patent: Oct. 9, 2012

(54) COMMUNICATION DEVICE, COMMUNICATION SYSTEM, COMMUNICATION METHOD, AND COMMUNICATION CIRCUIT

(75) Inventors: Shohei Osawa, Tenri (JP); Hitoshi Naoe, Nara (JP); Fumihiro Fukae, Sakurai (JP); Koji Sakai, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 976 days.

(21) Appl. No.: 11/883,253

(22) PCT Filed: Jan. 25, 2006

(86) PCT No.: PCT/JP2006/301153
§ 371 (c)(1),
(2), (4) Date: Apr. 23, 2008

(87) PCT Pub. No.: WO2006/080357
PCT Pub. Date: Aug. 3, 2006

(65) Prior Publication Data
US 2008/0279560 A1    Nov. 13, 2008

(30) Foreign Application Priority Data

| | | |
|---|---|---|
| Jan. 28, 2005 | (JP) | 2005-022209 |
| Jan. 31, 2005 | (JP) | 2005-023901 |
| Jan. 31, 2005 | (JP) | 2005-023929 |
| Apr. 13, 2005 | (JP) | 2005-116096 |
| May 25, 2005 | (JP) | 2005-152910 |
| Jun. 30, 2005 | (JP) | 2005-192903 |
| Aug. 5, 2005 | (WO) | PCT/JP2005/014446 |
| Sep. 16, 2005 | (JP) | 2005-271230 |

(51) Int. Cl.
*H04J 3/16* (2006.01)
*G06F 3/033* (2006.01)
*H04B 7/00* (2006.01)
*H04B 17/00* (2006.01)

(52) U.S. Cl. ....... 370/252; 370/469; 345/158; 455/41.2; 398/25

(58) Field of Classification Search .............. 370/225, 370/252, 310, 347, 446, 469; 345/156, 158; 455/7, 41, 41.1, 73, 91, 151.2, 423, 550.1; 398/1, 25, 118, 128, 130, 135, 140, 141, 398/142, 182, 202
See application file for complete search history.

(56) References Cited

U.S. PATENT DOCUMENTS 4,957,348 A    9/1990    May
(Continued)

FOREIGN PATENT DOCUMENTS
CN    1167380 A    12/1997
(Continued)

OTHER PUBLICATIONS

Timothy Williams, Infrared Data Association Serial Infrared Link Access Protocol (IrLAP), Jun. 16, 1996, pp. 1-119.*

(Continued)

*Primary Examiner* — Michael Thier
*Assistant Examiner* — Prince A Mensah
(74) *Attorney, Agent, or Firm* — Birch, Stewart, Kolasch & Birch, LLP

(57) ABSTRACT

A transmitter (1) which transmits a predetermined amount of transfer data using an infrared ray includes: a controller (13) for transmitting an SNRM command to the other station without transmitting a station-search command (XID) for searching the other station, the SNRM command including parameters such as maximum transferable speed and maximum receivable data length of the transmitter (1); and a transmission section (14). Consequently, it is possible to shorten a time necessary for a connection between the transmitter and the receiver. This allows shortening a time from the start of communication to the end of the communication in transmitting information data.

14 Claims, 50 Drawing Sheets

U.S. PATENT DOCUMENTS

| | | | |
|---|---|---|---|
| 5,001,471 | A | 3/1991 | Snowden et al. |
| 5,448,561 | A | 9/1995 | Kaiser et al. |
| 5,450,412 | A | 9/1995 | Takebayashi et al. |
| 5,509,121 | A | 4/1996 | Nakata et al. |
| 5,515,508 | A | 5/1996 | Pettus et al. |
| 5,557,634 | A | 9/1996 | Balasubramanian et al. |
| 5,563,943 | A | 10/1996 | Takebayashi et al. |
| 5,585,952 | A * | 12/1996 | Imai et al. ............... 398/103 |
| 5,617,083 | A | 4/1997 | Schwendeman et al. |
| 5,638,373 | A | 6/1997 | Takebayashi et al. |
| 5,706,110 | A | 1/1998 | Nykanen |
| 5,764,643 | A | 6/1998 | Takebayashi et al. |
| 5,923,443 | A * | 7/1999 | Nykanen et al. .......... 358/442 |
| 6,006,294 | A | 12/1999 | Kurihara |
| 6,034,962 | A | 3/2000 | Ohno et al. |
| 6,088,730 | A * | 7/2000 | Kato et al. ............... 709/227 |
| 6,154,298 | A | 11/2000 | Tamagawa et al. |
| 6,178,181 | B1 | 1/2001 | Glitho |
| 6,188,431 | B1 | 2/2001 | Oie |
| 6,211,797 | B1 * | 4/2001 | Kimura ................. 398/118 |
| 6,256,296 | B1 | 7/2001 | Ruziak et al. |
| 6,297,795 | B1 * | 10/2001 | Kato et al. ............... 345/684 |
| 6,297,802 | B1 * | 10/2001 | Fujioka ................. 345/156 |
| 6,336,142 | B1 * | 1/2002 | Kato et al. ............... 709/227 |
| 6,347,339 | B1 | 2/2002 | Morris et al. |
| 6,411,813 | B1 | 6/2002 | Sano |
| 6,446,127 | B1 * | 9/2002 | Schuster et al. .......... 709/227 |
| 6,499,068 | B1 | 12/2002 | Uchikawa |
| 6,519,644 | B1 * | 2/2003 | Lindquist et al. ......... 709/227 |
| 6,629,373 | B1 | 10/2003 | Donaldson |
| 6,675,203 | B1 | 1/2004 | Herrod et al. |
| 6,728,774 | B1 * | 4/2004 | Nykanen ................. 709/230 |
| 6,735,245 | B1 | 5/2004 | Palm et al. |
| 6,754,451 | B1 * | 6/2004 | Nakamura ............... 398/135 |
| 6,812,881 | B1 | 11/2004 | Mullaly et al. |
| 6,839,564 | B2 | 1/2005 | Sutinen et al. |
| 6,842,433 | B2 | 1/2005 | West et al. |
| 6,865,687 | B1 | 3/2005 | Ichimi |
| 6,907,013 | B1 | 6/2005 | Ruziak |
| 6,944,483 | B1 | 9/2005 | Motohashi |
| 7,069,059 | B2 | 6/2006 | Osawa et al. |
| 7,363,534 | B1 | 4/2008 | Krishnamurthy et al. |
| 7,366,532 | B2 | 4/2008 | Khawand et al. |
| 7,403,543 | B2 | 7/2008 | Lee et al. |
| 7,411,974 | B2 | 8/2008 | Attar et al. |
| 7,461,318 | B2 | 12/2008 | Fukae et al. |
| 7,729,290 | B2 | 6/2010 | Saleh et al. |
| 7,809,358 | B2 * | 10/2010 | Hashimoto .............. 455/412.2 |
| 2001/0007137 | A1 | 7/2001 | Suumaki et al. |
| 2001/0032326 | A1 | 10/2001 | Haneda |
| 2001/0044914 | A1 | 11/2001 | Nakano et al. |
| 2002/0037711 | A1 | 3/2002 | Mizutani |
| 2002/0041605 | A1 | 4/2002 | Benussi et al. |
| 2002/0065065 | A1 | 5/2002 | Lunsford et al. |
| 2002/0128039 | A1 * | 9/2002 | Finn .................... 455/556 |
| 2002/0196782 | A1 | 12/2002 | Furukawa et al. |
| 2002/0196812 | A1 | 12/2002 | Yamaguchi et al. |
| 2003/0107651 | A1 | 6/2003 | Chen et al. |
| 2003/0114107 | A1 * | 6/2003 | Aoyagi ................... 455/41 |
| 2003/0169744 | A1 | 9/2003 | Elzur |
| 2004/0042487 | A1 | 3/2004 | Ossman |
| 2004/0054796 | A1 | 3/2004 | Kikuchi et al. |
| 2004/0080537 | A1 | 4/2004 | Adler |
| 2004/0081436 | A1 | 4/2004 | Tada et al. |
| 2004/0111535 | A1 | 6/2004 | Boucher et al. |
| 2004/0135671 | A1 * | 7/2004 | Khoshbin et al. ........... 340/7.53 |
| 2004/0170134 | A1 * | 9/2004 | Furuyama et al. .......... 370/310 |
| 2004/0186928 | A1 | 9/2004 | Fukunaga et al. |
| 2004/0218209 | A1 | 11/2004 | Hamaguchi et al. |
| 2004/0228332 | A1 | 11/2004 | Seguin et al. |
| 2005/0014468 | A1 | 1/2005 | Salokannel et al. |
| 2005/0025188 | A1 | 2/2005 | Numakura et al. |
| 2005/0071733 | A1 * | 3/2005 | Fukae et al. ............... 714/776 |
| 2005/0083885 | A1 | 4/2005 | Ikeda et al. |
| 2005/0091412 | A1 | 4/2005 | Pinkerton et al. |
| 2005/0097191 | A1 | 5/2005 | Yamaki et al. |
| 2005/0138226 | A1 | 6/2005 | Tateyama et al. |
| 2005/0186988 | A1 | 8/2005 | Lim et al. |
| 2005/0254456 | A1 * | 11/2005 | Sakai et al. .............. 370/328 |
| 2005/0271022 | A1 * | 12/2005 | Osawa et al. ............. 370/338 |
| 2006/0250973 | A1 | 11/2006 | Trott |
| 2006/0291502 | A1 | 12/2006 | Kalofonos |
| 2007/0057762 | A1 | 3/2007 | Han et al. |
| 2007/0064733 | A1 * | 3/2007 | Osawa et al. ............. 370/468 |
| 2008/0008165 | A1 | 1/2008 | Ikeda et al. |
| 2008/0126554 | A1 | 5/2008 | Sakai et al. |
| 2008/0145058 | A1 | 6/2008 | Fukae et al. |
| 2008/0189422 | A1 | 8/2008 | Naoe et al. |
| 2008/0279560 | A1 | 11/2008 | Osawa et al. |
| 2008/0279562 | A1 * | 11/2008 | Naoe et al. ............. 398/140 |
| 2008/0291941 | A1 * | 11/2008 | Sakai et al. ............. 370/469 |
| 2008/0313518 | A1 | 12/2008 | Naoe et al. |
| 2009/0190502 | A1 | 7/2009 | Mameda et al. |
| 2009/0262661 | A1 | 10/2009 | Ueda et al. |

FOREIGN PATENT DOCUMENTS

| | | | |
|---|---|---|---|
| CN | 1394029 | A | 1/2003 |
| EP | 0 584 464 | A1 | 3/1994 |
| EP | 0 886 410 | A2 | 12/1998 |
| EP | 1 359 724 | A1 | 11/2003 |
| EP | 1 531 646 | A | 5/2005 |
| EP | 1 657 924 | A1 | 5/2006 |
| EP | 1 780 984 | A1 | 5/2007 |
| JP | 58-56200 | A | 4/1983 |
| JP | 62-029238 | A | 2/1987 |
| JP | 10-98435 | A | 4/1989 |
| JP | 1-164140 | A | 6/1989 |
| JP | 2-16847 | A | 1/1990 |
| JP | 02-041050 | A | 2/1990 |
| JP | 2-281830 | A | 11/1990 |
| JP | 03-070059 | A | 3/1991 |
| JP | 03-098338 | A | 4/1991 |
| JP | 3-139935 | A | 6/1991 |
| JP | 4-839 | A | 1/1992 |
| JP | 4-269031 | A | 9/1992 |
| JP | 4-271567 | A | 9/1992 |
| JP | 4-291556 | A | 10/1992 |
| JP | 05-030150 | A | 2/1993 |
| JP | 5-175985 | A | 7/1993 |
| JP | 05-260124 | A | 8/1993 |
| JP | 05-260124 | A | 10/1993 |
| JP | 6-70383 | A | 3/1994 |
| JP | 6-152687 | A | 5/1994 |
| JP | 6-152691 | A | 5/1994 |
| JP | 07-15485 | A | 1/1995 |
| JP | 7-15485 | A | 1/1995 |
| JP | 07-046292 | A | 2/1995 |
| JP | 7-46292 | A | 2/1995 |
| JP | 8-191271 | A | 7/1996 |
| JP | 8-195785 | A | 7/1996 |
| JP | 8314831 | A | 11/1996 |
| JP | 9-135210 | A | 5/1997 |
| JP | 9-154176 | A | 6/1997 |
| JP | 9-224069 | A | 8/1997 |
| JP | 9-284696 | A | 10/1997 |
| JP | 9-312674 | A | 12/1997 |
| JP | 10-98435 | A | 4/1998 |
| JP | 10-107737 | A | 4/1998 |
| JP | 10-126758 | A | 5/1998 |
| JP | 10-145452 | A | 5/1998 |
| JP | 10-290348 | A | 10/1998 |
| JP | 10-308791 | A | 11/1998 |
| JP | 11-4306 | A | 1/1999 |
| JP | 11-154908 | A | 6/1999 |
| JP | 11317724 | A | 11/1999 |
| JP | 2000-010745 | | 1/2000 |
| JP | 2000-31993 | A | 1/2000 |
| JP | 2000-32000 | A | 1/2000 |
| JP | 2000-69403 | A | 3/2000 |
| JP | 2000069403 | A | 3/2000 |
| JP | 2000-101605 | A | 4/2000 |
| JP | 2000-196622 | A | 7/2000 |
| JP | 2000-196654 | A | 7/2000 |
| JP | 2000-332688 | A | 11/2000 |
| JP | 2000-349782 | A | 12/2000 |
| JP | 2001-60912 | A | 3/2001 |
| JP | 2001-69297 | A | 3/2001 |

| | | |
|---|---|---|
| JP | 2001-083948 A | 3/2001 |
| JP | 2001-83948 A | 3/2001 |
| JP | 2001-145164 A | 5/2001 |
| JP | 2001-202281 A | 7/2001 |
| JP | 2001-308955 A | 11/2001 |
| JP | 2002-509378 A | 3/2002 |
| JP | 2002-135260 A | 5/2002 |
| JP | 2002-158730 A | 5/2002 |
| JP | 2002-223466 A | 8/2002 |
| JP | 2002-232507 A | 8/2002 |
| JP | 2003-69610 A | 3/2003 |
| JP | 2003-508728 A | 3/2003 |
| JP | 2003-101554 A | 4/2003 |
| JP | 2003-110579 A | 4/2003 |
| JP | 2003-218936 A | 7/2003 |
| JP | 2003-258880 A | 9/2003 |
| JP | 2003-263403 A | 9/2003 |
| JP | 2004-41375 A | 2/2004 |
| JP | 2004-64533 A | 2/2004 |
| JP | 2004-94555 A | 3/2004 |
| JP | 2004-104441 A | 4/2004 |
| JP | 2004177586 A | 6/2004 |
| JP | 2004-236108 A | 8/2004 |
| JP | 2004-343246 A | 12/2004 |
| JP | 2004-64533 A | 9/2005 |
| JP | 2005-354652 A | 12/2005 |
| JP | 2006-211425 | 8/2006 |
| JP | 2006-211425 A | 8/2006 |
| WO | 99/31814 A1 | 6/1999 |
| WO | WO-0223885 A1 | 3/2002 |
| WO | WO 03/003767 A1 | 1/2003 |
| WO | WO-2006080357 | 8/2006 |

OTHER PUBLICATIONS

Vasileios Vitsas, Optimization of IrDA IrLAP Link Optimization, Sep. 2003, IEEE, vol. 2, pp. 926-938.*

Hitoshi Naoe et al., "Standardization of IrSimple, a High-Speed Infrared Communications Protocol", Sharp Technical Journal, vol. 95, pp. 63-68 Feb. 2007 URL: <http://www.sharp.co.jp/corporate/rd/03/pdf/95_13.pdf>.

Hitoshi Naoe et al., "IrDA Next Generation High-Speed Infrared Communications Standards "IrSimple"", Technical Report of IEICE, The Institute of Image Electronics Engineers of Japan, vol. 35, pp. 598-602, 2006.

Mitsuji Matsumoto et al., "An Evaluation of the Optical Wireless System in the Mobile Environment in the Room", Technical Report of IEICE, The Institute of Electronics, Information and Communication Engineers, pp. 1-7, Jan. 28, 2000.

Gontaro Kitazumi et al., "A Proposal of next generation proximity infrared communication—Optimization of IrDA protocol by IrSimple—" Institute of Image Electronics Engineers of Japan, IIEEJ Technical Report, 2 pages.

Hitoshi Naoe et al., "Standardization Proposal of High Efficiency Protocols by using Infrared Data Association", B-10-54, Conference Presentation, Institute of Electronics Information and Communication Engineers (IEICE), p. 344, Technical Reports published Sep. 7, 2005; with PowerPoint Presentation, Mar. 2005.

Hitoshi Naoe et al., "High Efficiency Protocols (IrSimple) Using Infrared Communication—IrSimple Profile and Protocols at Infrared Data Association", B-15-14, Conference Presentation, Institute of Electronics, Information and Communication Engineers (IEICE), 1 page. Technical Reports published Sep. 7, 2005; with PowerPoint Presentation, Mar. 2005.

"Infrared Data Association Serial Infrared Physical Layer Specification", Version 1.4, pp. i-iv & 1-60, May 30, 2001.

Timothy Willliams et al., "Infrared Data Association Serial Infrared Link Access Protocol (IrLAP)", Version 1.1, pp. 1-116, Jun. 16, 1996.

Andy Seaborne et al., "Infrared Data Association Link Management Protocol (IrLAP)", Version 1.1, pp. 1-98, Jan. 23, 1996.

Stuart Williams et al., "Infrared Data Association 'Tiny TP': A Flow-Control Mechanism for use with IrLMP" Version 1.1, pp. 1-17, Oct. 20th, 1996.

Pat Megowan et al., "Infrared Data Association® (IrDA®) Object Exchange Protocol OBEX™", Version 1.3, pp. 1-95, Jan. 3, 2003.

Hitoshi Naoe et al., "Infrared Data Association IrDA Serial Infrared Sequence Management Protocol for IrSimple", Version 1.00, pp. 1-64, Oct. 14, 2005.

Hitoshi Naoe et al., "Infrared Data Association IrDA Serial Infrared Link Management Protocol Specification for IrSimple Addition-Errata to IrLMP Version 1.1", Version 1.00, pp. 1-27, Oct. 14, 2005.

Hitoshi Naoe et al., Infrared Data Association IrSimple (Infrared Simple) Profile, Version 1.00, pp. 1-30, Oct. 14, 2005.

Hitoshi Naoe et al., "Infrared Data Association IrDA Serial Infrared Link Access Protocol Specification for IrSimple Addition-Errata to IrLAP Version 1.1", Version 1.00, pp. 1-65, Oct. 14, 2005.

Kuniko Yamaguchi et al., "Implementation of IrSimple for Mobile Phones", B-15-15, Paper for Institute of Electronics, Information and Communication Engineers (IEICE), Communication Society Conference, 2005 p. 618.

Hitoshi Naoe et al., "IrSimple Profile and Protocols at Infrared Data Association", B-15-14, IECE Society Conference Abstracts, p. 617, 2005.

Glade Diviney et al., "Infrared Data Association IrLAP Fast Connect (Application Note)" Version 1.0, Nov. 27, 2002, pp. 1-17.

H. Naoe et al., IrDA Next Generation High-Speed Infrared Communications Standards 'IrSimple', The Institute of Image Electronics Engineers of Japan, vol. 35, pp. 598-602 (2006).

H. Naoe et al., "Standardization of IrSimple, a High-Speed Infrared Communications Protocol", Sharp Technical Journal, 2007.02, vol. 95, pp. 63-68, URL; http://www.sharp.co.jp.corporate/rd/30/pdf/95_13.pdf.

Naoe et al., "Sekigaisan Tsushin o Mochiita Kokoritsu Protocol no Hyojunka Teian," The Institute of Electronics, Information and Communication Engineers, Nen Sogo Taikai Koen Ronbunshu, 2005, B-10-54.

Matsumoto et al., "Mobile Kankyo ni okeru Tsushin Media no Hyoka," National Institute of Advanced Industrial Science and Technology, OFS99-54 to 66, 2000, pp. 1-7.

"A Proposal of next generation proximity infrared communication," Conference Presentations, Optimization of IrDA protocol by IrSImple, The Institute of Image Electronics Engineers of Japan.

"Standardization Proposal of High Efficiency Protocols by using Infrared Data Association," Conference Presentations, IEICE Communications Society Conference, 2005, Technical Reports published Sep. 7, 2005, PowerPoint documents enclosed.

"High Efficiency Protocols (IrSimple) Using Infrared Communication," Conference Presentations, IEICE Communications Society Conference, 2005, Technical Reports published on Sep. 7, 2005, PowerPoint documents enclosed.

Infrared Data Association Serial Infrared Physical Layer Specification, Version 1.4, May 30, 2001.

Infrared Data Association Serial Infrared Link Access Protocol (IrLAP), Version 1.1, Jun. 16, 1996.

Infrared Data Association Link Management Protocol, Version 1.1, Jan. 23, 1996.

Infrared Data Association 'Tiny TP': A Flow-Control Mechanism for use with IrLMP, Version 1.1, Oct. 20, 1996.

Infrared Data Association®(IrDA®) Object Exchange Protocol OBEX™, Version 1.3, Jan. 3, 2003.

IrDA Serial Infrared Sequence Management Protocol for IrSimple, Version 1.00, Oct. 14, 2005.

IrDA Serial Infrared Link Management Protocol Specification for IrSimple Addition Errata to IrLMP, Version 1.1, Version 1.00, Oct. 14, 2005.

IrSImple (Infrared Simple) Profile, Version 1.00, Oct. 14, 2005.

IrDA Serial Infrared Link Access Protocol Specification for IrSimple Addition Errata to IrLAP, Version 1.1, Version 1.00, Oct. 14, 2005.

Office Action mailed Jan. 19, 2012 for U.S. Appl. No. 11/883,234.

European Search Report mailed Apr. 27, 2012.

European Search Report mailed Apr. 5, 2012.

Gontaro Kitazumi et al., "A Proposal of next generation proximity infrared communication—Optimization of IrDA protocol by IrSimple" Institute of Image Electronics Engineers of Japan, IIEEJ Technical Report, 2 pages—Nov. 18, 2005.

* cited by examiner

FIG. 5

SNRM COMMAND

| BOF | Address | Control | Source Address | Destination Device Address | Connect Address | Negotiation Parameters |
|---|---|---|---|---|---|---|
| 0xC0 | 0xFF | SNRM | 0xNNNNNNNN | 0xFFFFFFFF | 0xXX | |

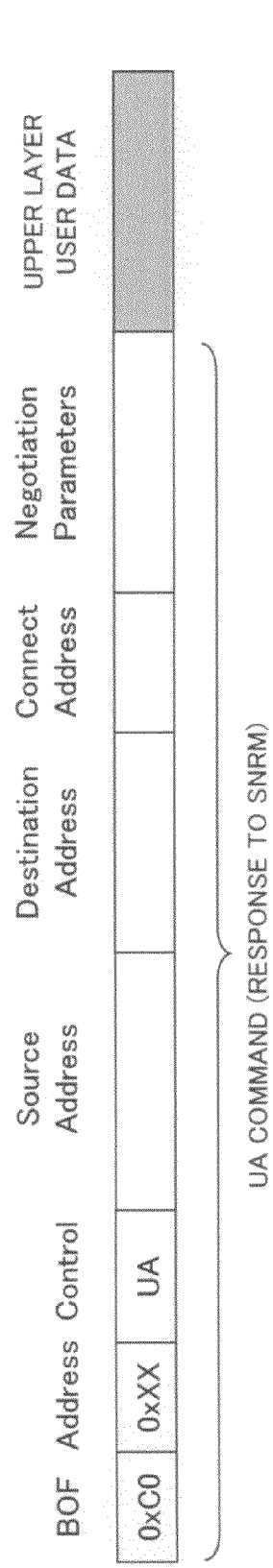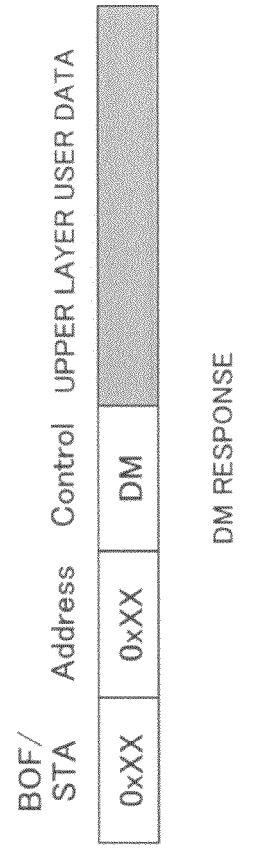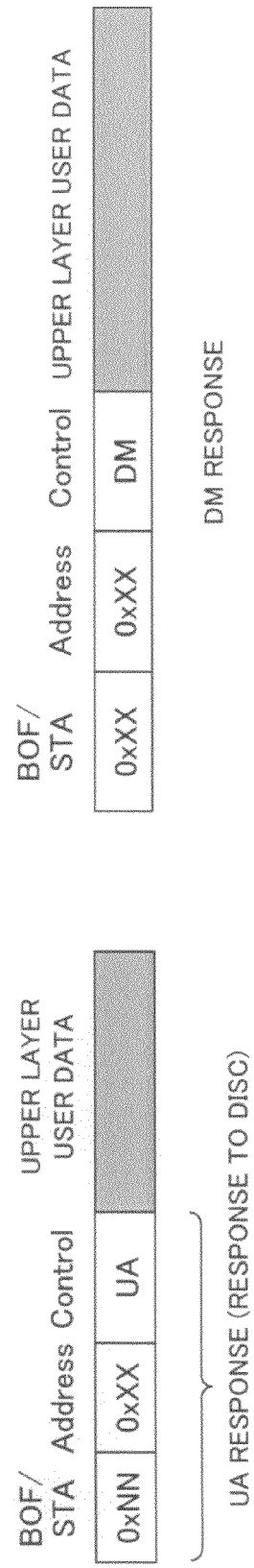

FIG. 19

| 1 byte | 4 bytes | 4 bytes | 1 byte | 1 byte | 1 byte | 32 bytes |
|---|---|---|---|---|---|---|
| FI X'01' | Source Device Address | Destination Device Address | Discovery Flags | Slot Number | Version Number | Discovery Info (final slot only) |

FIG. 20
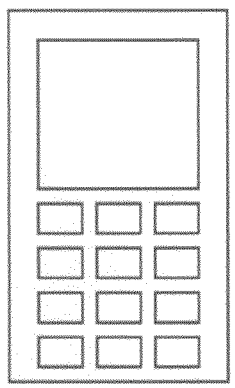
MOBILE PHONE
MOBILE PHONE A
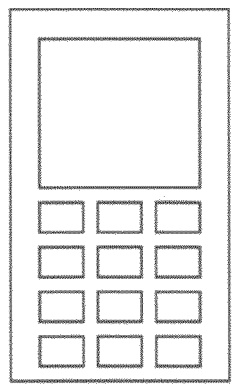
MOBILE PHONE
MOBILE PHONE B
FIG. 21
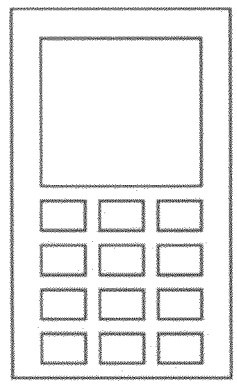
MOBILE PHONE
MOBILE PHONE A
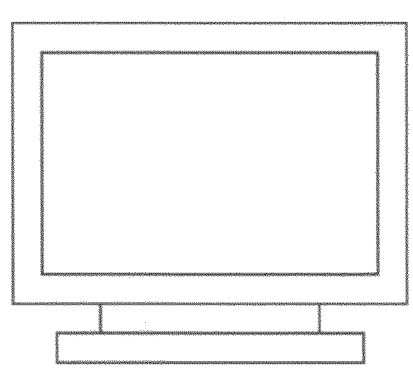
DISPLAY DEVICE
DISPLAY DEVICE B FIG. 22
MOBILE PHONE
PRINTING DEVICE
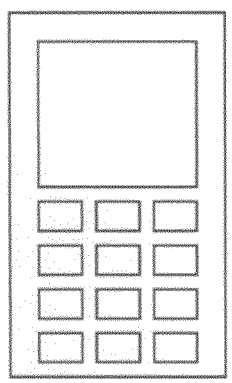
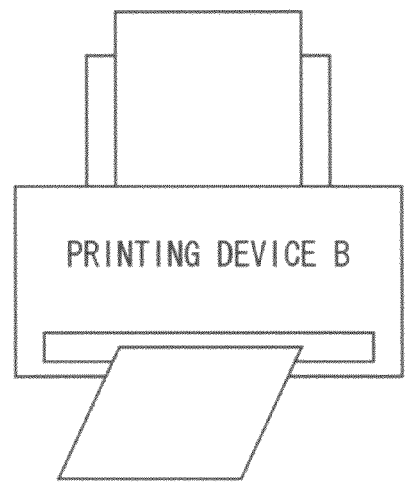
MOBILE PHONE A
PRINTING DEVICE B
FIG. 23
MOBILE PHONE
RECORDING DEVICE
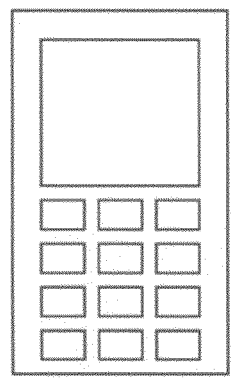
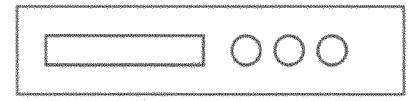
MOBILE PHONE A
RECORDING DEVICE B

|  | | TRANSMITTER | | | |
|---|---|---|---|---|---|
|  | | IrSimple ONE-WAY | IrSimple TWO-WAY | IrSimple TWO-WAY + IrDA | ONLY IrDA |
| RECEIVER | IrSimple ONE-WAY | IrSimple | UNCONNECTABLE | UNCONNECTABLE | UNCONNECTABLE |
| | IrSimple TWO-WAY | UNCONNECTABLE | IrSimple | IrSimple | UNCONNECTABLE |
| | IrSimple TWO-WAY + IrDA | UNCONNECTABLE | IrSimple | IrSimple | IrDA |
| | ONLY IrDA | UNCONNECTABLE | UNCONNECTABLE | IrDA | IrDA |

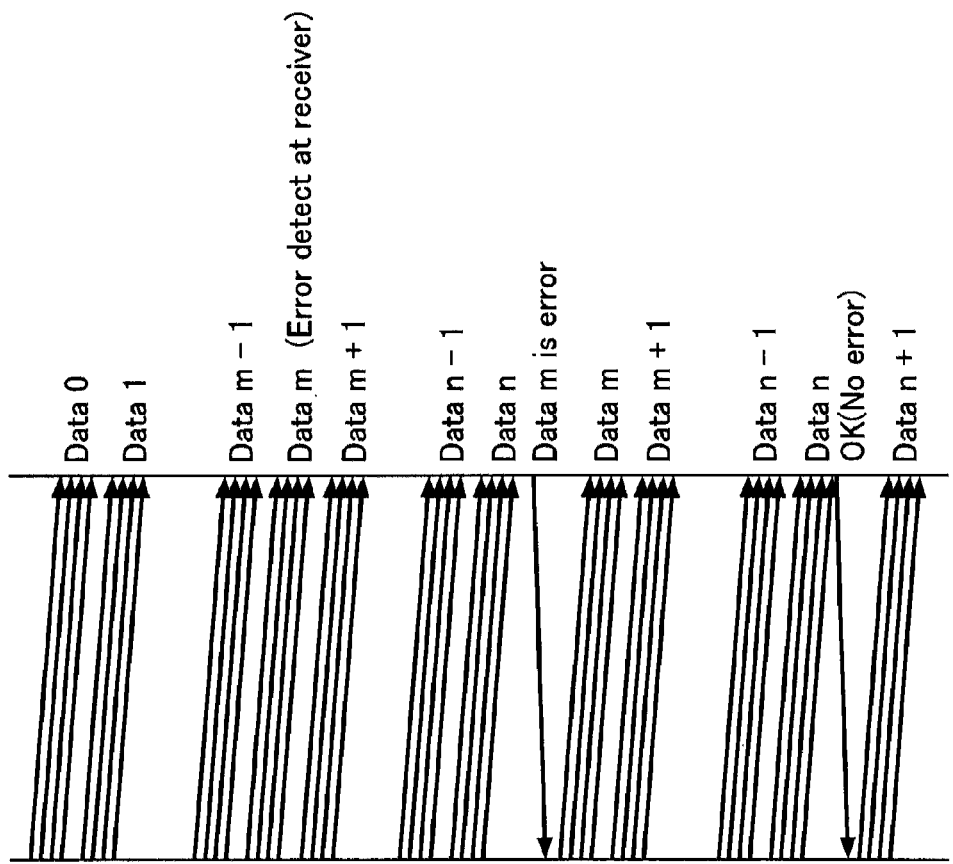
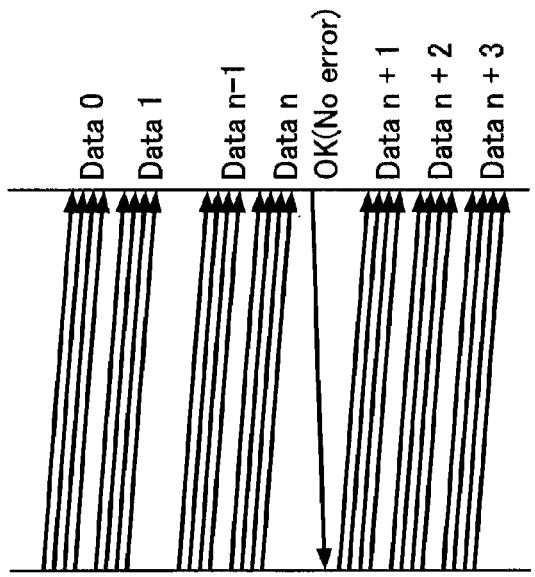
FIG. 36 (b)
FIG. 36 (a)

FIG. 37 (a)   IrDA DATA FRAME (I FRAME)

| Addr | Nr/Ns | LSAP | TTP Header | OBEX Data |

FIG. 37 (b)   DATA FRAME OF THE PRESENT INVENTION (UI FRAME)

| Addr | UI | LSAP | sending right Sequential Number | OBEX Data |

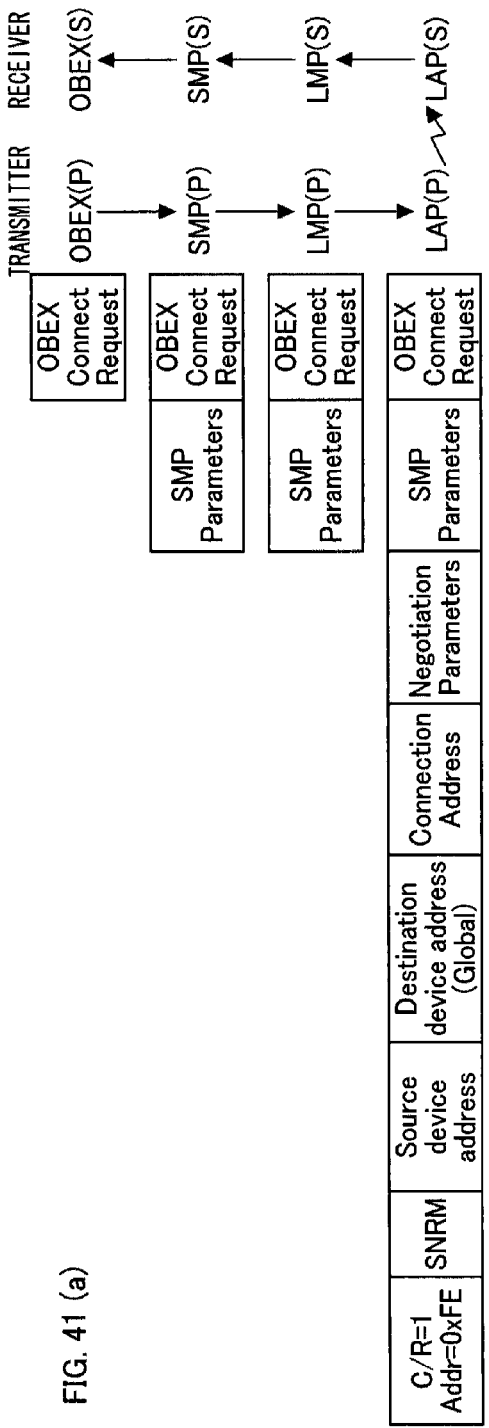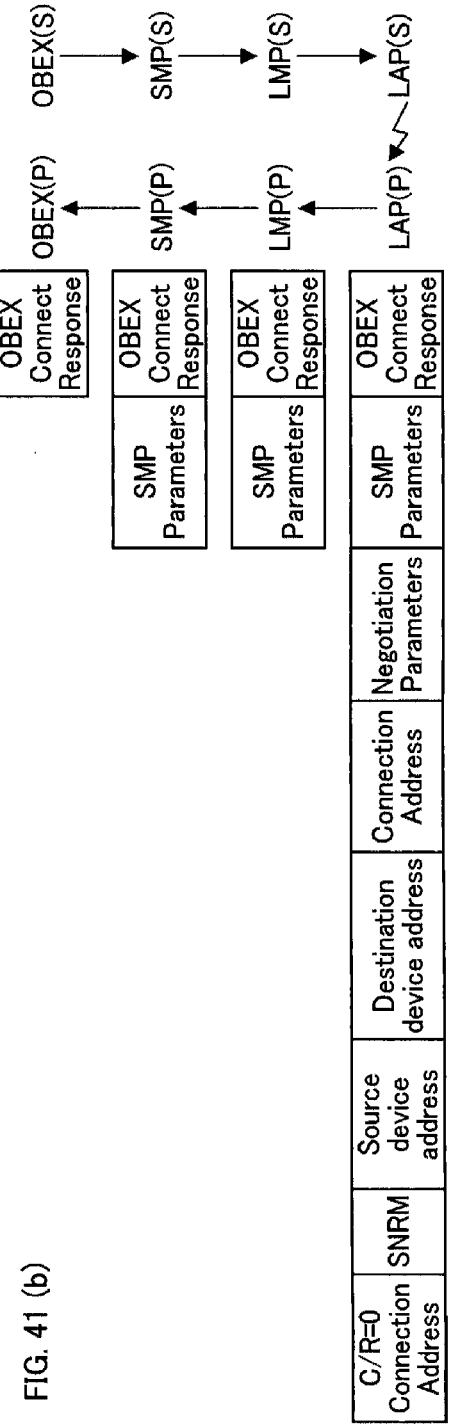
FIG. 41 (a)
FIG. 41 (b)

COMMUNICATION DEVICE, COMMUNICATION SYSTEM, COMMUNICATION METHOD, AND COMMUNICATION CIRCUIT

TECHNICAL FIELD

The present invention relates to a communication device, a communication system, a communication method, a communication program, and a communication circuit, each of which allows for transmission/reception of data.

BACKGROUND ART

Recently, as mobile phones include a camera function, image data captured by cameras is transferred to devices such as television sets and printers, and the devices perform a predetermined process such as an image display process.

Examples of an interface between mobile phones and television sets, printers, and personal computers are infrared methods such as IrDA (Infrared Data Association) (see Non-Patent Documents 1 and 2).

Since the infrared ray used for infrared communication such as IrDA has directivity, a shield between the devices will completely disable data transfer. However, if there is no shield between the devices, high-speed data transfer is possible. IrDA is broken into Very Fast IR (VFIR) with a maximum speed of 16 Mbps, Fast IR (FIR) with a maximum speed of 4 Mbps, and SIR with a maximum speed of 115.2 kbps. However, in commercially available products, the maximum speed is up to 4 Mbps.

FIG. 14 shows a procedure of establishment of connection of an IrLAP layer through the IrDA standard, which is one of standards of infrared communication.

A primary station serves to look for the other station at the beginning of transmission. That is, the primary station requires establishment of data transfer state and outputs a "station search command (XID command)". On the other hand, a secondary station serves to accept the request and outputs a "station search response (XID response)". A request (order) from the primary station to the secondary station is called a command, and a reply from the secondary station to the primary station is called a response.

The XID command serves to look for a potential secondary station within a certain distance in which the primary station is capable of transmission. The slot numbers indicative of numbers in parentheses denote ascending numbers sequentially put on the commands.

After receiving the XID command, the secondary station outputs the XID response, which is a station search response, so as to notify the primary station of its existence. The primary station outputs a predetermined number of XID commands, and then outputs the final XID command labeled with the slot number 255. That is, the command with the slot number 255 is the final command (XID-END).

Next, the primary station notifies the secondary station of parameters required for communication, such as maximum transferable speed and maximum receivable data length, using a SNRM command. The secondary station receives the command and carries out comparison between the received setting value and its own setting value, and then transmits a UA response to the primary station so as to notify an allowable value.

The following more specifically describes establishment of data transmission state. In IrDA standard, the number of packets of XID command transmitted from the primary station is selected from 1, 6, 8, and 16. The number is described in a Discovery flag of the XID command. As shown in FIG. 14, when 8 packets of XID command are transmitted each time, the 1st to 8th packets are given slot numbers from 0 to 7. Lastly, the XID-End command with the slot number of 255 is transmitted so that the receiving end will notify that it is the final packet. Then, after approximately 500 m seconds since the final packet is sent, the 1st through 8th packets are transmitted again. These packets are transmitted with a time interval of 25-85 m seconds.

The secondary station does not always output the XID response immediately after receiving the XID command, but outputs the response after receiving a packet with an arbitrary (a random value) slot number. For example, when 8 packets of XID command are transmitted each time, the secondary station arbitrarily determines whether it outputs the XID response after receiving the 1st packet or after receiving the 8th packet. For example, in FIG. 14, the secondary station outputs the XID response after receiving the third packet.

According to SIR, IrDA standard specifies that the XID command and the XID response are transferred at 9600 bps. This is much slower than the transfer speed of data frame (described later), which is sent at 4 Mbps. Consequently, transmission/reception of the XID command and the XID response takes a longer time. Through these processes, a procedure for searching stations between the primary station and the secondary station is completed.

After the procedure, the primary station notifies the secondary station of parameters required for communication, such as maximum transferable speed and maximum receivable data length of the primary station, using a SNRM command. The secondary station receives the command and notifies the primary station of parameters required for communication, such as maximum transferable speed and maximum receivable data length of the secondary station, using a UA response, thereby establishing an IrLAP connection between the primary station and the secondary station, in which connection maximum transferable speed, maximum transferable data length, and other parameters are set.

After the IrLAP connection using an IrLAP command packet, IrLMP connection, TinyTP connection, and OBEX connection are established using IrLAP data packets.

A request for an IrLMP connection from the primary station is transferred to the secondary station using an IrLAP data packet and a response for an IrLMP connection from the secondary station is transferred to the primary station using an IrLAP data packet, thereby establishing an IrLMP connection.

Then, a request for a TinyTP connection from the primary station is transferred to the secondary station using an IrLAP data packet and a response for a TinyTP connection from the secondary station is transferred to the primary station using an IrLAP data packet, thereby establishing a TinyTP connection.

Further, a request for an OBEX connection from the primary station is transferred to the secondary station using an IrLAP data packet and a response for an OBEX connection from the secondary station is transferred to the primary station using an IrLAP data packet, thereby establishing an OBEX connection. As a result, connections allowing for information data transfer are established.

For disconnection, a request and a response for OBEX disconnection, a request and a response for TinyTP disconnection, and a request and a response for IrLMP disconnection are transferred using IrLAP data packets, and then a DISC command which is a request command packet for IrLAP disconnection and a UA response which is a response command packet are transmitted, thereby disconnecting a communication between the primary station and the secondary station.

Further, in IrDA, communication is performed on a frame basis. FIG. 16 shows a frame in IrDA, which is constituted of a preamble field, a start flag, an address field, a control field, a data field, a FCS, and a stop flag. Among these, the preamble field is used for generation of reception clock which is used in a reception circuit of the receiving end. Further, the FCS includes an error detection code for detecting an error.

Further, there are various kinds of frames, such as an I (Information) frame for information transfer, an S (Supervisory) frame for supervision/control of communication, and a U (Unnumbered) frame for connection or disconnection of communication. The information for identifying those I, S U frames is contained in the control field.

Since data transmission cannot be completed within one frame in most cases, the data is divided into plural I frames or plural UI frames. Each of I frames contains data to be transmitted in the data field, and is given a sequence number by which any omission of data can be found. With this arrangement, highly-reliable communication is realized. Each of UI frames contains data to be transmitted in an I field, but is not given a sequence number by which any omission of data can be found. The S frame has no data field for containing data, and is used for transmission of notification of condition, such as establishment of communication, or a busy state, or used for a request for retransmission or the like. The U flame is called an unnumbered frame as it has no sequence number like those of the I frames. The U frame is used for setting of communication mode, report of response and irregular condition, or establishment of data link.

[Non-Patent Document 1] Infrared Data Association Serial Infrared Link Access Protocol (IrLAP) Version 1.1 (Jun. 16, 1996)

[Non-Patent Document 2] Infrared Data Association Serial Infrared Physical Layer Specification Version 1.4 (May 30, 2003)

However, the above arrangement is problematic in that data transfer takes much time and efficiency for data transfer decreases.

That is, as described above, for establishment of communication, IrDA requires sensing of 500 ms, searching for stations using an XID command, exchange of negotiation parameters using SNRM and UA.

When plural communication stations exist in a communication area, it is necessary to control stations in the area so that a communication is not prevented by light emitted from an unexpected station. However, an infrared ray has high directivity and infrared ray communications are mostly one-to-one communications. Therefore, it is not always necessary for a device to automatically search for other stations in a communication area.

Further, IrDA standard specifies that a search for other stations using XID is performed at 9600 bps, which is comparatively lower than 4 Mbps at which data exchange is performed. Further, as shown in FIG. 15, for information data transfer, after completing connection of IrLAP, an IrLMP layer, a TinyTP layer, and an OBEX layer are serially connected by serially exchanging IrLAP data packets. For disconnection, OBEX, TinyTP, IrLMP, and IrLAP are disconnected in the same order.

For the above reason, in a case where one information terminal transfers data to another information terminal using an infrared ray, whole transfer efficiency drops due to a time for preparing data transfer and a time for disconnection.

Further, in a case where a portable terminal transfers an image to an image display device, when a transmission error occurs, a user sometimes can be aware the transmission error with ease. For example, a case where an image display device at a receiving end displays an image different from an image the user has transferred, or a case where the image display device does not renew its display.

If it takes little time for a user to see whether user's transmission of data is performed successfully or not, it is not so troublesome for the user to retransmit the data even if an assured and errorless communication is not performed. Such a device only requires an ability to receive data. A transmission circuit and a transmission device may be omitted from the device.

However, since IrDA standard specifies that a receiver outputs a response to a command, all receivers must include a transmission circuit and a transmission device.

DISCLOSURE OF INVENTION

An object of the present invention is to provide a communication device, a communication system, a communication method, a communication program, and a communication circuit, each of which allows reduction of a time required for a communication connection.

In order to achieve the foregoing objects, the communication device of the present invention is a communication device, serving as a primary station which carries out communication with a secondary station, including a first protocol control section for transmitting a first connection request command without transmitting a station-search command to confirm a presence of the secondary station, so that a communication connection between the communication device and the secondary section is established.

Further, the communication device of the present invention is a communication device, serving as a secondary station which carries out communication with a primary station, including a first protocol control section for, when receiving a first connection request command from the primary station without receiving a station-search command with which the primary station confirms a presence of the secondary station, transmitting a connection response to the first connection request command, so that a connection is established.

Further, the communication method of the present invention is a communication method of a communication device serving as a primary station which carries out communication with a secondary station, including the step of transmitting a first connection request command without transmitting a station-search command to confirm a presence of the secondary station, so that a communication connection between the communication device and the secondary station is established.

Further, the communication method of the present invention is a communication method of a communication device serving as a secondary station which carries out communication with a primary station, including the step of transmitting a connection response to a first connection request command from the primary station so that a connection is established, when the communication device receives the first connection request command without receiving a station-search command with which the primary station confirms a presence of the secondary station.

Further, the communication system of the present invention includes a communication device serving as the primary station and a communication device serving as the secondary station.

With the arrangements and the methods, when the primary station establishes a communication connection with the secondary station, the primary station transmits a connection request command (e.g. SNRM in IrSimple) without transmitting a station-search command (e.g. XID in IrDA) with which the primary station confirms the presence of the secondary station. On the other hand, when the secondary station receives the connection request command (corresponding to SNRM) from the primary station without receiving the station-search command (corresponding to XID) with which the primary station confirms the presence of the secondary station, the secondary station transmits a connection response (e.g. UA in IrSimple) to the connection request command.

With the above connection sequence, it is unnecessary to carry out a communication for searching a station. Consequently, a connection sequence is made simpler, which has an effect of reducing a time necessary for a commutation connection. For example, it is possible to realize a communication protocol which reduces a time required for a connection between the primary station and the secondary station, which time is the cause of decrease in transmission efficiency as a whole in IrDA. This communication protocol allows high transmission efficiency (communication efficiency) in processes including a connection request, information transmission, and disconnection.

Note that, the communication device may be realized by a computer. At that time, the present invention includes: a communication program which causes a computer to function as each section of the communication device and thus realizes the communication device by the computer; and a computer-readable storage medium in which the communication program is stored.

BRIEF DESCRIPTION OF DRAWINGS

FIG. 5 is a block diagram showing that 0xFFFFFFFF is assigned to a Destination Device Address in the SNRM command.

FIG. 6(a) shows an SNRM command. FIG. 6(b) shows a DISC command. FIG. 6(c) shows a connection parameter format in IrDA. FIG. 6(d) shows a detail of the connection parameter format in IrDA.

FIGS. 7(a) to 7(c) show UA responses to each of which upper layer user data is added. FIG. 7(a) shows a response to an SNRM command. FIG. 7(b) shows a response to a DISC command. FIG. 7(c) shows a DM response.

FIG. 19 is a diagram illustrating an XID command format in IrDA.

FIG. 20 shows an infrared communication using a mobile phone which is an example of the present invention.

FIG. 21 shows an infrared communication using a display device which is another example of the present invention.

FIG. 22 shows an infrared communication using a printing device which is further another example of the present invention.

FIG. 23 shows an infrared communication using a recording device which is further another example of the present invention.

FIG. 35($b$) is a sequence diagram illustrating another connection establishing in the embodiment of the present invention. FIG. 35($c$) illustrates a format of a packet used for the connection establishing in the embodiment of the present invention.

FIG. 36($a$) is a diagram illustrating a data exchange sequence in the embodiment of the present invention. FIG. 36($b$) is a diagram illustrating another data exchange sequence in the embodiment of the present invention.

FIG. 37($a$) is a diagram illustrating a packet format used in data exchange in IrDA. FIG. 37($b$) is a diagram illustrating a packet format used in data exchange in the present invention.

FIG. 38($b$) is a diagram illustrating another data exchange sequence in the embodiment of the present invention.

FIG. 39($b$) is a diagram illustrating another disconnection sequence in the embodiment of the present invention. FIG. 39($c$) illustrates a packet format used in the disconnection sequence in the present invention.

FIG. 41($a$) is an explanatory diagram illustrating change of data in the functions among the layers, which functions are indicated by right arrows in FIG. 40 and FIG. 42 and which functions are used in the connection sequence according to the embodiment of the present invention. FIG. 41($b$) is a diagram illustrating a change of data in the functions among the layers in the embodiment of the present invention.

FIG. 47($b$) is an explanatory diagram illustrating a change of data in the functions among the layers in the embodiment of the present invention.

REFERENCE NUMERALS

Figure 1:
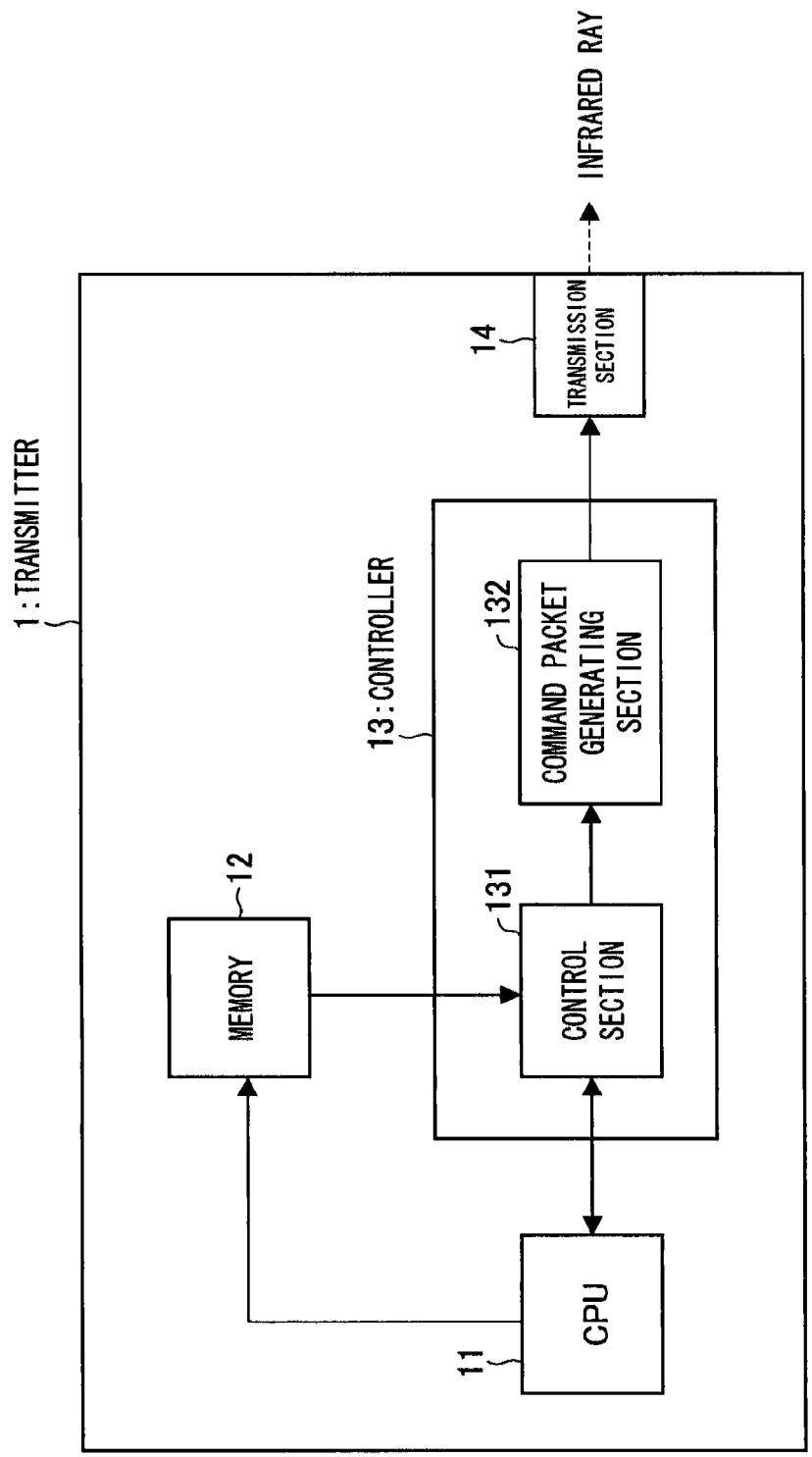
FIG. 1 is a block diagram illustrating a transmitter of Embodiment 1 of the present invention.

1: Transmitter (communication device)
11: CPU
12: Memory
13: Controller
131: Control section
132: Command packet generation section
14: Transmission section
2: Receiver (communication device)
21: CPU
22: Memory
23: Controller
231: Control section
232: Command packet generation section 233: Packet identification section
24: Transmission section
25: Reception section
26: CDR
3: Transmitter (communication device)
31: CPU
32: Memory
33: Controller
331: Control section
332: Command packet generation section
333: Packet identification section
34: Transmission section
35: Reception section
36: CDR
37: Timer
111: IrSimple-LAP control section (first protocol control section)
112: IrDA-LAP control section (second protocol control section)
113: Protocol switching section

BEST MODE FOR CARRYING OUT THE INVENTION

With reference to FIGS. 1 to 33, the following explains embodiments of a communication method of the present invention, and a transmission/reception circuit and a transmitter/receiver using the method. The communication method of the present invention includes a protocol for a communication.

[Overview]
(Communication Layer)

Each of embodiments below fully explains respective structures and operations of a transmitter and a receiver of a communication system of the present invention, in accordance with the OSI7 hierarchical model. The OSI7 hierarchical model herein refers to so-called "OSI Reference Model" or "OSI Hierarchical Model".

In the OSI7 hierarchical model, for realization of data communication between different types of device, a communication function that a computer should have is divided into seven layers, in each of which a standard function module is defined.

Specifically, the first layer (physical layer) serves to perform electrical conversion, mechanical operation required to output data into the communication line. The second layer (data link layer) secures physical communication paths, and detects error of data being transmitted in each of the communication paths. The third layer (network layer) selects a communication path, and supervises addresses in the communication path. The fourth layer (transport layer) carries out data compression, error correction, retransmission control etc. The fifth layer (session layer) establishes/releases a virtual path (connection) for carrying out data transmission/reception between plural communication programs. The sixth layer (presentation layer) converts the data received from the fifth layer into a different format suitable for the user and converts the data transmitted from the seventh layer into a format suitable for transmission. The seventh layer (application layer) provides various available services using data communication to a person or to a program.

Each of the communication layers of the present invention has the same function as that of corresponding layer in the OSI7 hierarchical model. However, it should be noted that the communication system in the embodiments has a six-layered structure in which the session layer and the presentation layer are unified. Note that no explanation for the application layer is made.

The present invention is widely applicable to a communication system in which a transmitter and a receiver communicate with each other via respective established connections between (i) a plurality of communication layers of the transmitter and (ii) a plurality of communication layers of the receiver. That is, the communication function of the present invention may be divided unlike the OSI7 hierarchical model. Further, the number of the communication layers can be selected arbitrarily as long as the communication layers to be connected with each other are plural.

Further, the present invention is preferably applicable to a wireless communication in which a communication path is sometimes disconnected, such as a wireless communication using an infrared ray. This is because (i) the present invention allows an immediate connection using a first protocol with no station-search command and (ii) the first protocol and a second protocol which allows more assured connection using a station-search command can be switched with each other when needed. The present invention is effective for other wireless communication and wired communication.

(IrSimple and IrDa)

For convenience of explanation, each of the embodiments describes "IrSimple", one application example of the present invention. However, the present invention is not limited to IrSimple. IrSimple is made by partly modifying the function of conventional IrDA.

In specifically explaining each embodiment, the communication method of the present invention is IrSimple (first protocol) and a communication method combined with the above method in the same device is IrDA (second protocol). Such combination of IrSimple and IrDA has a merit that a single physical layer can be used in both methods. Further, in a case of a protocol such as IrDA in which a station-search command (XID) and a connection request command (SNRM) are used, it is possible to perform switching of protocols, which is a later-mentioned feature of the present invention. The second protocol combined with IrSimple may be a protocol other than IrDA, and may use a physical layer different from that used by IrSimple.

Note that, in each of the embodiments, the data link layer, the network layer, the transport layer, and the session/presentation layer may be referred to as LAP, LMP, SMP, and OBEX, respectively.

Embodiment 1

FIG. 1 is a block diagram illustrating a structure of a transmitter (transmission/reception circuit, transmitter/receiver) 1 of the present embodiment. As shown in FIG. 1, the transmitter 1 includes a CPU 11, a memory 12, a controller 13, and a transmission section (first transmission means) 14. The transmitter 1 can transmit data to outside via a wireless communication using an infrared ray according to IrDA standard for example. IrDA standard is exemplified above as a wireless communication method, but the method is not limited to IrDA standard. Each block of the transmitter 1 of the present embodiment may be realized by hardware logic (communication circuit) or may be realized by a CPU executing software.

The CPU 11 carries out a predetermined operation, such as a connection request, in response to instruction by a user which is supplied to an operation section (not shown). After receiving an instruction for connection from the operation section, the CPU 11 stores data necessary for connection in the memory 12 if such data exists, and the CPU 11 supplies a connection request to the controller 13. Then, after receiving from the controller 13 a transmission completion notification, which indicates completion of transmission of a connection command, the CPU 11 finishes the connection operation. The memory 12 temporarily stores data necessary for connection. This is performed through writing of the transfer data into the memory 12 by the CPU 11.

The controller 13 controls transfer of a connection request command according to a connection request from the CPU 11. The controller 13 includes a control section 131 and a command packet generation section 132. After receiving the connection request from the CPU 11, the control section 131 reads out data necessary for connection from the memory 12 if such data exists, and the control section 131 transmits the data to the command packet generation section 132, and causes the command packet generation section 132 to generate a command packet. If data necessary for connection does not exit, the control section 131 causes the command packet generation section 132 to generate a command packet.

Further, the control section 13 detects that the command packet generated by the command packet generation section 132 has been transmitted from the transmission section 14, and sends to the CPU 11 a transmission completion notification which indicates a completion of command transmission.

The command packet generation section 132 generates a connection request command in response to a connection request from the control section 131. Further, if data to be included in the connection request command exists, the command packet generation section 132 receives the data from the control section 131 and generates a connection request command including the data. Transfer speed of the command packet generated by the command packet generation section 132 is controlled by the control section 131. The transmission section 14 receives the packet from the controller 13 and transmits the packet to outside via an infrared communication path at a predetermined time interval.

Figure 4:
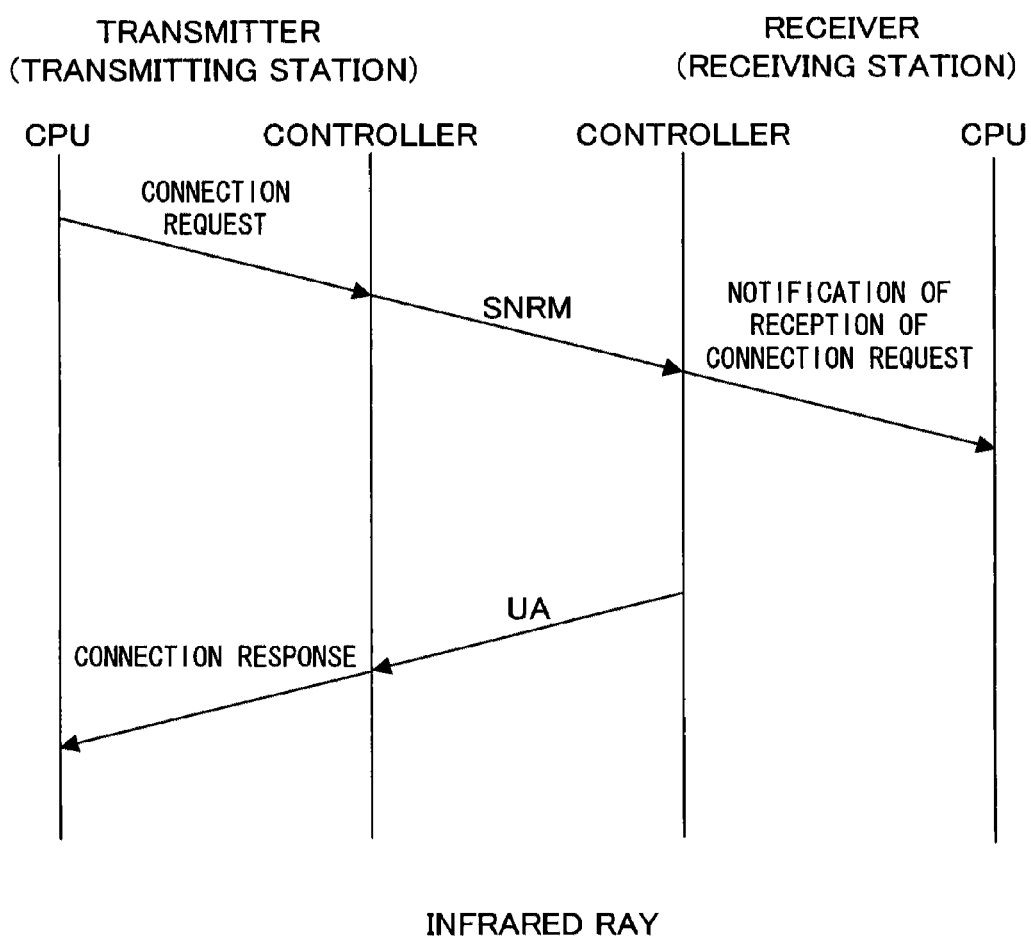
FIG. 4 is a signal sequence diagram illustrating transmission of an SNRM command as a first command from the transmitter.
Figure 6:
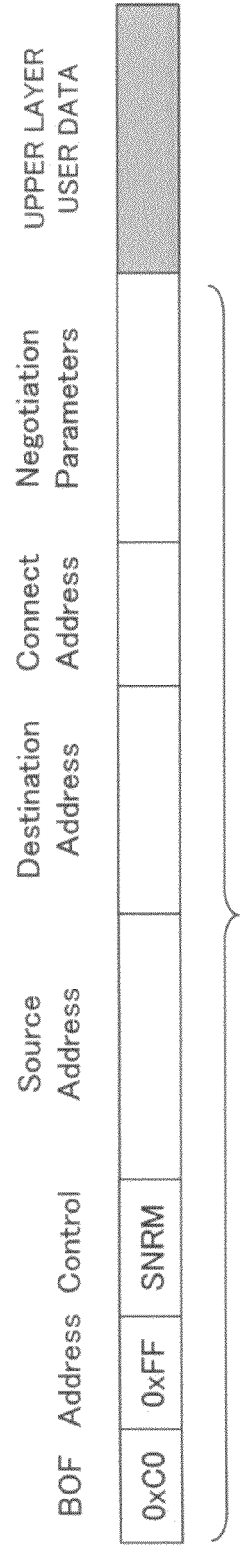
FIGS. 6(a) to 6(d) are block diagrams illustrating an SNRM command and an DISC command, to each of which upper layer user data is added.
Figure 6:
Figure 6:
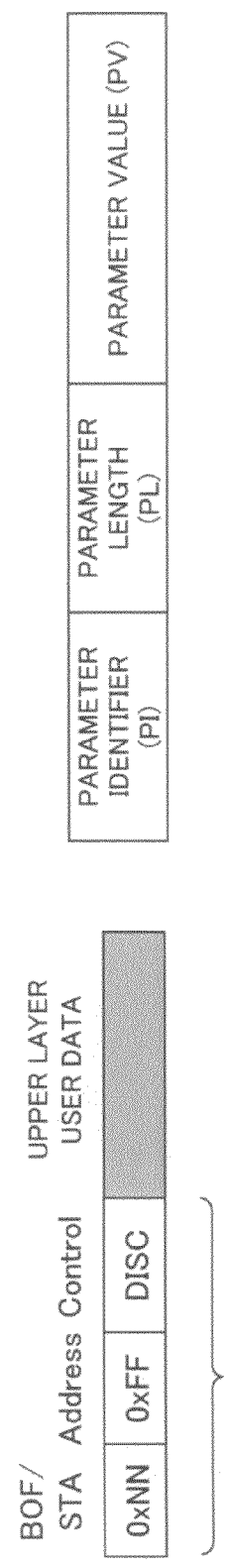
Figure 6:
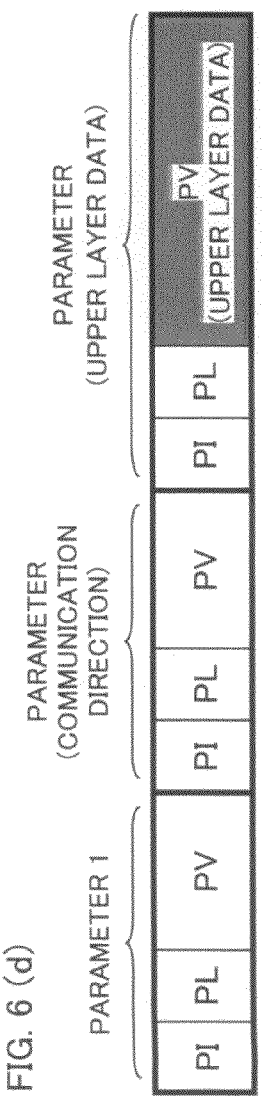

As shown in FIG. 4, in the transmitter 1 of the present embodiment, after receiving a connection request from the CPU 11, the control section 131 causes the command packet generation section 132 to generate, as a first generated packet, an SNRM packet which has setting values (parameters) necessary for communication, such as maximum transferable speed and maximum receivable data length of the transmitter 1, and the transmission section 14 transmits the generated packet to outside.

Embodiment 2

Figure 2:
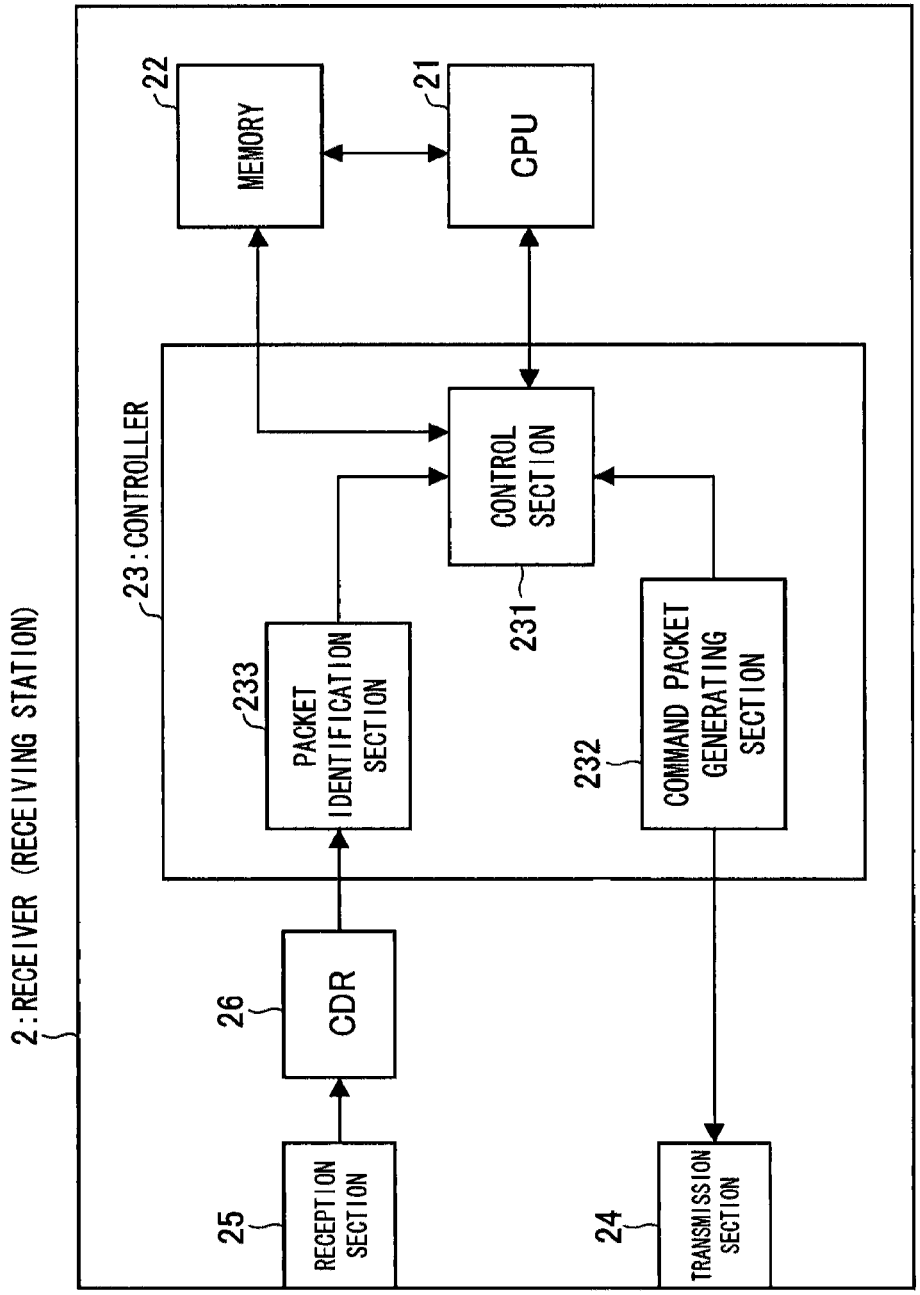
FIG. 2 is a block diagram illustrating a receiver of Embodiment 2 of the present invention.

The following explains a receiver of the present embodiment with reference to FIG. 2. FIG. 2 is a block diagram illustrating a structure of a receiver (transmission/reception circuit, transmitter/receiver) 2 of the present embodiment. As shown in FIG. 2, the receiver 2 includes a CPU 21, a memory 22, a controller 23, and a CDR (Clock Data Recovery) 26, a reception section 25, and a transmission section 24. Each block of the transmitter 1 of the present embodiment may be realized by hardware logic (communication circuit) or may be realized by a CPU executing software.

The reception section 25 receives the packet which has been transmitted from the transmitter 1 via an infrared communication path. The reception section 25 transmits the packet to the CDR 26. The CDR 26 extracts (recovers) a clock signal and a command signal from the received packet. Then, the CDR 26 transmits the clock signal and the command signal to the controller 23.

The controller 23 carries out a predetermined control operation with respect to the packet received from the CDR 26. The controller 23 includes a control section 231, a command packet generation section 232 and a packet identification section 233.

The packet identification section 233 receives the packet recovered by the CDR 26, extracts command information from the packet, and transmits the command information to the control section 231. When data necessary for connection is included in the packet, the control section 231 carries out writing of the data into the memory 22, and informs the CPU 21 of completion of reception of the command. On the other hand, when data necessary for connection is not included in the packet, the control section 231 informs the CPU 21 of completion of reception of the command. When data necessary for connection is included in the command, the control section 231 writes the data in the memory 22. The CPU 21 carries out a process in accordance with a notification from the control section 231.

As shown in FIG. 4, in the receiver 2 of the present embodiment, the reception section 25 receives a packet from the transmitter 1 of Embodiment 1, the packet identification section 233 identifies the packet, and when the identified packet is an SNRM command, the control section 231 informs the CPU 11 of transmission of a connection request from the transmitter 1, the command packet generation section 232 generates, as a response to the SNRM command, a UA response including parameters such as maximum transferable speed and maximum receivable data length of the receiver 2, and the transmission section 24 transmits the UA response.

Embodiment 3

In the transmitter 1 of Embodiment 1, when a command packet generated by the command packet generation section 132 is an SNRM command in IrDA shown in FIG. 5, 0xFFFFFFFF is assigned to a Destination Device Address in the SNRM command indicative of an address of other station. 0xFFFFFFFF assigned to the Destination Device Address is an unused code although the code is defined as a broadcast address in IrDA. Consequently, it is possible to inform a specific transmitter/receiver that a communication method other than IrDA is used even if an SNRM command in IrDA is used.

Further, in the receiver 2 of Embodiment 2, when 0xFFFFFFFF is assigned to Destination Device Address in an SNRM command in IrDA received by the packet identification section 233, it is judged that a communication method other than IrDA is used, the command packet generation section 232 immediately generates a UA response and the transmission section 24 transmits the UA response.

Embodiment 4

FIG. 6(a) shows a packet obtained by adding, to an SNRM command in IrDA, an area in which user data from an upper layer is put. The user data is necessary for connection of the upper layer. Note that, the position of the area is not limited to the position shown in FIG. 6(a).

FIG. 6(c) shows a format for parameters in an SNRM command in IrDA. Examples of the parameters include maximum transferable speed and maximum receivable data length of a transmitter. The parameter format includes a parameter identifier (PI), a parameter length (PL), and a parameter value (PV). The parameter identifier is specific to each parameter. After receiving an SNRM command, a station identifies the parameter identifier and knows which parameter is set. Consequently, the station can carry out a process using the parameter. A new parameter identifier is set to the upper layer data shown in FIG. 6(a) and the upper layer data is set as a parameter as shown in FIG. 6(d), so that it is possible for an existing IrDA reception circuit to easily know the position, the length, and the contents of the upper layer data, and to carry out a process using the parameter.

Figure 3:
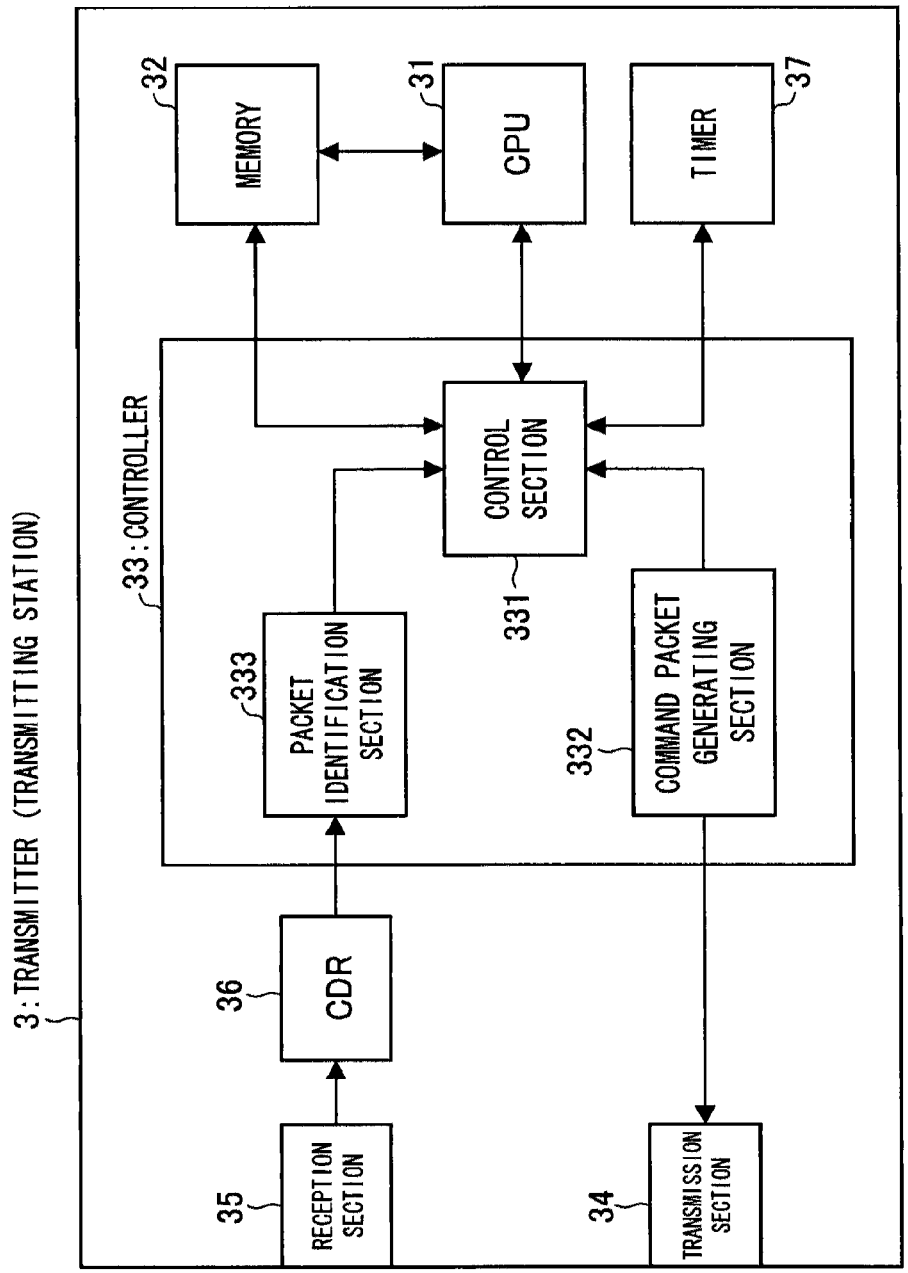
FIG. 3 is a block diagram illustrating a transmitter of Embodiment 3 of the present invention.

FIG. 3 is a block diagram illustrating a transmitter of the present embodiment. This is a transmitter 3, which is a modification of the transmitter 1 in FIG. 1, in which modification a reception section 35, a CDR 36, a packet identification section 333, and a timer 37 are added.

After receiving a connection request from a CPU 31, a control section 331 receives user data from the CPU 31 directly or via a memory 32. The user data is from an upper layer and for connection of the upper layer. Then, the control section 331 supplies the user data to a command packet generation section 332. The command packet generation section 332 puts, in an SNRM command, the user data as well as parameters such as maximum transferable speed and maximum receivable data length of a transmitter, and the transmission section 34 transmits the SNRM command. An example of the upper layer user data is a CONNECT command of an IrDA-OBEX layer.

When the transmitter receives a UA response from the other station after transmitting the SNRM command, the CDR 36 recovers a clock and data from a signal received by the reception section 35, and supplies the clock and the data to the packet identification section 333. When a packet received by the packet identification section 333 is a UA response, the packet identification section 333 informs the control section 331 that the packet is a UA response. When upper layer data exists in the UA response, the control section 331 writes the upper layer data in the memory 32 for example and informs the CPU 31 that the upper layer data exists. The CPU 31 analyzes the upper layer data written in the memory 32 and judges whether a SUCCESS response in OBEX is included or not. When a SUCCESS response in OBEX is not included, the CPU 31 may carry out a process for regarding connection as a failure and stopping the transmitter from entering into a data transfer mode.

FIG. 6(b) shows a packet obtained by adding, to a DISC command, an area in which user data from an upper layer is put. The user data is necessary for disconnection of the upper layer. The position of the area is not limited to the position shown in FIG. 6(b). The control section 331 receives user data from the CPU 31 directly or via the memory 32. The user data is from an upper layer and for disconnection of the upper layer. Then, the control section 331 supplies the user data to the command packet generation section 332. The command packet generation section 332 puts the user data in a DISC command and the transmission section 34 transmits the DISC command. An example of the upper layer user data is a DISCONNECT command of an IrDA-OBEX layer.

When the transmitter receives a UA response from the other station after transmitting the DISC command, the CDR 36 recovers a clock and data from a signal received by the reception section 35, and supplies the clock and the data to the packet identification section 333. When a packet received by the packet identification section 333 is a UA response, the packet identification section 333 informs the control section 331 that the packet is a UA response. When upper layer data exists in the UA response, the control section 331 writes the upper layer data in the memory 32 for example and informs the CPU 31 that the upper layer data exists. The CPU 31 analyzes the upper layer data written in the memory 32 and judges whether a SUCCESS response in OBEX is included or not. When a SUCCESS response in OBEX is not included, the CPU 31 may regard the connection as a failure and carries out a process accordingly.

A new parameter identifier is set to the upper layer data shown in FIG. 6(b) and the upper layer data is set as a parameter as shown in FIG. 6(d), so that it is possible for an existing IrDA reception circuit to easily know the position, the length, and the contents of the upper layer data, and to carry out a process using the parameter.

Embodiment 5

FIGS. 7(a) and 7(b) show packets each obtained by adding, to a UA response in IrDA, an area to which user data from an upper layer is put. The area is necessary for connection of the upper layer. New parameter identifier is set to upper layer data shown in FIG. 7(a) and the upper layer data is set as a parameter as shown in FIG. 6(d), so that it is possible for an existing IrDA reception circuit to know the position, the length, and the contents of the upper layer data and can carry out a process using the parameters.

When a receiver 2 in FIG. 2 of the present embodiment receives an SNRM command from a transmitter 1, a control section 231 informs a CPU 21 of reception of the SNRM command. When upper layer data exists in the SNRM command, the control section 231 writes the upper layer data in a memory 22. The CPU 21 analyzes the upper layer data and judges whether a CONNECT command in OBEX is included or not in the upper layer data. When the CONNECT command in OBEX is not included, the CPU 21 may regard the connection request as invalid and does not transmit a connection response. When the CPU 21 judges that the connection request from the other station exists, the CPU 21 informs the control section 231 of the connection response. The control section 231 receives user data from the CPU 21 directly or via the memory 22. The user data is from an upper layer and is necessary for connection of the upper layer. The control section 231 supplies the user data to the command packet generation section 232. The command packet generation section 232 puts, in a UA response, the user data as well as parameters such as maximum transferable speed and maximum receivable data length of the receiver. The transmission section 24 transmits the UA response. An example of the upper layer user data is a SUCCESS response of an IrDA-OBEX layer. However, the upper layer user data is not limited to this.

When it is necessary for the receiver to inform the other station that connection is impossible for reasons such as: an SNRM command received from the other station includes errors; the SNRM command does not include upper layer data; and the receiver is in an unconnectable state, the receiver may transmit a DM response shown in FIG. 7(c) instead of the UA response. The DM response may include upper layer data. An example of the upper layer data is an Internal Server Error response in OBEX, but the upper layer data is not limited to this.

FIG. 6(c) shows a format for parameters in a UA response in IrDA. Examples of the parameters include maximum transferable speed and maximum receivable data length of the receiver. The parameter format includes a parameter identifier (PI), a parameter length (PL), and a parameter value (PV). The parameter identifier is specific to each parameter. After receiving a UA response, a station identifies the parameter identifier and knows which parameter is set. Consequently, the station can carry out a process using the parameter. A new parameter identifier is set to the upper layer data shown in FIGS. 7(a) and 7(c) and the upper layer data is set as a parameter as shown in FIG. 6(d), so that it is possible for an existing IrDA reception circuit to easily know the position, the length, and the contents of the upper layer data, and to carry out a process using the parameter.

Further, when the receiver receives a DISC command, the control section 231 informs the CPU 21 of reception of the DISC command and receives user data from the CPU 21 directly or via the memory 22. The user data is from an upper layer and is necessary for disconnection of the upper layer. Then, the control section 231 supplies the user data to the command packet generation section 232, the command packet generation section 232 puts the user data in a UA response, and the transmission section 24 transmits the user data. An example of the upper user data is a SUCCESS response of an IrDA-OBEX layer.

Embodiment 6

In the transmitter 3 and the receiver 2 of Embodiments 4 and 5, respectively, after receiving an SNRM command including upper layer user data in Embodiment 4, the receiver 2 of Embodiment 5 informs the CPU 21 of reception of the SNRM command and supplies the user data to the CPU 21 directly or via the memory 22.

The CPU 21 performs connection of the upper layer based on the upper layer user data, and supplies user data, which is a response for connection of the upper layer, to the control section 231 directly or via the memory 22.

The control section 231 supplies the user data to the packet generation section 232, the packet generation section 232 puts, in a UA response, the user data as well as parameters such as maximum transferable speed and maximum receivable data length of the receiver, and the transmission section 24 transmits the user data.

On the other hand, after transmitting the SNRM command including the upper layer user data, the transmitter 1 of Embodiment 4 receives the UA response from the transmitter/receiver, informs the CPU 31 of reception of the response, and supplies the upper layer user data included in the UA response to the CPU 31 directly or via the memory 32. The CPU 31 performs connection of the upper layer based on the upper layer user data.

On the other hand, in the transmitter 3 and the receiver 2 of Embodiments 4 and 5, respectively, after receiving a DISC command including upper layer user data of Embodiment 4, the receiver 2 of Embodiment 5 informs the CPU 21 of reception of the DISC command and supplies the upper layer user data to the CPU 21 directly or via the memory 22.

The CPU 21 performs disconnection of the upper layer based on the upper layer user data, and supplies user data, which is a response for disconnection of the upper layer, to the control section 231 directly or via the memory 22. The control section 231 supplies the user data to the packet generation section 232, the packet generation section 232 puts the user data in a UA response, and the transmission section 24 transmits the user data. At that time, when it is judged that the upper layer data does not include a DISCONNECT command in OBEX, the request for disconnection is regarded as invalid and a response is not transmitted, or a DM response including an Internal Server Error response in OBEX is transmitted.

Further, a new parameter identifier is set to upper layer data in FIG. 7(b) and the upper layer data is set as a parameter as shown in FIG. 6(d), so that it is possible for an existing IrDA reception circuit to easily know the position, the length, and the contents of the upper layer data and to perform a process using the parameter.

On the other hand, after transmitting a DISC command including upper layer user data, the transmitter 3 of Embodiment 4 receives the UA response from the receiver 2, informs the CPU 31 of reception of the response, and supplies upper layer user data included in the UA response to the CPU 31 directly or via the memory 32. The CPU 31 performs disconnection of the upper layer based on the upper layer user data. At that time, when it is judged that a SUCCESS response in OBEX is not included in the received UA response, the UA response may be regarded as an invalid disconnection response and a process may be performed accordingly.

Figure 18:
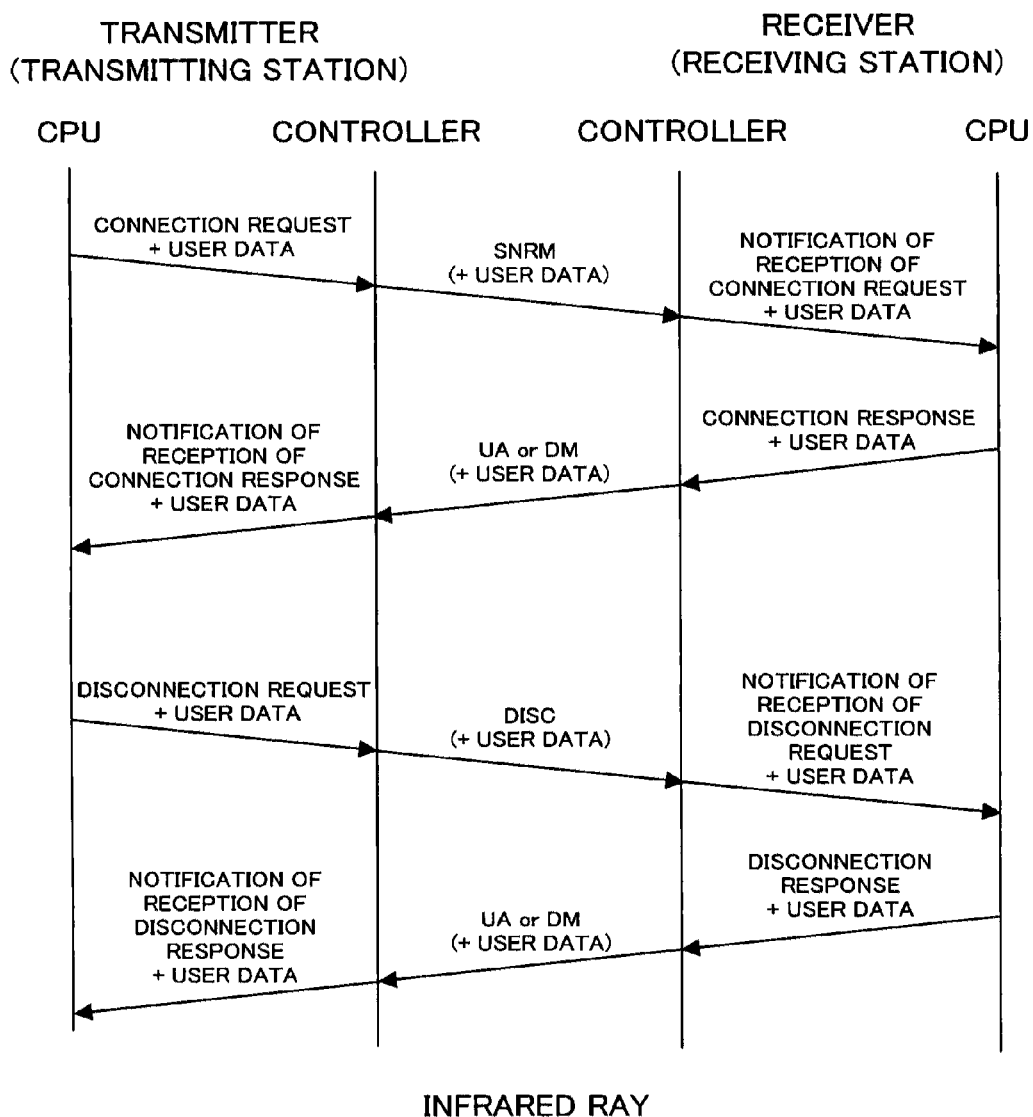
FIG. 18 is a signal sequence diagram illustrating a case where commands include user data in the transmitter and the receiver.

The above procedures allow the transmitter 3 and the receiver 2 of Embodiments 4 and 5, respectively, to perform connections or disconnections of all layers (from upper layers to lower layers) by exchanging packets only once. A signal sequence of the present embodiment is shown in FIG. 18.

Embodiment 7

FIG. 3 shows a transmitter 3 of the present embodiment. In the transmitter 3, a reception section 35, a CDR 36, and a packet identification section 333 are the same as those in the receiver 2 of Embodiment 2. A timer 37 counts a time in response to a request from a control section 331.

Figure 8:
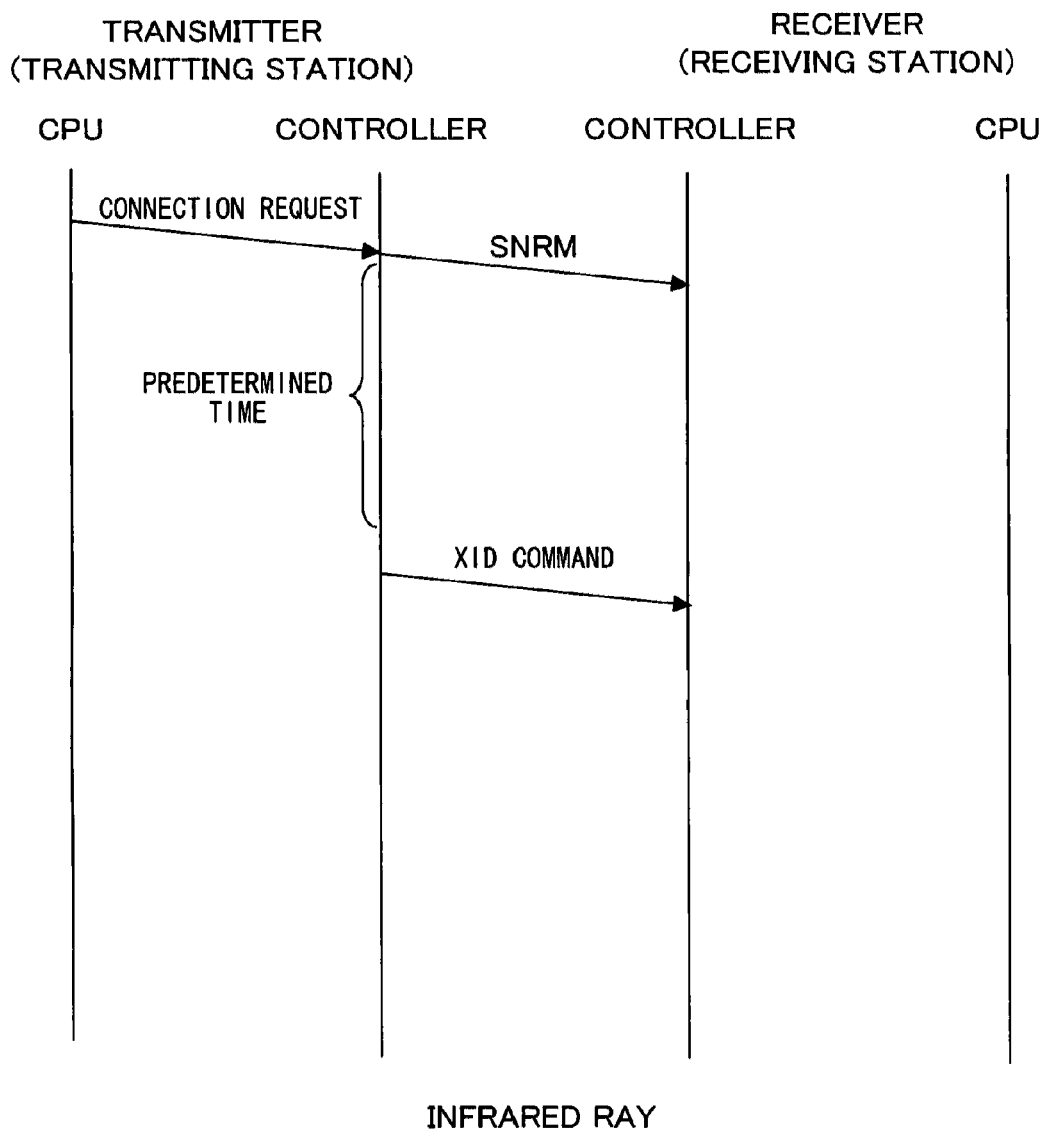
FIG. 8 is a signal sequence diagram illustrating transmission of an XID command subsequent to transmission of the SNRM command in the transmitter.

As shown in FIG. 8, after receiving a connection request from a CPU 31, the control section 331 causes a command packet generation section 332 to generate, as a first packet, an SNRM packet including parameters such as maximum transferable speed and maximum receivable data length of the transmitter, and causes a transmission section 34 to transmit the SNRM packet.

Further, at the same time as the transmission, the control section 331 starts the timer 37. When the transmitter 3 does not receive a UA response from the receiver 2 within a predetermined time, the control section 331 causes the command packet generation section 332 to generate an XID command and cause the transmission section 34 to transmit the XID command.

Figure 9:
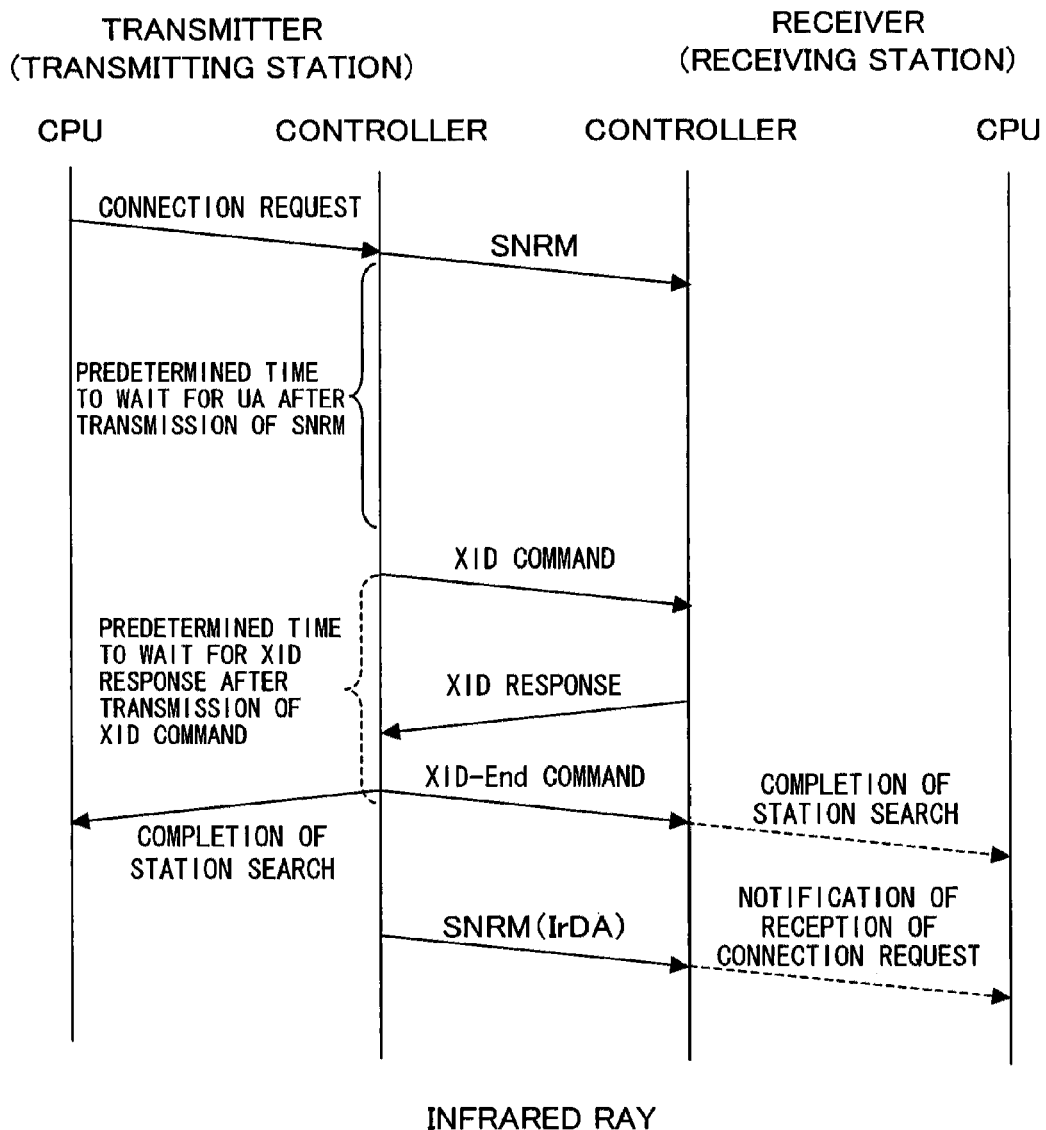
FIG. 9 is a signal sequence diagram illustrating a start of IrDA connection subsequent to transmission of the SNRM command and the XID command in the transmitter and the receiver.

At the same time as the transmission of the XID command, the control section 331 starts the timer 37. When the transmitter 3 receives an XID response from the receiver 2 within a predetermined time, the control section 331 causes the command packet generation section 332 to generate an XID-End command and transmits it, informing the CPU 31 of completion of searching a station. Subsequently, an SNRM command in IrDA is generated and transmitted, and a process for connection in IrDA is entered. A signal sequence of this case is shown in FIG. 9.

Figure 10:
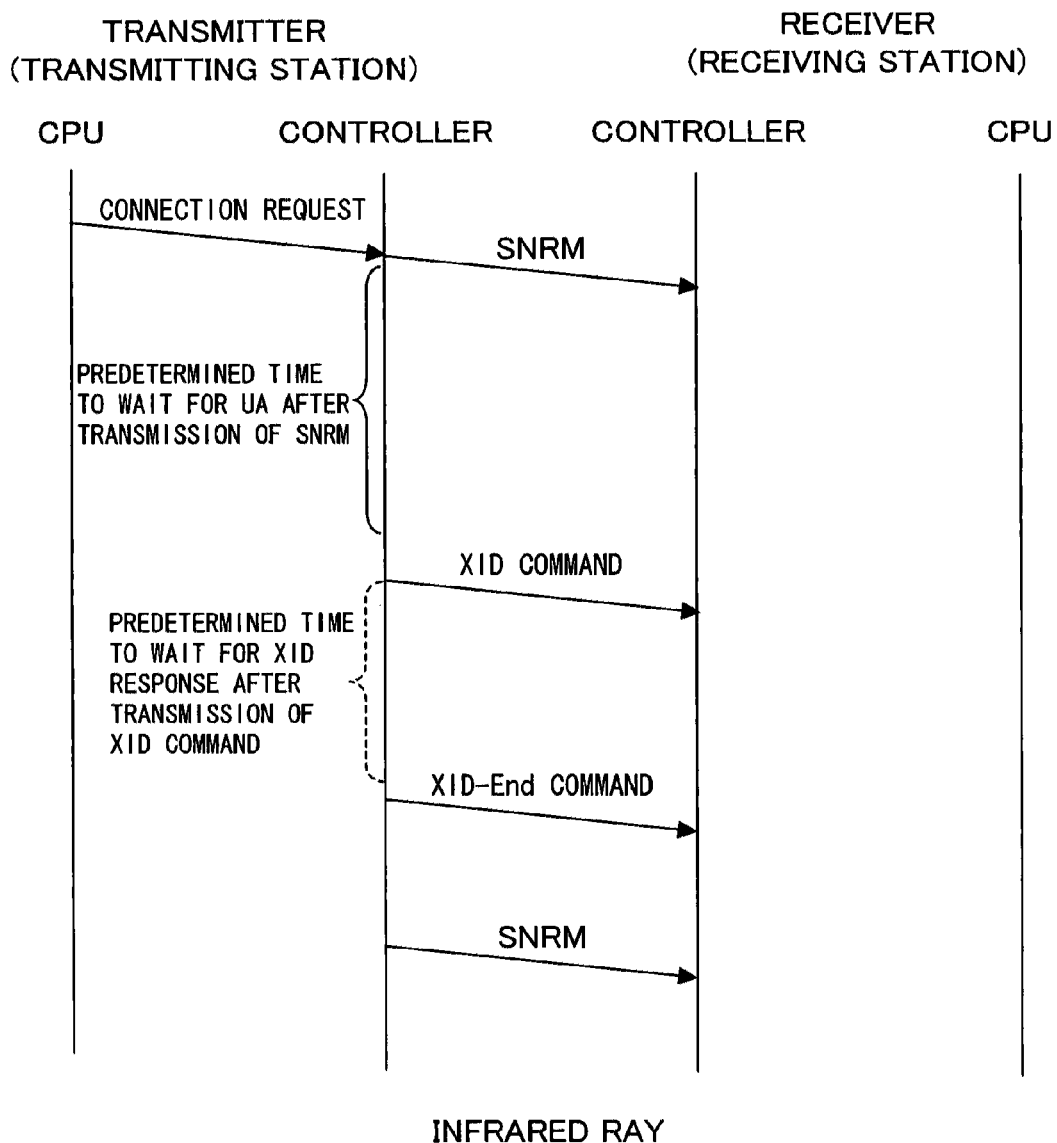
FIG. 10 is a signal sequence diagram illustrating retransmission of an SNRM command subsequent to transmission of the SNRM command and the XID command in the transmitter.

At the same time as the transmission of the XID command, the control section 331 starts the timer 37. When the transmitter 3 does not receive an XID response from the receiver within a predetermined time, the control section 331 causes the command packet generation section 332 to generate an XID-End command and transmits it, and then causes the command packet generation section 332 to regenerate and transmits an SNRM command including parameters such as maximum transferable speed and maximum receivable data length of the transmitter 3. A signal sequence of this case is shown in FIG. 10.

Embodiment 8

Figure 11:
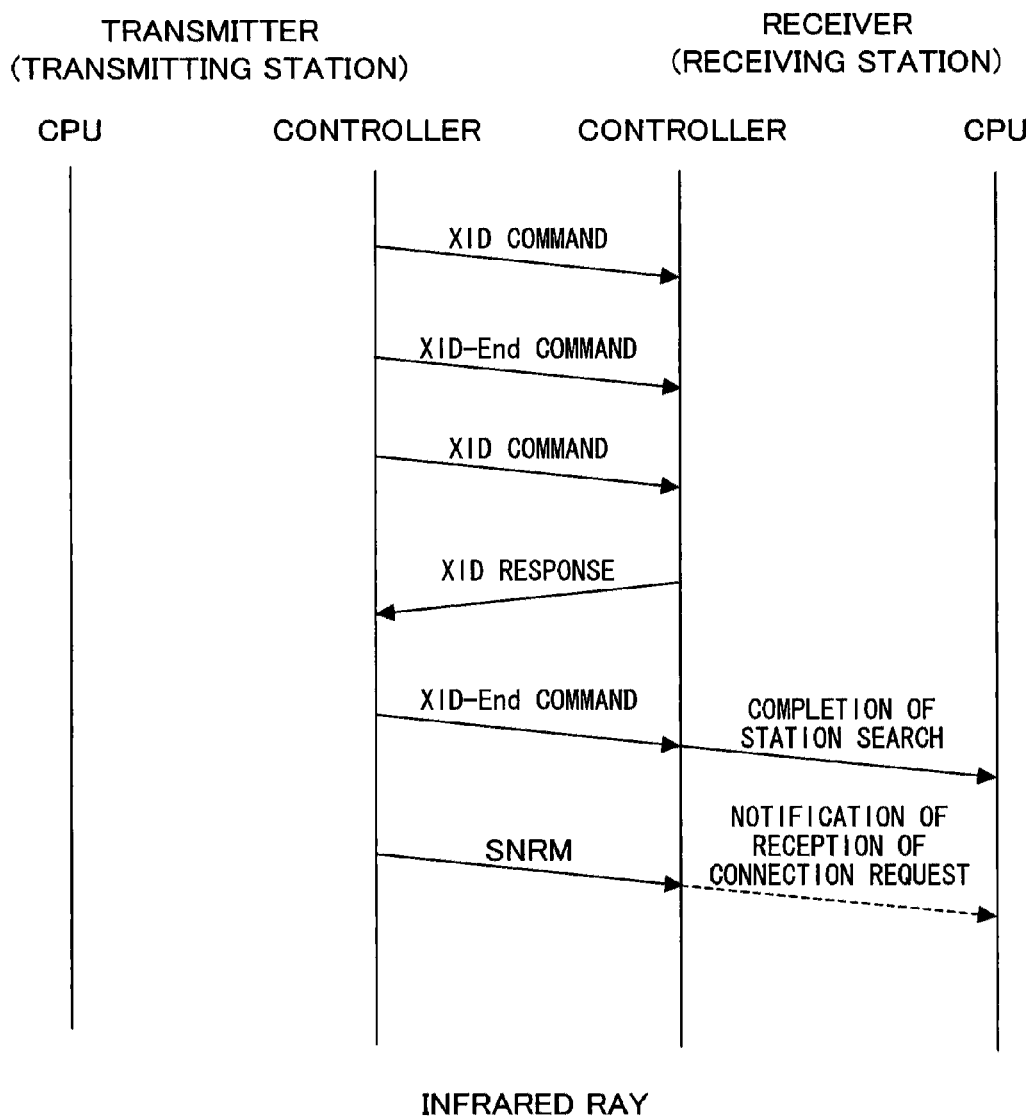
FIG. 11 is a signal sequence diagram illustrating continuous reception of XID commands and normal IrDA connection in the transmitter and the receiver.

FIG. 2 shows a receiver 2 of the present embodiment. In a case where a reception section 25 receives a first command and a packet identification section 233 identifies the first command as an XID command in the receiver 2, when an XID slot indicates 1 in a Discovery-Flag area in a command in FIG. 19, a control section 231 stores reception of the XID command and wait to receive a next command, instead of transmitting an XID response. This is because: in an existing IrDA standard, an XID of 1 slot is in compliance with the IrDA standard, and accordingly it is impossible at this stage to judge whether the other station is an existing IrDA device or a device of the present invention. When a station-search command which was received next to the first command is not an XID-End command but an XID command, the process goes to a connection process in IrDA. A signal sequence of this case is shown in FIG. 11.

Figure 12:
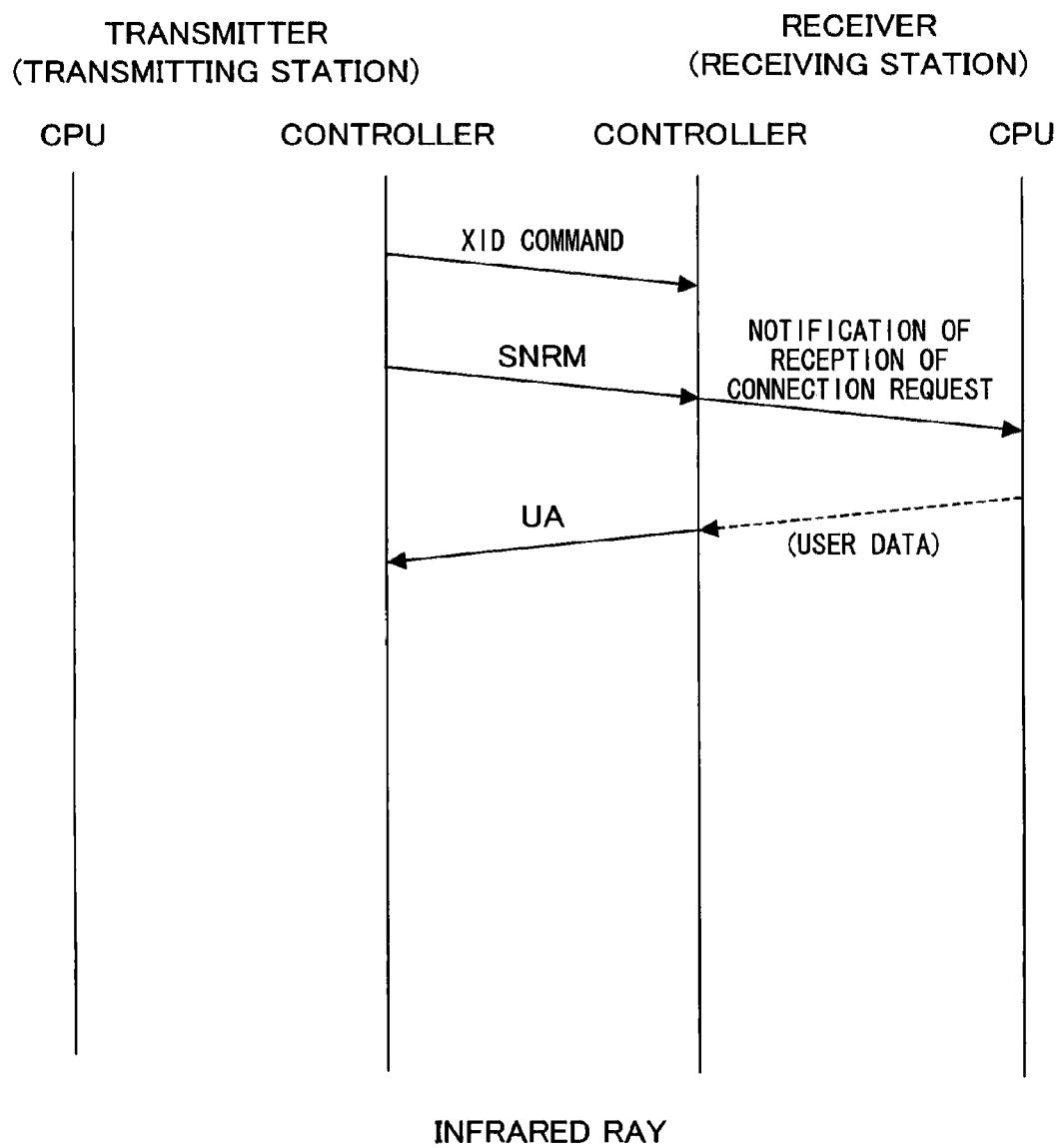
FIG. 12 is a signal sequence diagram illustrating continuous reception of an XID command and an SNRM command and transmission of a UA response in the transmitter and the receiver.

In a case where the reception section 25 receives a first command and the packet identification section 233 identifies the first command as an XID command, when an SNRM command is received next to the first command, the control section 231 informs the CPU 21 of reception of the SNRM command. In an existing IrDA standard, searching of a station is not completed until an XID response to an XID command is received. Therefore, when an SNRM command is received after an XID command, it is possible to judge that the other station is not an existing IrDA device. Accordingly, the command packet generation section 232 generates a UA response and transmits it. When user data to be included in the UA response exists, it is possible to cause the CPU 21 to transmit the data to the control section 231 and cause the data to be included in the UA response. A signal sequence of this case is shown in FIG. 12.

In a case where the reception section 25 receives a first command and the packet identification section 233 identifies the first command as an XID command, when an XID slot indicates 6, 8, or 16 other than 1 in a Discovery-Flag area in a command shown in FIG. 19, the command packet generation section 232 generates an XID response based on a rule predetermined in IrDA, and the XID response is transmitted.

Embodiment 9

FIGS. 1 and 3 show transmitters 1 and 3, respectively, of the present embodiment. FIG. 2 shows a receiver 2 of the present embodiment. The receiver 2 does not necessarily include the command packet generation section 232 and the transmitter 24.

Figure 13:
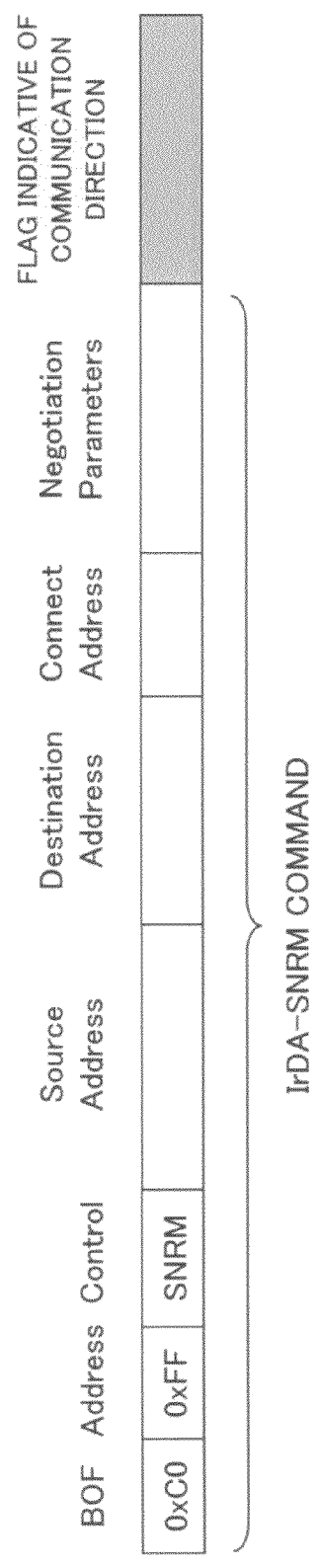
FIG. 13 is a block diagram illustrating an SNRM command in IrDA to which information indicative of a communication direction is added in the transmitter.
Figure 14:
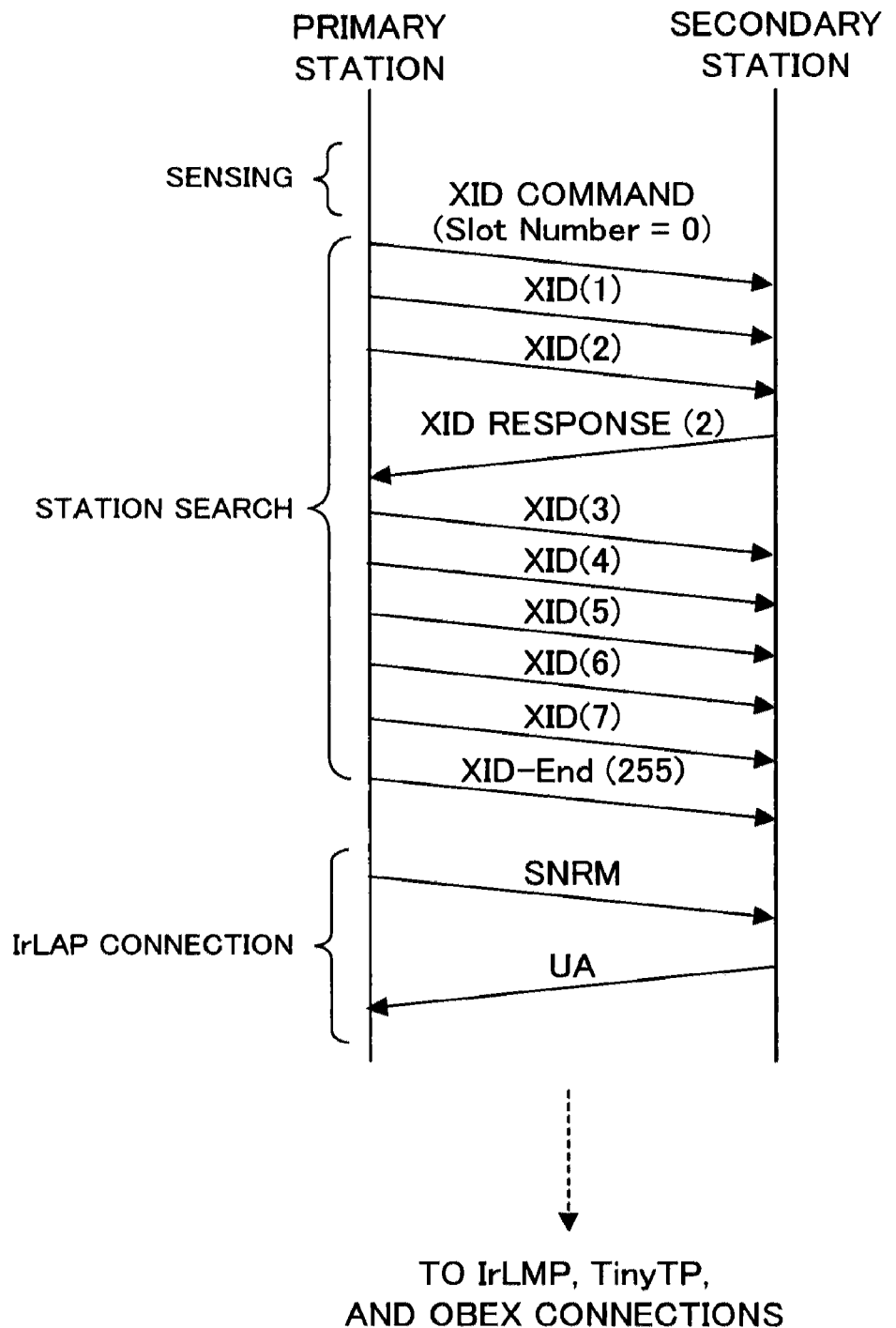
FIG. 14 is a signal sequence diagram illustrating a connection procedure of IrLAP in IrDA in the transmitter and the receiver.
Figure 15:
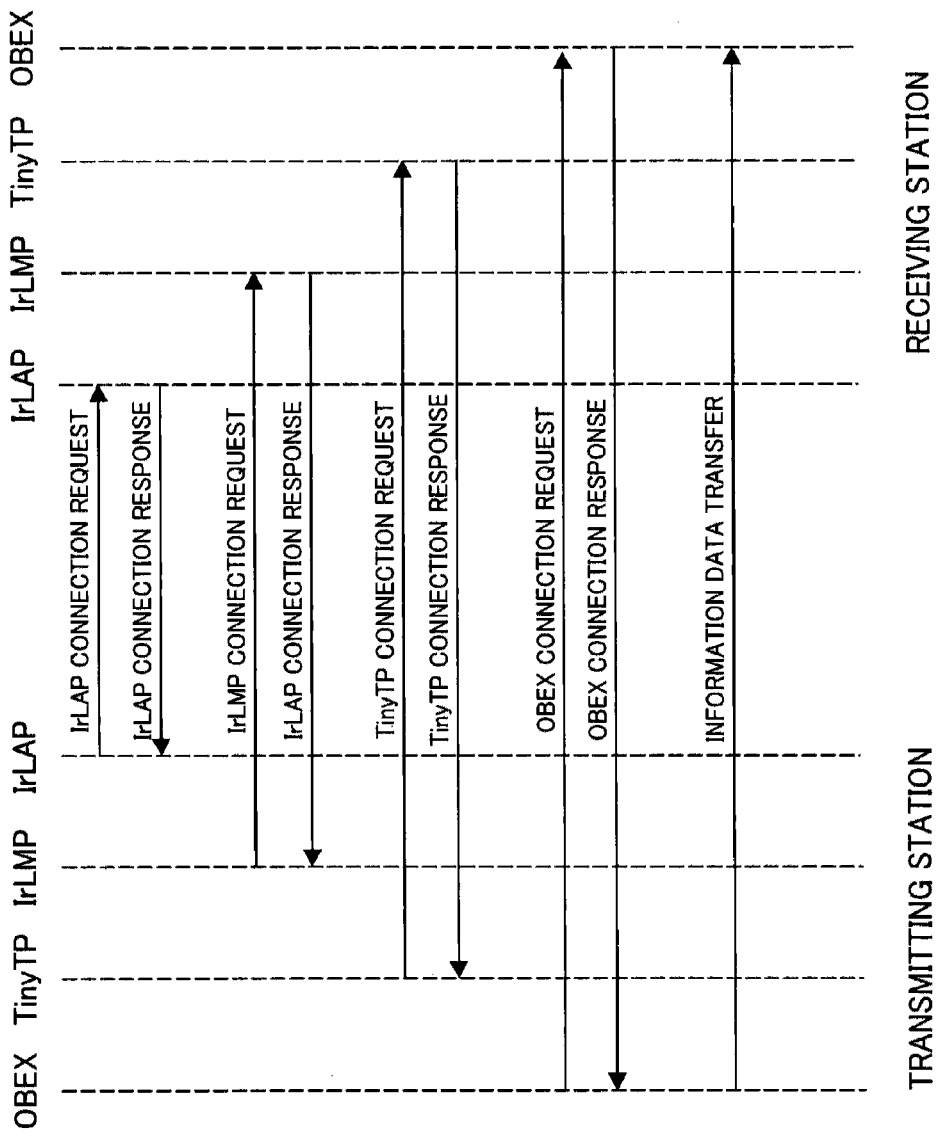
FIG. 15 is a signal sequence diagram illustrating a connection procedure until data transmission in IrDA is performed in the transmitter and the receiver.
Figure 16:
FIG. 16 is a block diagram illustrating a frame structure of the IrDA.

FIG. 13 shows a packet obtained by adding, to an SNRM command in IrDA, a flag area for indicating whether a communication direction is one-way or two-way. The position of the area is not limited to the position shown in FIG. 13. The area may be positioned in Negotiation Parameters for example. In the present embodiment, data indicative of a communication direction as well as setting values (parameters) such as maximum transferable speed and maximum receivable data length of the transmitter are included in the SNRM command to be transmitted.

Figure 17:
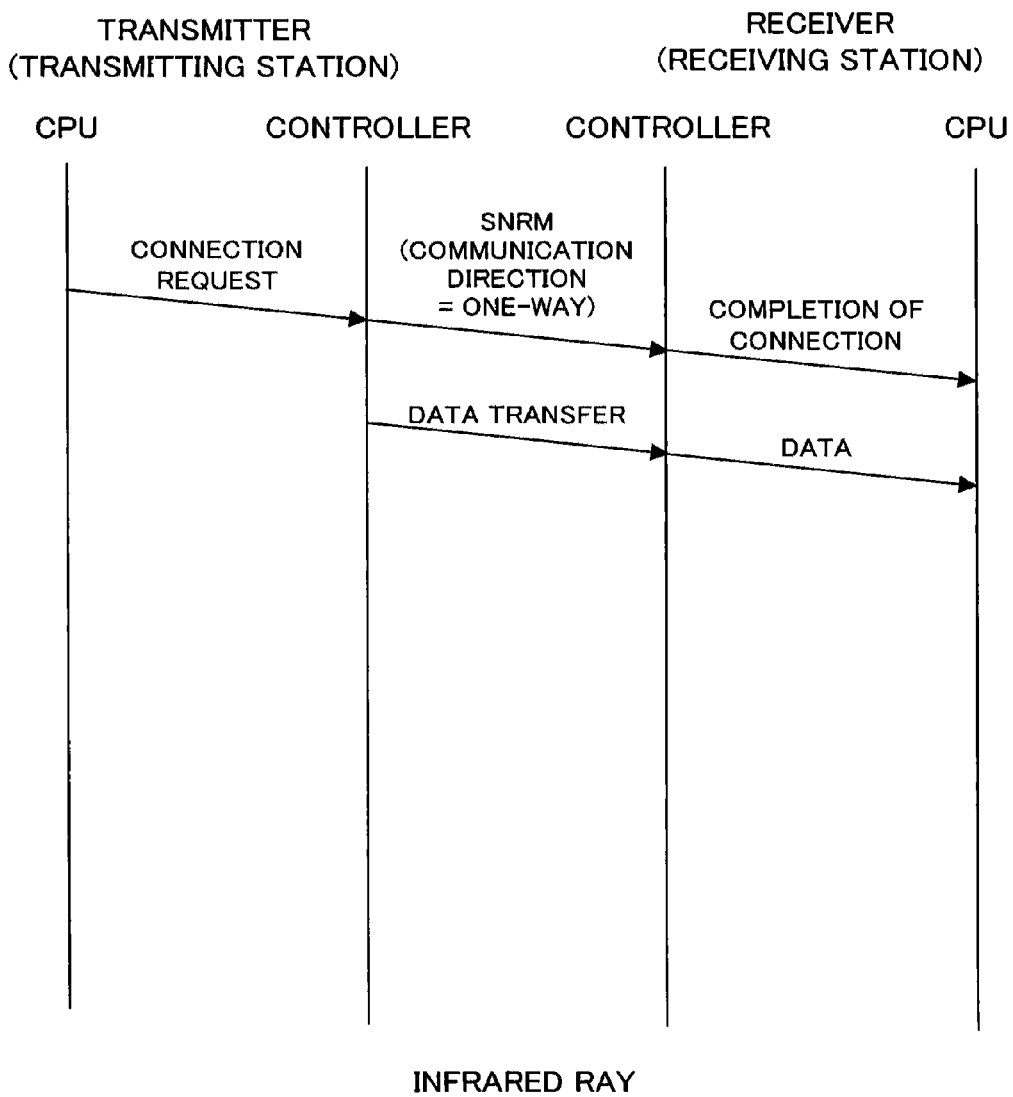
FIG. 17 is a signal sequence diagram illustrating a connection procedure of one-way connection in the transmitter and the receiver.

As shown in FIG. 17, the transmitter 1 or 3 transmits an SNRM command in which a flag indicative of a communication direction indicates one-way, and starts data transmission using an I frame or a UI frame without waiting for a UA response from the receiver 2. When the flag indicative of a communication direction is positioned in the SNRM command, a format including a parameter identifier (PI), a parameter length (PL), and a parameter value (PV) shown in FIG. 6(d) is used as the flag, and the parameter identifier is set to the other station beforehand. Consequently, after receiving the SNRM command, a station can know whether the other station requires one-way communication or two-way communication by identifying the parameter identifier. As a result, the station can carry out a desired process.

On the other hand, after receiving the SNRM command, the receiver 2 waits data transmission using the I frame or the UI frame of the transmitter without transmitting a UA response. When the received SNRM command does not include the upper layer data, the receiver 2 regards the SNRM command as an invalid connection request and does not enter a state for waiting data transmission. Alternatively, when a CONNECT command in OBEX is not included in the upper layer data, the receiver 2 regards the SNRM command as an invalid connection request and does not enter a state for waiting data transmission.

One-way communication realized by the above method is applicable to a case where: data transmission needs little time, a user can easily recognize data transmission error, and the user can carry out again transmission of the data. For example, a case where the user transmits image data from an information terminal to an image display device and see the image. The user can recognize data transmission error when, for example, image data transmitted by the user is not displayed by an image display device at a receiving end, or an image different from an image transmitted by the user is displayed.

The transmitter 1 in FIG. 1 is applicable only to one-way communication. The transmitter 3 in FIG. 3 is applicable both to one-way communication and two-way communication.

Embodiment 10

Further, in the receiver 2 shown in FIG. 2, in a case where a connection with the other station is established using any one of the methods of the present invention, when a disconnection request comes from an upper layer managed by the CPU 21, disconnection request data is transmitted to the control section 231 via the memory 22. The control section 231 transmits the disconnection request data to the packet generation section 232, the packet generation section 232 puts this user data in a DM response, and the transmission section 24 transmits the DM response. The disconnection request is issued at a time when, for example, a user selects disconnection of communication. However, the example is not limited to this case. An example of the disconnection request data is an Internal Server Error response in OBEX. However, the disconnection request data is not limited to this.

Further, a new parameter identifier is set to the upper layer data in FIG. 7(c) and the upper layer data is set as a parameter as shown in FIG. 6(d), so that it is possible for an existing IrDA reception circuit to easily know the position, the length, and the contents of the upper layer data and to perform a process using the parameter.

Embodiment 11

With reference to FIG. 20, the present embodiment explains a case where the communication methods explained in the above embodiments are applied to a communication between mobile phones.

In the present embodiment, the mobile phones are respectively used for a transmitter and a receiver. However, only either one of the transmitter and the receiver may be a mobile phone. That is, when either one of the transmitter and the receiver is a mobile phone, the other device may not be a mobile phone as long as data transmission and reception can be carried out therebetween via an infrared ray or the like in accordance with any one of the aforementioned communication methods of the present invention.

FIG. 20 illustrates that the mobile phone A transmits data therein to the mobile phone B by using an infrared ray. When the mobile phone B receives the data from the mobile phone A, the mobile phone B stores the received data in either a built-in memory thereof or an external memory connected thereto. Examples of the data include text data, image data, audio data, telephone directory data, system information, and the like, and the data is not limited to one complying with a specific format. Further, the data stored in the mobile phone A may be either (i) data stored in a built-in memory of the mobile phone A or (ii) data stored in an external memory (a non-volatile memory such as an SD card) connected to the mobile phone A.

Upper layer data is positioned in an SNRM command and a UA response, and the SNRM command and the UA response are transmitted using the above connection methods. Consequently, it is possible to transmit the upper layer to the other station using only one packet. Therefore, it is possible to complete connection in a shorter time compared with a conventional connection method in IrDA using plural packets. This shortens a time for a user to point a device at the other station compared with a conventional IrDA communication. For that reason, the present invention is expected to increase user-friendliness and to decrease the possibility of generation of errors.

Embodiment 12

With reference to FIG. 21, the present embodiment explains a case where the communication methods explained in the above embodiments are applied to a communication between a mobile phone and a display device. In the present embodiment, a transmitter is a mobile phone. However, the transmitter may not be a mobile phone as long as data transmission can be carried out via an infrared ray or the like in accordance with any one of the aforementioned methods of the present invention.

FIG. 21 illustrates that a mobile phone A transmits data therein to a display device B (e.g. TVs, monitors, and the like) by using an infrared ray. The display device B carries out an appropriate process with respect to the data sent from the mobile phone A, in order to carry out display. For example, in a case where the data from the mobile phone A is image data, the image data is decompressed if necessary for the sake of carrying out the display. However, the present invention is not limited to this. Further, examples of the data include text data, image data, audio data, telephone directory data, system information, and the like, and the data is not limited to one complying with a specific format. Further, the data stored in the mobile phone A may be either (i) data stored in a built-in memory of the mobile phone A or (ii) data stored in an external memory (a non-volatile memory such as an SD card) connected to the mobile phone A.

Upper layer data is positioned in an SNRM command and a UA response, and the SNRM command and the UA response are transmitted using the above connection methods. Consequently, it is possible to transmit the upper layer to the other station using only one packet. Therefore, it is possible to complete connection in a shorter time compared with a conventional connection method in IrDA using plural packets. This shortens a time for a user to point a device at the other station compared with a conventional IrDA communication. For that reason, the present invention is expected to increase user-friendliness and to decrease the possibility of generation of errors.

Embodiment 13

With reference to FIG. 22, the present embodiment explains a case where the communication methods explained in the above embodiments are applied to a communication between a mobile phone and a printing device. In the present embodiment, a transmitter is a mobile phone. However, the transmitter may not be a mobile phone as long as data transmission can be carried out via an infrared ray or the like in accordance with any one of the aforementioned methods of the present invention.

FIG. 22 illustrates that the mobile phone A transmits data therein to the printing device B by using an infrared ray. The printing device B carries out an appropriate process with respect to the data sent from the mobile phone A, in order to carry out printing. For example, in a case where the data from the mobile phone A is image data, the image data is decompressed if necessary for the sake of carrying out the printing. However, the present invention is not limited to this. Further, examples of the data include text data, image data, audio data, telephone directory data, system information, and the like, and the data is not limited to one complying with a specific format. Further, the data stored in the mobile phone A may be either (i) data stored in a built-in memory of the mobile phone A or (ii) data stored in an external memory (a non-volatile memory such as an SD card) connected to the mobile phone A.

Upper layer data is positioned in an SNRM command and a UA response, and the SNRM command and the UA response are transmitted using the above connection methods. Consequently, it is possible to transmit the upper layer to the other station using only one packet. Therefore, it is possible to complete connection in a shorter time compared with a conventional connection method in IrDA using plural packets. This shortens a time for a user to point a device at the other station compared with a conventional IrDA communication. For that reason, the present invention is expected to increase user-friendliness and to decrease the possibility of generation of errors.

Embodiment 14

With reference to FIG. 23, the present embodiment explains a case where the communication methods explained in the above embodiments are applied to a communication between a mobile phone and a recording device. In the present embodiment, a transmitter is a mobile phone. However, the transmitter may not be a mobile phone as long as data transmission can be carried out via an infrared ray or the like in accordance with any one of the aforementioned methods of the present invention.

FIG. 23 illustrates that the mobile phone A transmits data therein to the recording device B by using an infrared ray. The recording device B carries out an appropriate process with respect to the data sent from the mobile phone A. For example, in a case where the data from the mobile phone A is image data, the image data is recorded in a memory of the recording device B or recorded in an external memory connected to the recording device B. The memory of the recording device B may be any medium as long as it is capable of storing data temporarily or semi-permanently. Examples of the memory include: a volatile memory such as an SDRAM; a non-volatile memory such as a flash memory; a recordable DVD; and a HD drive. Further, examples of the data include text data, image data, audio data, telephone directory data, system information, and the like, and the data is not limited to one complying with a specific format. Further, the data stored in the mobile phone A may be either (i) data stored in a built-in memory of the mobile phone A or (ii) data stored in an external memory (a non-volatile memory such as an SD card) connected to the mobile phone A.

Upper layer data is positioned in an SNRM command and a UA response, and the SNRM command and the UA response are transmitted using the above connection methods. Consequently, it is possible to transmit the upper layer to the other station using only one packet. Therefore, it is possible to complete connection in a shorter time compared with a conventional connection method in IrDA using plural packets. This shortens a time for a user to point a device at the other station compared with a conventional IrDA communication. For that reason, the present invention is expected to increase user-friendliness and to decrease the possibility of generation of errors.

Embodiment 15

Figure 24:
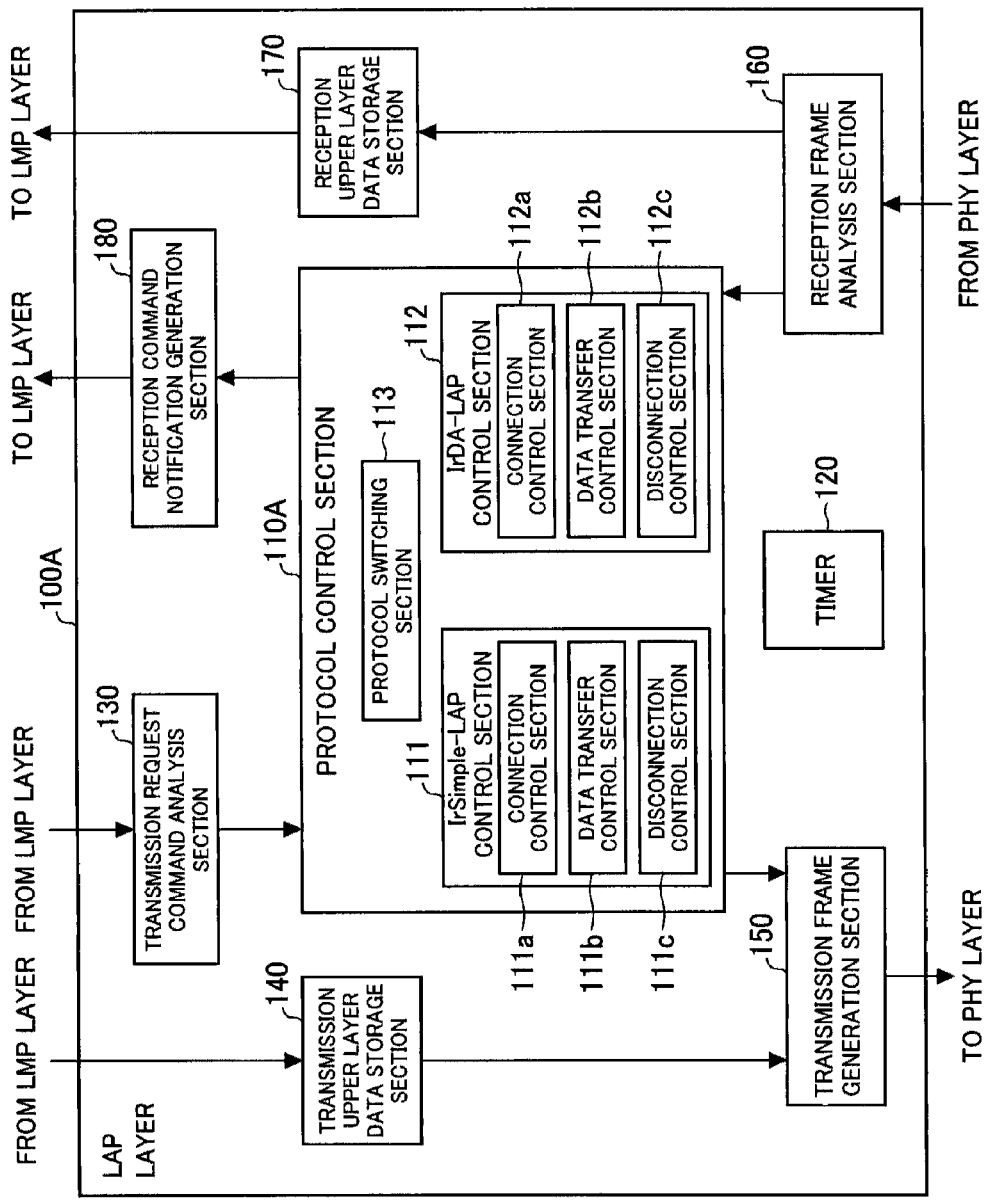
FIG. 24 is a functional block diagram illustrating an LAP layer of a communication device including both functions of IrSimple (two-way communication) and IrDA.

With reference to FIGS. 24 to 27, the present embodiment details a function of an LAP layer for realizing the communication methods explained in the above embodiments.
(1) Case of IrSimple Two-Way Communication+IrDa Communication FIG. 24 is a functional block diagram illustrating an LAP layer 100A of a communication device including both functions of IrSimple (two-way communication) and IrDA.

The LAP layer 100A includes a protocol control section 110A, a timer 120, a transmission request command analysis section 130, a transmission upper layer data storage section 140, a transmission frame generation section 150, a reception frame analysis section 160, a reception upper layer data storage section 170, and a reception command notification generation section 180.

The protocol control section 110A controls a protocol of the LAP layer. For that reason, the protocol control section 110A includes an IrSimple-LAP control section (first protocol control section) 111, an IrDA-LAP control section (second protocol control section) 112, and a protocol switching section 113.

The IrSimple-LAP control section 111 carries out a communication using an IrSimple-LAP protocol. For that reason, the IrSimple-LAP control section 111 includes a connection control section 111a, a data transmission control section 111b, and a disconnection control section 111c. The connection control section 111a carries out a connection process using the IrSimple-LAP protocol. The data transmission control section 111b carries out data transmission using the IrSimple-LAP protocol. The disconnection control section 111c carries out a disconnection process using the IrSimple-LAP protocol. At a time of connection, the IrSimple-LAP control section 111 causes the connection control section 111a to carry out a connection process. At a time of data transmission, the IrSimple-LAP control section 111 causes the data transmission control section 111b to carry out data transmission. At a time of disconnection, the IrSimple-LAP control section 111 causes the disconnection control section 111c to carry out a disconnection process.

The IrDA-LAP control section 112 performs a communication using an IrDA-LAP protocol. For that reason, the IrDA-LAP control section 112 includes a connection control section 112a, a data transmission control section 112b, and a disconnection control section 112c. The connection control section 112a carries out a connection process using the IrDA-LAP protocol. The data transmission control section 112b carries out data transmission using the IrDA-LAP protocol. The disconnection control section 112c carries out a disconnection process using the IrDA-LAP protocol. At a time of connection, the IrDA-LAP control section 112 causes the connection control section 112a to carry out a connection process. At a time of data transmission, the IrDA-LAP control section 112 causes the data transmission control section 112b to carry out data transmission. At a time of disconnection, the IrDA-LAP control section 112 causes the disconnection control section 112c to carry out a disconnection process.

The protocol switching section 113 switches between the IrSimple-LAP control section 111 and the IrDA-LAP control section 112. Specifically, in a case of a transmitter (primary station), the protocol switching section 113 initially causes the IrSimple-LAP control section 111 to operate. After receiving an XID response which is sent in response to a station-search command subsequent to an SNRM command (connection request command), the protocol switching section 113 switches to the IrDA-LAP control section 112. Further, in a case of a receiver (secondary station), the protocol switching section 113 initially causes the IrSimple-LAP control section 111 to operate. After continuously receiving XID commands (1 slot) each of which is a station-search command, or after receiving an XID command (other than 1 slot), the protocol switching section 113 switches to the IrDA-LAP control section 112 after transmission of an XID response and then reception of an XID-End. Both in cases of the primary section and the secondary section, if communication is disconnected, the protocol switching section 113 switches to the IrSimple-LAP control section 111 again so that a connection using the IrSimple-LAP protocol is carried out.

The timer 120 is controlled by the protocol control section 110A. The timer 120 is used, for example, at a time when the protocol control section 110A checks time-out.

The transmission request command analysis section 130 analyzes a transmission request command from an upper layer (LMP layer). Examples of the transmission request command include a connection request, a data transmission request, and a disconnection request. The protocol control section 130 is informed of a result of the analysis.

The transmission upper layer data storage section 140 stores transmission data from an upper layer (LMP layer). The stored data is transmitted to the transmission frame generation section 150 and is positioned in the transmission frame.

The transmission frame generation section 150 generates a transmission frame to be transmitted to a lower layer (PHY layer). The transmission frame is generated based on the data from the transmission upper layer data storage section 140. In a case of the primary station, examples of the transmission frame include an SNRM command (connection request), a UI command (data transmission request), and a DISC command (disconnection request). In a case of the secondary station, examples of the transmission frame include a UA response (connection response and disconnection response) and a UI response (data transmission response).

The reception frame analysis section 160 analyzes a reception frame from the lower layer (PHY layer), and informs the protocol control section 110A of a result of the analysis. Further, the reception frame analysis section 160 stores, in the reception upper layer data storage section 170, upper layer data which was extracted in the analysis.

The reception upper layer data storage section 170 stores the upper layer data which was analyzed and extracted by the reception frame analysis section 160. The stored data is transmitted to the upper layer (LMP layer).

The reception command notification generation section 180 generates a reception command in response to a reception command notification generation request from the protocol control section 110A, and informs the upper layer (LMP layer) of the reception command. Examples of the reception command include a connection request reception command, a data transmission request reception command, and a disconnection request reception command.

(2) Case of IrSimple Two-Way Communication (Including One-Way Transmission and One-Way Reception)

Figure 25:
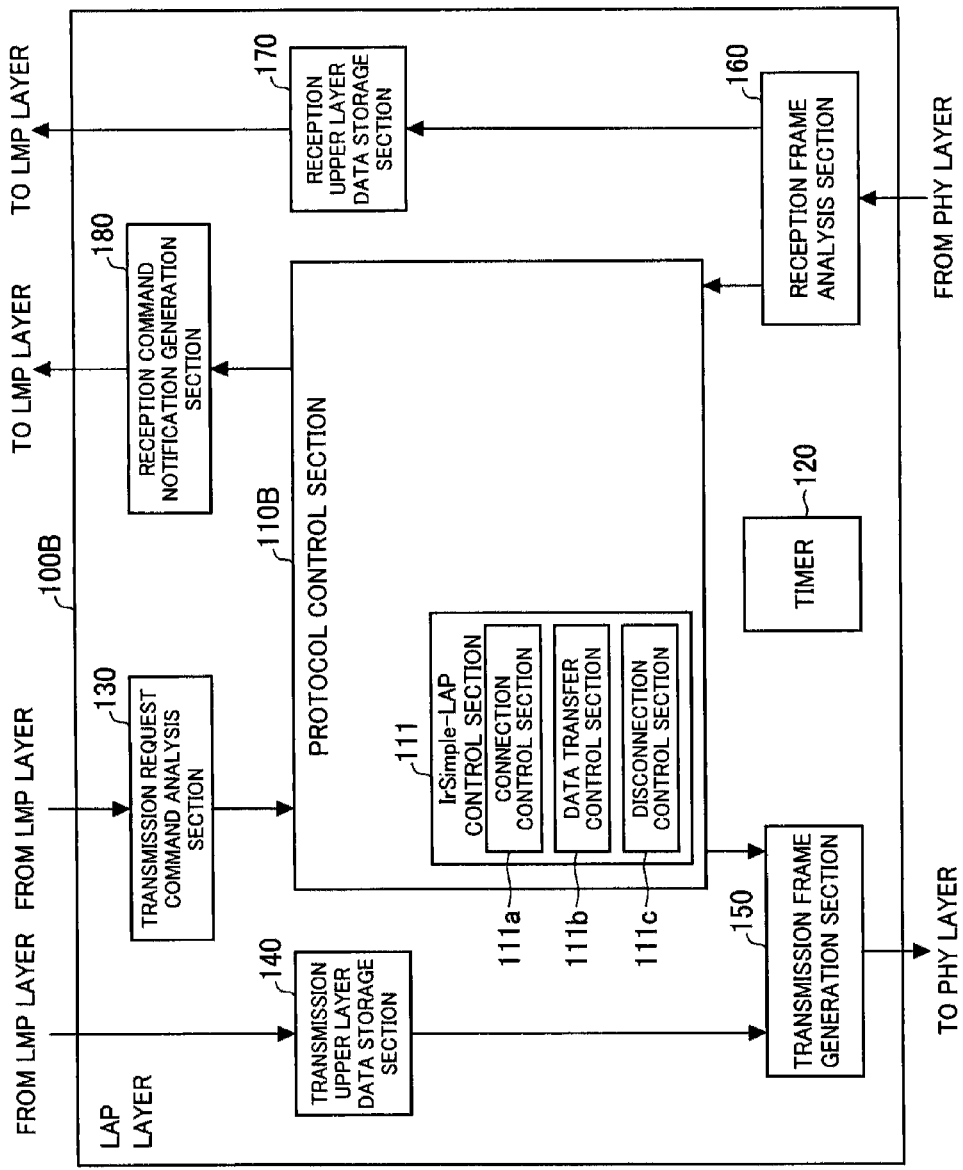
FIG. 25 is a functional block diagram illustrating an LAP layer of a communication device including only a function of IrSimple (including a function of one-way transmission/one-way reception).

FIG. 25 is a functional block diagram illustrating an LAP layer 100B of a communication device including only a function of IrSimple (including one-way transmission and one-way reception).

The LAP layer 100B includes a protocol control section 110B, a timer 120, a transmission request command analysis section 130, a transmission upper layer data storage section 140, a transmission frame generation section 150, a reception frame analysis section 160, a reception upper layer data storage section 170, and a reception command notification generation section 180. That is, the LAP layer 100B is different from the LAP layer 100A in that the LAP layer 100B includes the protocol control section 110B instead of the protocol control section 110A.

The protocol control section 110B controls a protocol of an LAP layer. For that reason, the protocol control section 110B includes an IrSimple-LAP control section 111. That is, the protocol control section 110B does not include the IrDA-LAP control section 112 and the protocol switching section 113 which are included in the protocol control section 110A.

The LAP layer 100B is identical with the LAP layer 100A except for the above points. Therefore, explanations of the LAP layer 100B are omitted here.

(3) Case of IrSimple One-Way Transmission

Figure 26:
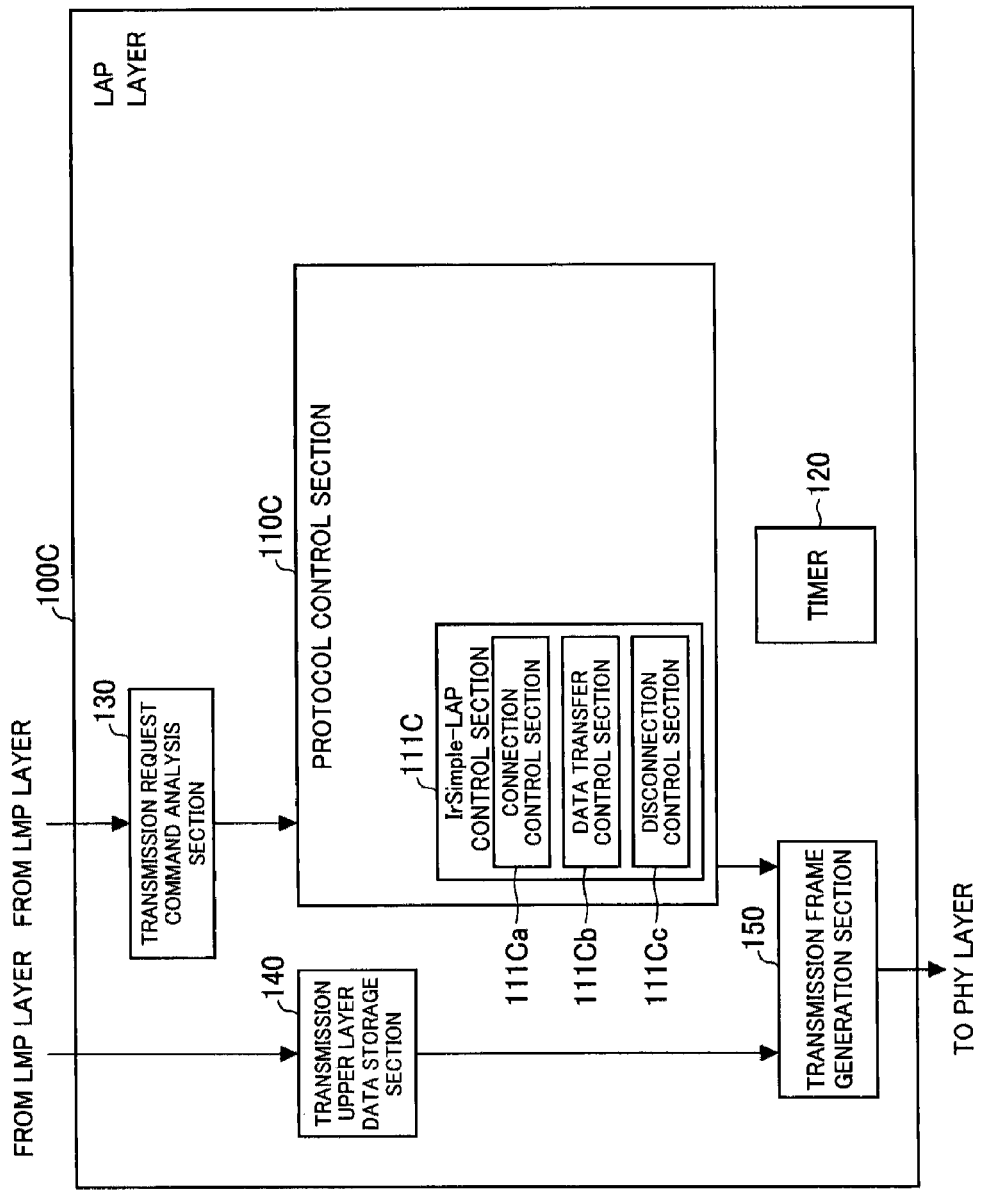
FIG. 26 is a functional block diagram illustrating an LAP layer of a communication device including only a function of an IrSimple one-way transmission.

FIG. 26 is a functional block diagram illustrating an LAP layer 100C of a communication device including only a function of an IrSimple one-way transmission.

The LAP layer 100C includes a protocol control section 110C, a timer 120, a transmission request command analysis section 130, a transmission upper layer data storage section 140, and a transmission frame generation section 150. That is, the LAP layer 100C is different from the LAP layer 100A in that the LAP layer 100C includes the protocol control section 110C instead of the protocol control section 110A, and the LAP layer 100C does not include the reception frame analysis section 160, the reception upper layer data storage section 170, and the reception command notification generation section 180 which are functions at a receiving end.

The protocol control section 110C controls a protocol of an LAP layer in a transmitter. For that reason, the protocol control section 110C includes an IrSimple-LAP control section 111C. That is, the protocol control section 110C does not include the IrDA-LAP control section 112 and the protocol switching section 113 which are included in the protocol control section 110A. Note that, the IrSimple-LAP control section 111C includes only a transmission function in IrSimple. That is, the IrSimple-LAP control section 111C includes a connection control section 111Ca, a data transmission control section 111Cb, and a disconnection control section 111Cc, which perform a connection process, a data transmission process, and a disconnection process, respectively, in the transmitter.

The LAP layer 100C is identical with the LAP layer 100A except for the above points. Therefore, explanations of the LAP layer 100C are omitted here.

(4) Case of IrSimple One-Way Reception

Figure 27:
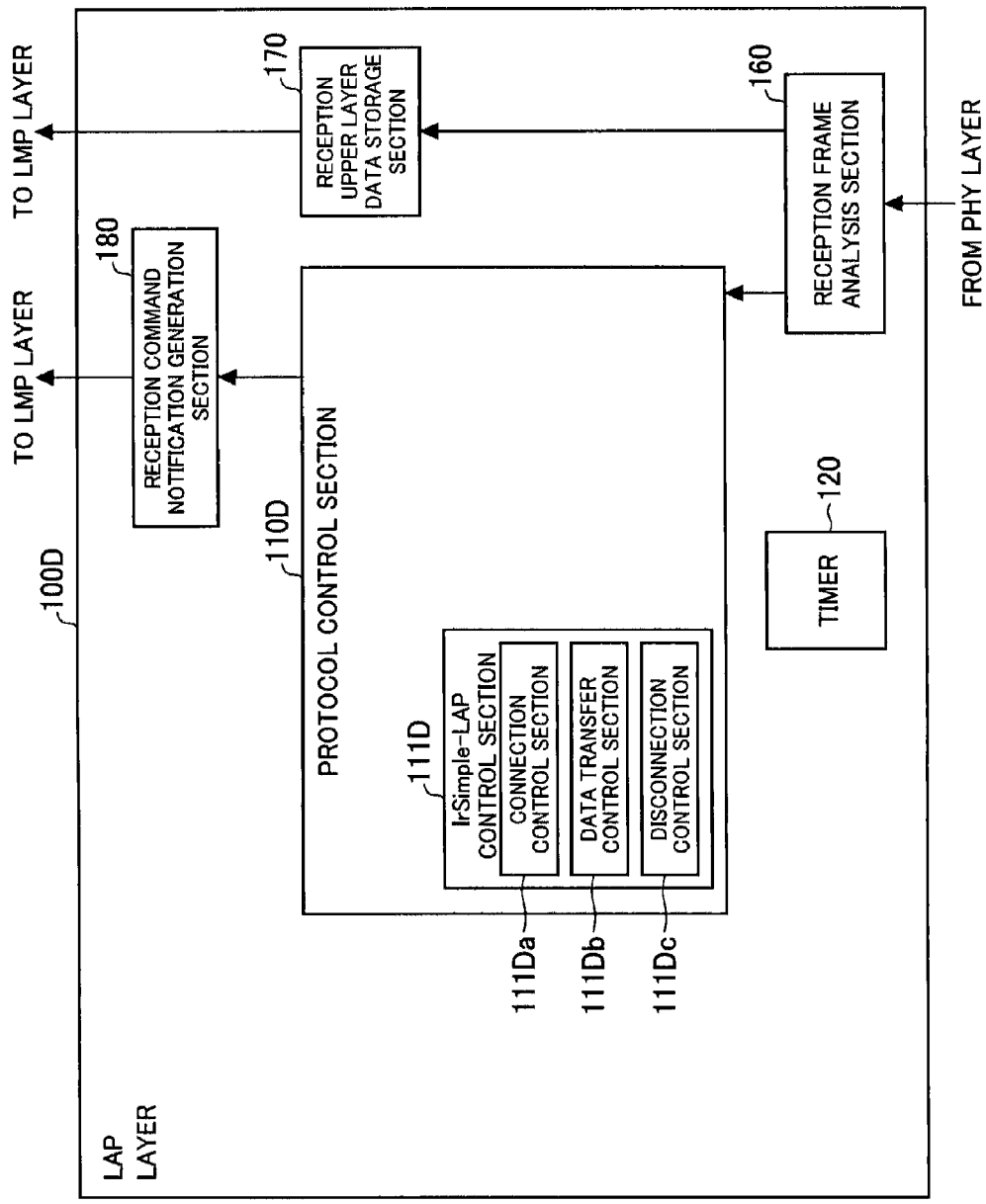
FIG. 27 is a functional block diagram illustrating an LAP layer of a communication device including only a function of an IrSimple one-way reception.

FIG. 27 is a functional block diagram illustrating an LAP layer 100D of a communication device including only a function of an IrSimple one-way reception.

The LAP layer 100D includes a protocol control section 110D, a timer 120, a reception frame analysis section 160, a reception upper layer data storage section 170, and a reception command notification generation section 180. That is, the LAP layer 100D is different from the LAP layer 100A in that the LAP layer 100D includes the protocol control section 110D instead of the protocol control section 110A, and the LAP layer 100D does not include the transmission request command analysis section 130, the transmission upper layer data storage section 140, and the transmission frame generation section 150 which are functions at a transmitting end.

The protocol control section 110D controls a protocol of an LAP layer in a receiver. For that reason, the protocol control section 110D includes an IrSimple-LAP control section 111D. That is, the protocol control section 110D does not include the IrDA-LAP control section 112 and the protocol switching section 113 which are included in the protocol control section 110A. Note that, the IrSimple-LAP control section 111D includes only a reception function in IrSimple. That is, the IrSimple-LAP control section 111D includes a connection control section 111Da, a data transmission control section 111Db, and a disconnection control section 111Dc, which perform a connection process, a data transmission process, and a disconnection process, respectively, in the receiver.

The LAP layer 100D is identical with the LAP layer 100A except for the above points. Therefore, explanations of the LAP layer 100D are omitted here.

Embodiment 16

With reference to FIGS. 28 to 33, the present embodiment explains a combination of a protocol of a transmitter and a protocol of a receiver.

Figures 28, 29:
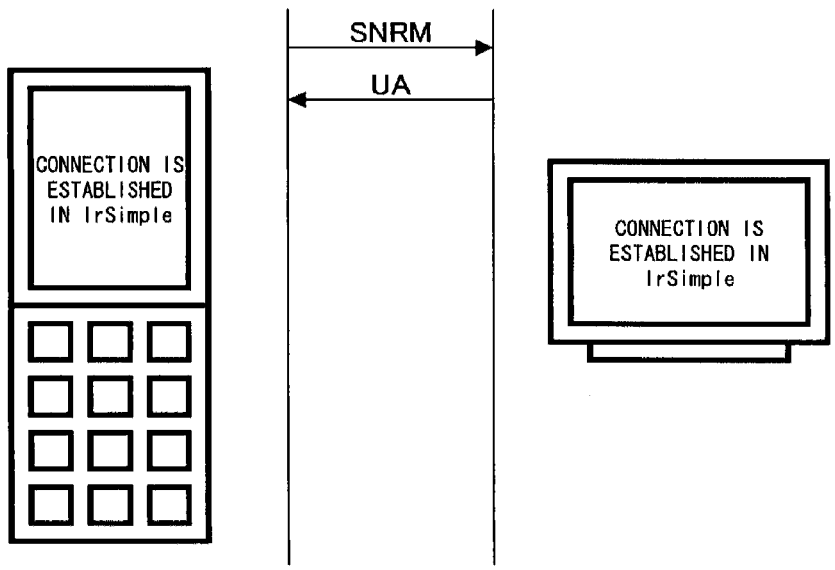
FIG. 28 is a table illustrating a relation between protocols of a transmitter and a receiver and a protocol after connection.
FIG. 29 is an explanatory drawing illustrating a connection procedure and examples of display of each device, in a case where a transmitter (mobile phone) and a receiver (display device such as TV) are both IrSimple two-way communication devices.

FIG. 28 is a table illustrating a relation between protocols of a transmitter and a receiver and a protocol after connection between the transmitter and the receiver has been established. As shown in FIG. 28, the protocol after the connection varies in accordance with what protocols the transmitter and the receiver support out of IrSimple two-way/one-way protocols and an IrDA protocol.

(Mobile Phone, Display Device, Recording Device, and Printing Device Using IrSimple-Lap)

In a case of data transmission from a transmitter such as a mobile phone to a receiver such as a display device, a recording device, and a printing device, there is a possibility that the mobile phone displays only a selection window via which a user selects infrared communication, and the mobile phone does not provide selections of protocols. Further, in general, a receiver such as a display device, a recording device, and a printing device only provides an interface via which a user makes infrared communication ON or OFF.

In a case where protocols of the transmitter and the receiver differ from each other under such circumstances, when a combination of protocols which allows for communication between the transmitter and the receiver can be selected, the transmitter and the receiver of the present invention switch protocols as described above. When a combination of protocols which allows for communication cannot be selected, for example, the transmitter and the receiver of the present invention notifies a user of a reason for unableness of communication between the transmitter and the receiver. Examples of the reason include: a connection request for a one-way communication device to carry out a two-way communication; and a connection request for a non-IrDA device to carry out an IrDA communication.

In a display device (e.g. mobile phone and TV), a printing device, and a recording device etc. having a display section, when connection is established, the display section displays a protocol used in the connection. When connection is not established, the display section not only displays that the connection is not established, but also displays the reason why the connection is not established. In this manner, notification of the reason for unableness of communication is performed. With the notification, a user can deal with the unableness properly (e.g. updating of firmware for supporting an unsupported communication protocol).

The following describes some examples. In the following, a display device such as a TV is taken for instance of a receiver. However, the receiver is not limited to the display device as long as it is a device having a display section capable of displaying texts. The receiver may be a printing device or a recording device for example. Further, a mobile phone is taken for instance of a transmitter. However, the transmitter is not limited to the mobile phone as long as it is a device having a display section capable of displaying texts. The transmitter may be a display device (e.g. TV), a printing device, or a recording device.

(1) Connection Between IrSimple Two-Way Communication Devices

FIG. 29 is an explanatory drawing illustrating a connection procedure and how each device displays, in a case where a transmitter (mobile phone) and a receiver (display device such as TV) are both IrSimple two-way communication devices.

Right after transmitting SNRM in an IrSimple protocol, the transmitter (mobile phone) receives UA. Consequently, the transmitter causes a display section to notify a user that a connection between the transmitter and the receiver in the IrSimple protocol has been established.

On the other hand, the receiver (display device such as TV) receives SNRM before an XID command, and thus recognizes that the transmitter is an IrSimple device. The receiver transmits UA, and thus establishes a connection in IrSimple. At that time, the receiver causes a display section to notify that a connection in IrSimple has been established.

With the above operation, the user can easily know a protocol after a connection between the transmitter and the receiver has been established.

Instead of displaying a connection protocol after a connection has been established, a communication protocol may be notified after communication has been finished, using a communication log indicative of communication just before the finish. Alternatively, instead of automatically displaying a communication protocol, a communication protocol may be displayed as a result of selection of a menu by a user.

(2) Connection Between IrSimple One-Way Communication Devices

Figure 30:
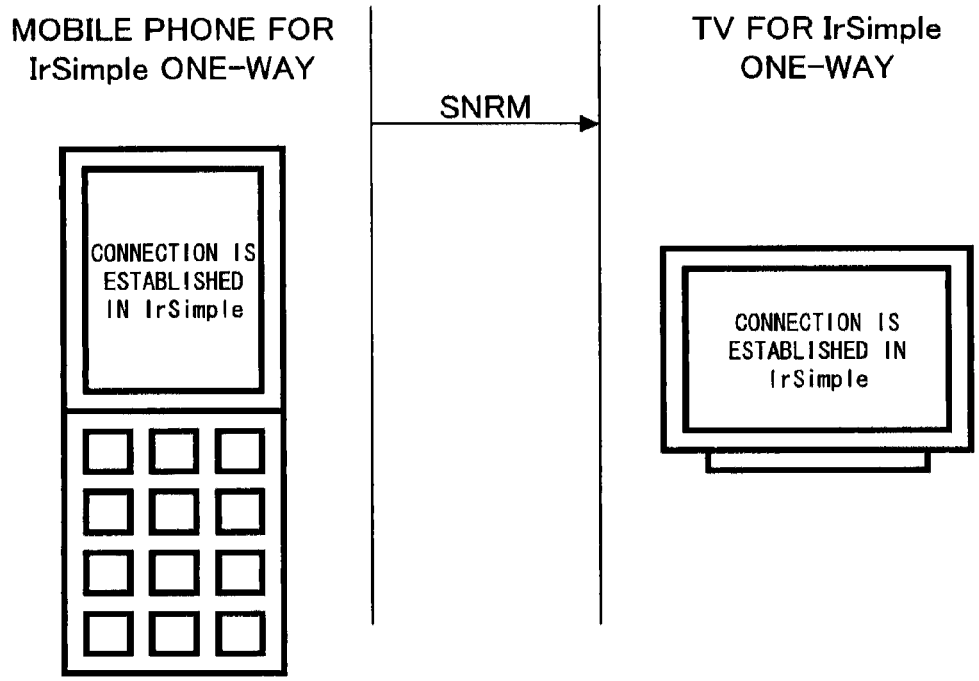
FIG. 30 is an explanatory drawing illustrating a connection procedure and examples of display of each device, in a case where a transmitter (mobile phone) and a receiver (display device such as TV) are both IrSimple one-way communication devices.

FIG. 30 is an explanatory drawing illustrating a connection procedure and how each device displays, in a case where a transmitter (mobile phone) and a receiver (display device such as TV) are both IrSimple one-way communication devices.

After transmitting SNRM in an IrSimple protocol, the transmitter (mobile phone) causes a display section to notify a user that a connection between the transmitter and the receiver in the IrSimple protocol has been established.

On the other hand, the receiver (display device such as TV) receives SNRM before an XID command, and thus recognizes that the transmitter is an IrSimple device and establishes a connection in IrSimple. At that time, the receiver causes a display section to notify that a connection in IrSimple has been established.

With the above operation, the user can easily know a protocol after a connection between the transmitter and the receiver has been established.

Instead of displaying a connection protocol after a connection has been established, a communication protocol may be notified after communication has been finished, using a communication log indicative of communication just before the finish. Alternatively, instead of automatically displaying a communication protocol, a communication protocol may be displayed as a result of selection of a menu by a user.

(3) Connection Between IrSimple Two-Way Device and IrSimple One-Way Device

Figure 31:
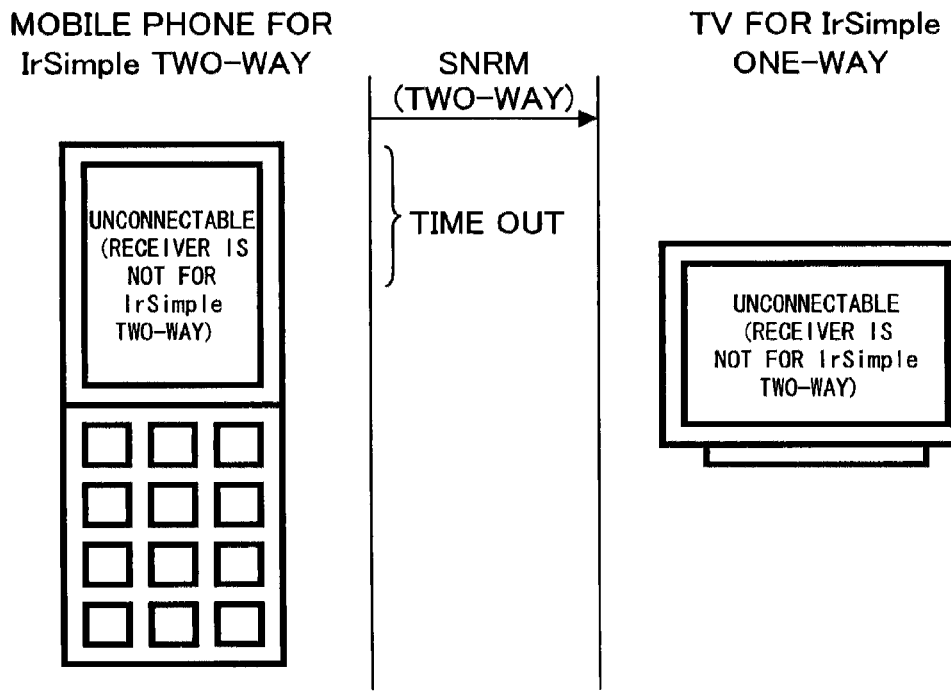
FIG. 31 is an explanatory drawing illustrating a connection procedure and examples of display of each device, in a case where a transmitter (mobile phone) is an IrSimple two-way communication device and a receiver (display device such as TV) is an IrSimple one-way communication device.

FIG. 31 is an explanatory drawing illustrating a connection procedure and how each device displays, in a case where a transmitter (mobile phone) is an IrSimple two-way communication device and a receiver (display device such as TV) is an IrSimple one-way communication device.

After transmitting SNRM (one-way/two-way selection flag indicates two-way communication) in an IrSimple protocol, the transmitter (mobile phone) does not receive a UA response from the receiver within a predetermined time. Consequently, the transmitter regards the communication as an error, and causes a display section to notify a user of the communication error.

On the other hand, the receiver (display device such as TV) receives SNRM before an XID command and thus recognizes that the transmitter is an IrSimple communication device. While the one-way/two-way selection flag in the SNRM indicates two-way communication, the receiver supports only one-way communication. Accordingly, the receiver regards the communication as an error, and causes a display section to notify the user of the communication error. At that time, the reason for the communication error is also displayed by the display section. This allows a user's response such as changing a communication mode of the transmitter to a one-way mode, or such as updating firmware of the display device so that the display device newly supports a two-way protocol.

Instead of automatically displaying a communication protocol, a communication protocol may be displayed as a result of selection of a menu by a user.

Figure 32:
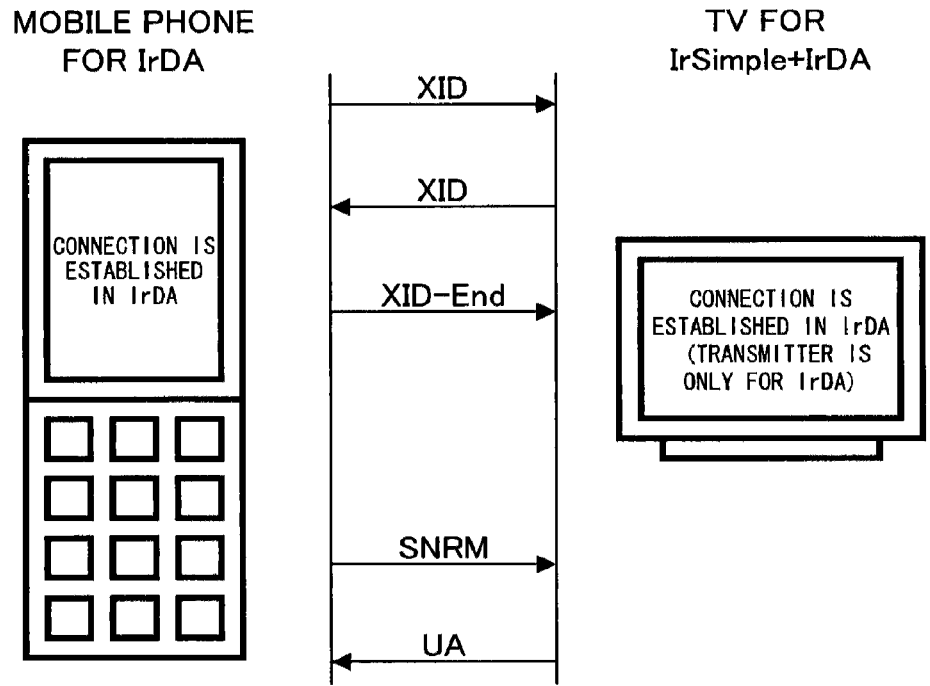
FIG. 32 is an explanatory drawing illustrating a connection procedure and examples of display of each device, in a case where a transmitter (mobile phone) carries out communication in a conventional IrDA protocol and a receiver (display device such as TV) carries out communication both in IrSimple two-way protocol and in IrDA protocol.

(4) Connection Between IrDa Communication Device and IrSimple+IrDa Communication Device FIG. 32 is an explanatory drawing illustrating a connection procedure and how each device displays, in a case where a transmitter (mobile phone) carries out communication in a conventional IrDA protocol and a receiver (display device such as TV) carries out communication both in IrSimple two-way protocol and in IrDA protocol.

After transmitting an XID command in IrDA protocol, the transmitter (mobile phone) receives an XID response from the receiver. In response to the XID response, the transmitter transmits an XID-End command and then transmits SNRM in a conventional IrDA format. At a time when the transmitter receives a UA response, the transmitter regards a connection in IrDA as being established, and causes a display section to notify a user of the establishment.

On the other hand, the receiver (display device such as TV) completes searching of a station in IrDA through transmission/reception of the XID command, the XID response, and the XID-End. Then, the receiver establishes a connection in IrDA at a time when the receiver transmits a UA response to the SNRM command in IrDA format from the transmitter. The receiver causes a display section to notify a user of the establishment of the connection. At that time, the receiver displays that the connection was carried out in IrDA but a connection in IrSimple would be possible if the transmitter would support an IrSimple protocol. This allows a user's response such as updating of firmware of the transmitter, so that the transmitter newly supports an IrSimple two-way protocol.

Instead of displaying a connection protocol after a connection has been established, a communication protocol may be notified after communication has been finished, using a communication log indicative of communication just before the finish. Alternatively, instead of automatically displaying a communication protocol, a communication protocol may be displayed as a result of selection of a menu by a user.

Figure 33:
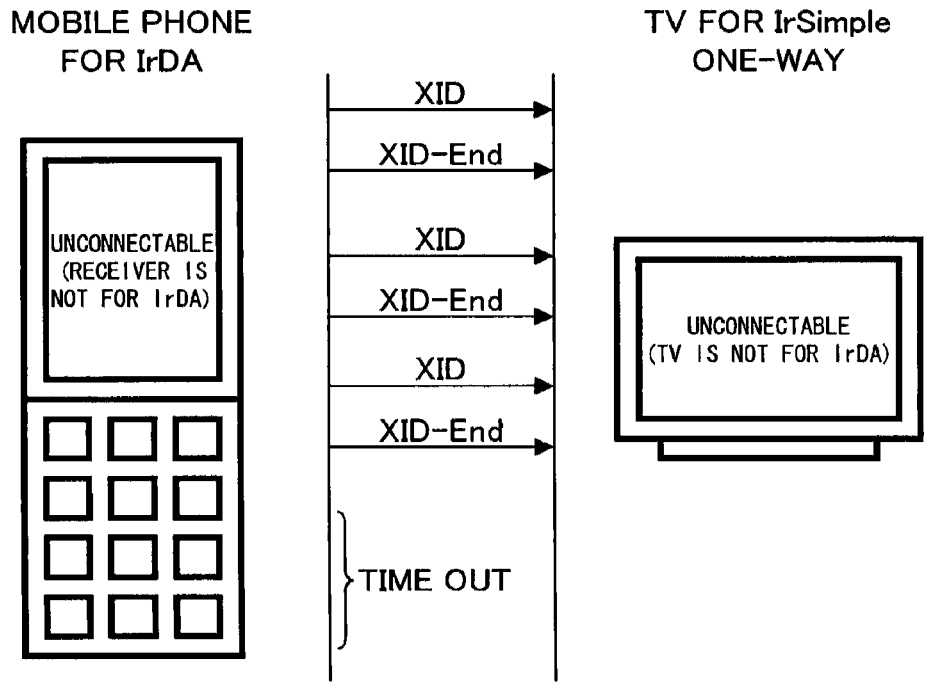
FIG. 33 is an explanatory drawing illustrating a connection procedure and examples of display of each device, in a case where a transmitter (mobile phone) carries out communication in a conventional IrDA protocol and a receiver (display device such as TV) carries out communication in IrSimple one-way.

(5) Connection Between IrDa Communication Device and IrSimple Communication Device FIG. 33 is an explanatory drawing illustrating a connection procedure and how each device displays, in a case where a transmitter (mobile phone) carries out communication in a conventional IrDA protocol and a receiver (display device such as TV) carries out communication in IrSimple one-way protocol.

The transmitter (mobile phone) transmits an XID command and an XID-End command, but the transmitter cannot receive an XID response from the receiver. Consequently, after a predetermined time has passed, the transmitter regards the communication as an error, and causes a display section to notify a user of the communication error.

On the other hand, the receiver (display device such as TV) receives SNRM before an XID command and thus recognizes that the transmitter is an IrSimple communication device. However, the receiver does not include an IrDA protocol. Accordingly, the receiver regards the communication as an error, and causes a display section to notify the user of the communication error. At that time, the reason for the communication error is also displayed by the display section. This allows a user's response such as updating firmware of the display device so that the display device newly supports an IrSimple two-way protocol.

Instead of automatically displaying a communication protocol, a communication protocol may be displayed as a result of selection of a menu by a user.

Embodiment 17

The following will describe another embodiment of the present invention in reference to FIGS. 34 to 56. The communication protocols described in the present embodiment are applicable to embodiments 1 to 16. The terms defined in embodiments 1 to 16 are used in the present embodiment according to the same definitions unless otherwise noted.

(1) Communication Layers

Figure 34:
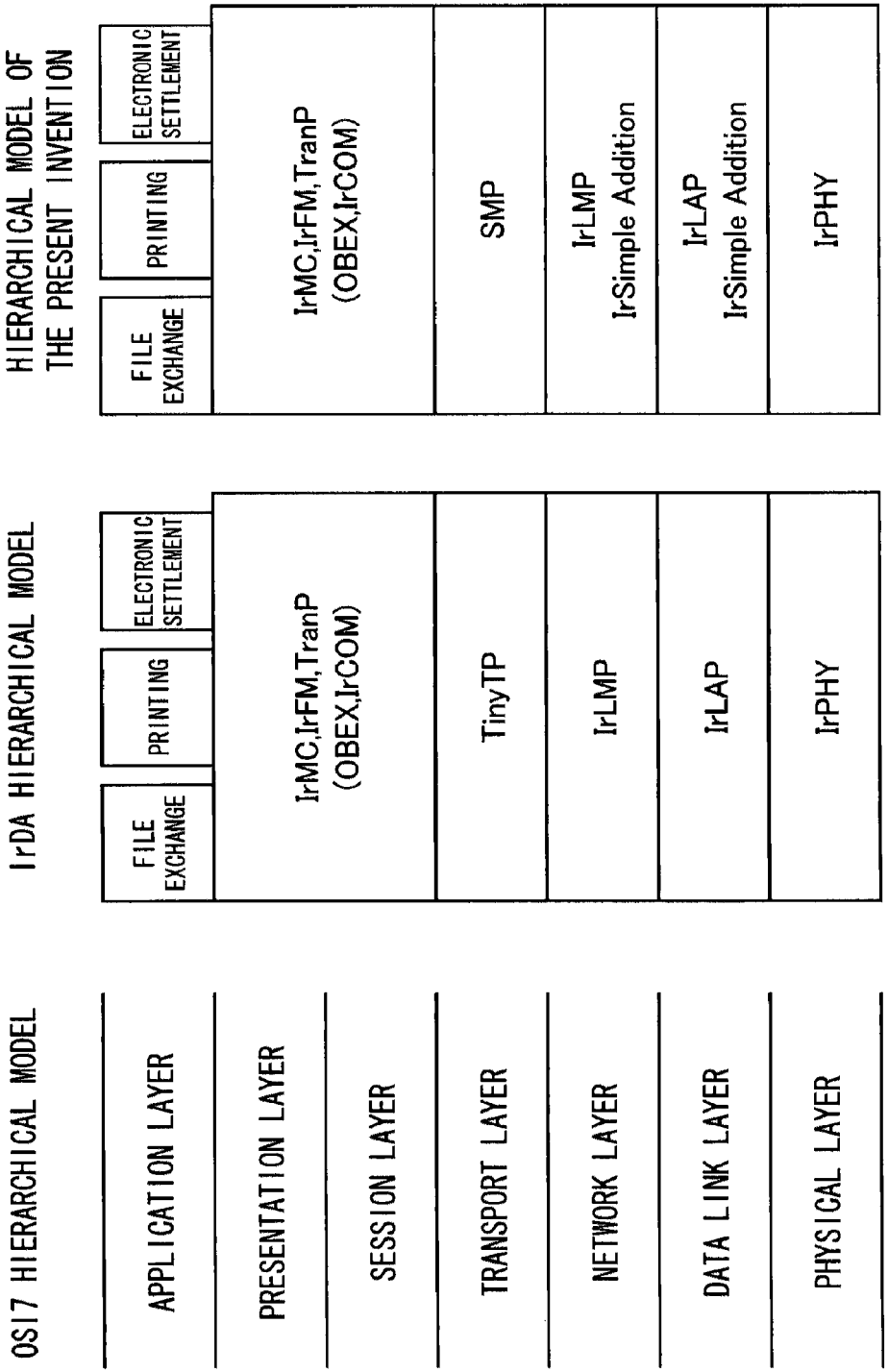
FIG. 34 is a diagram schematically illustrating a corresponding relation among the OSI7 hierarchical model, the IrDA hierarchical model, and the hierarchical model of the present invention.

FIG. 34 is a schematic diagram for relationship among the OSI 7-layer model, the IrDA layers, and the layers of the communication system of the present invention.

The communication system according to the present embodiment is divided into communication layers with equivalent functions to those of the layers in the OSI 7-layer model. However, as shown in FIG. 34, the communication system has a six-layer structure in which the session layer and the presentation layer are merged into a single layer.

For ease of explanation, the present embodiment will describe the invention as applied to IrSimple as an example. However, the present invention is by no means limited to IrSimple. IrSimple is an improved version of conventional IrDA.

In the present embodiment, the data link layer, the network layer, the transport layer, and the session/presentation layer may be referred to as LAP, LAMP, SMP, and OBEX, respectively, in accordance with IrSimple. To distinguish between the communication layers in the transmitter and those in the receiver, the layers in the transmitter (primary station) are indicated by "P," and those in the receiver (secondary station) by "S." For example, "LAP(P)" denotes the data link layer in the transmitter.

(2) Sequence between Transmitter and Receiver (2-1) Connection Sequence

[A] Response is Sent

Figure 35:
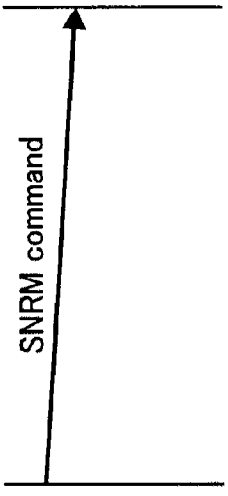
FIG. 35($a$) is a sequence diagram illustrating connection establishing in an embodiment of the present invention.
Figure 35:
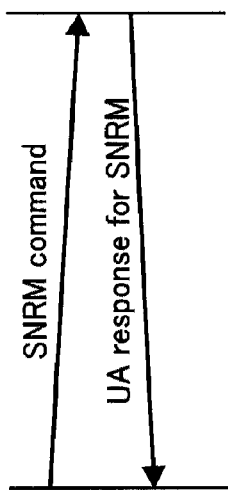
Figure 35:
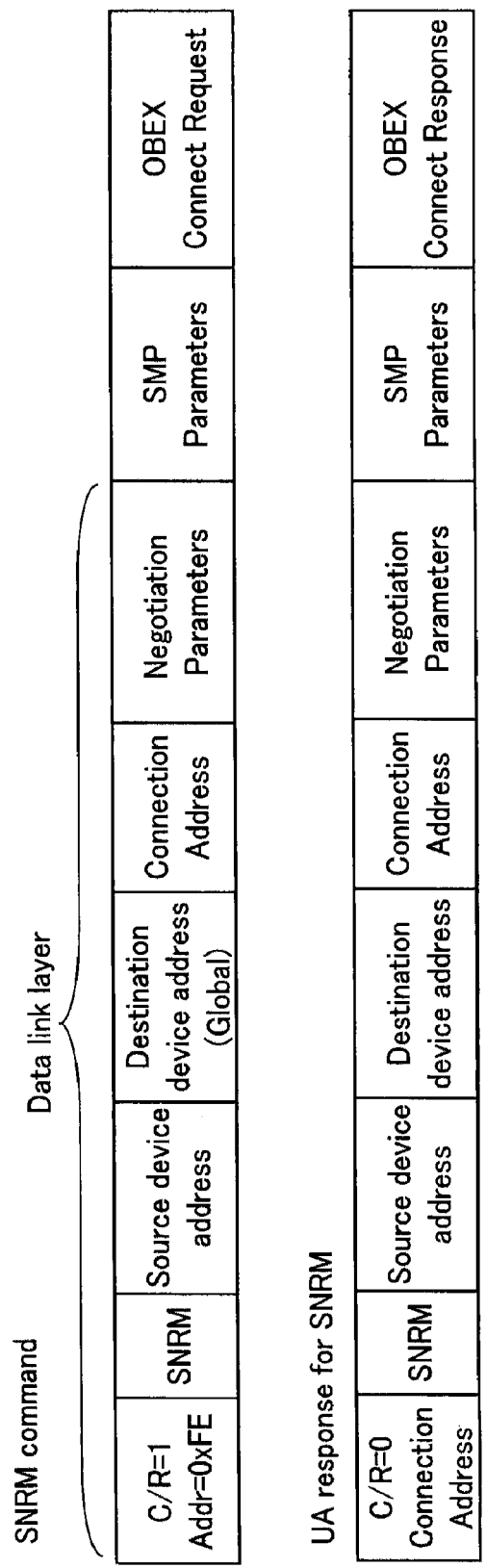

FIG. 35(*a*) is a sequence diagram showing a connection sequence according to the present embodiment (response is sent). FIG. 35(*c*) is an illustration of the structure of communication data used in the connection sequence of the present embodiment (response is sent).

In the present embodiment (response is sent), a global address is used for the destination device address of an SNRM command, thereby giving a searching function to the SNRM command (SNRM command in FIG. 35(*c*)).

Furthermore in the present embodiment (response is sent), the SNRM command, which is a connection packet for the data link layer, and the UA response contain parameters and commands required in the connection of the upper layers, such as the network layer, the transport layer, the session layer, and the presentation layer. Accordingly, the present embodiment uses only one connection packet, rather than several as required in conventional IrDA, to connect all of the upper layers.

Thus, the present embodiment carries out the search and connection sequence with a single pair of packets, rather than a plurality of packets as required in conventional cases.

[B] No Response is Sent

FIG. 35(*b*) is a sequence diagram showing a connection sequence according to the present embodiment (no response is sent). FIG. 35(*c*) is an illustration of the structure of communication data used in the connection sequence of the present embodiment (no response is sent). Note that in the present embodiment (no response is sent), the UA response (UA response for SNRM in FIG. 35(*c*)) is not required.

A communication mode which involves no response from the receiver may be selected depending on the user, application, or data type. When such a method is selected, the SNRM command alone can complete both search and connection as shown in FIG. 35(*b*).

The connection sequence of the present embodiment, as explained above, reduces the time required to make a connection by handling all connection requests for the plural communication layers at the same time, and therefore can easily recover from a disconnection of the communication path. In view of this, the connection sequence is particularly suitable for wireless communication in which the communication path is easily cut off (e.g. infrared communication). Note that the connection sequence is effective also with other wireless and wired communication, including IEEE 802.11 and Bluetooth.

The present embodiment will describe an example in which all the communication layers are connected by a single round of communication. The present invention is not limited to such cases. For example, the present invention may be arranged so that one communication layer is connected first, and the remaining two or more communication layers are connected thereafter. Alternatively, a connection for one communication layer may be established through plural rounds of communication. For example, given that two rounds of communication are required to establish a connection for the network layer, the connection of the data link layer and the first of the two rounds of communication for the connection of the network layer may be handled by one connection request, and the second round of communication for the connection of the network layer and the connection of the transport layer may be handed by one connection request.

(2-2) Data Exchange Sequence
[A] Response is Sent

FIGS. 36(*a*), 36(*b*) are sequence diagrams each showing a data exchange sequence according to the present embodiment (response is sent). FIG. 36(*a*) is an illustration of the structure of communication data used in the data exchange sequence of the present embodiment (response is sent).

In the present embodiment (response is sent), a response from a lower layer/upper layer is not transmitted for each data, thereby reducing the number of responses as many as possible. Then, a response is sent as to presence of an error after a large amount of data is transmitted.

In data communication, the transmitter uses (i) a flag for asking the receiver if there is any problem in the sequence of packet number or in the data received and (ii) a packet constituted of plural data items created by dividing the data according to the packet size.

As shown in FIG. 36(*a*), the transmitter transmits a predetermined number of packets, and then transmits a packet in which the flag is on. If the receiver on the other end has detected no error since the start of receiving the data or since a previous response sent in reply to a packet in which the flag is on, the receiver notifies the transmitter of proper transmission. If an error is detected, the receiver ignores the data items after the missed packet, and only confirms the flag. When it is confirmed that the flag is on, the receiver informs the transmitter of the packet number of the packet which ahs not been received due to the error.

When the transmitter is notified of a proper transmission from the receiver, the transmitter continues to transmit a next packet. When it is notified of an error, the transmitter retransmits the packets, starting with the packet which was not properly received and ending with the packet bearing the turned-on flag.

With this, the interval between packets is reduced, thereby efficiently performing transmission.

As shown in FIG. 36(*a*), the present embodiment (response is sent) uses an UI frame (FIG. 37(*b*)). Therefore, the data link layer (LAP layer) is incapable of recognizing missing of packets, and the missing is detected by the transport layer.

In the UI frame, the data for the transport layer contains the sequential number, a flag for confirming the data, a flag for informing as to whether the packet is the final packet of the data, and a flag for checking if there is any problem in the received data. The data transmission is carried out using these flags.

[B] No Response is Sent

Figure 38:
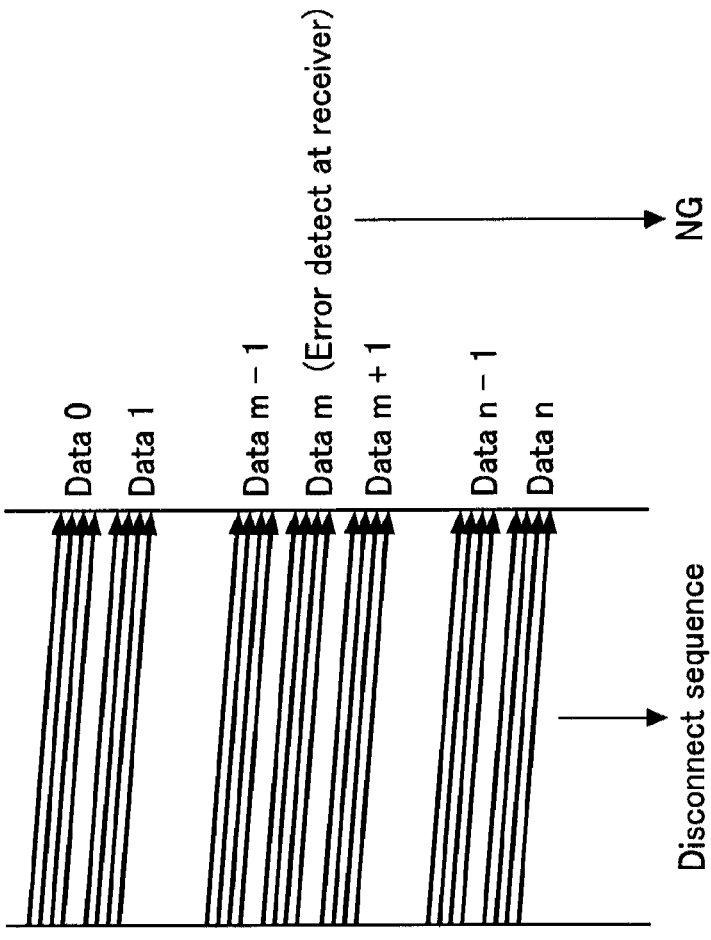
FIG. 38($a$) is a diagram illustrating a data exchange sequence in the embodiment of the present invention.
Figure 38:
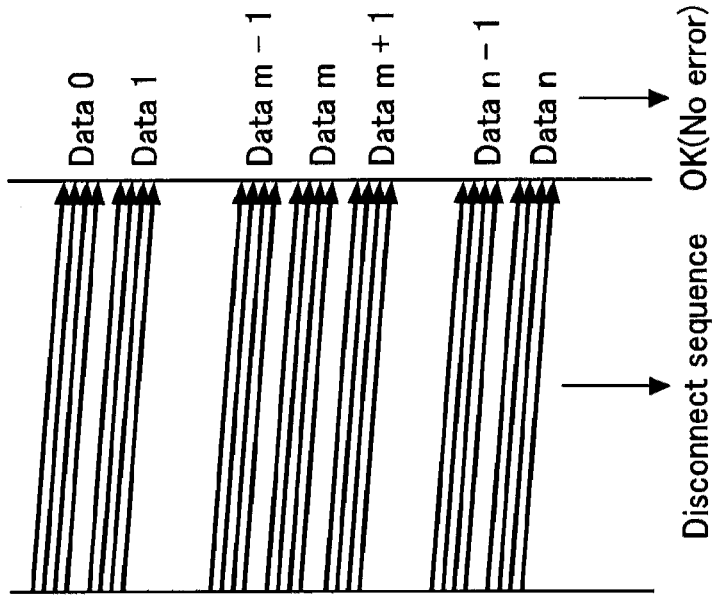

FIGS. 38(*a*), 38(*b*) are sequence diagrams each showing a data exchange sequence according to the present embodiment (no response is sent). FIG. 38(*b*) is an illustration of the structure of communication data used in the data exchange sequence of the present embodiment (no response is sent).

In the present embodiment (no response is sent), if no response from the receiver is needed, only the completeness of data is confirmed. Therefore, the transmitter puts a sequential number on each packet, and transmits all the data at once.

The receiver only confirms whether there is any error in the transmission. When all the packets (data) are properly received, the proper completion of data is perceived in the receiver, and the next operation is carried out, which is display, printing, storing, etc. of the received data. On the other hand, when an error is detected, the error is perceived in the receiver, and a different operation is carried out, which is error indication to the user, stand-by for the next data, etc.

Note that the present embodiment (no response is sent) also uses the UI frame (FIG. 37(*b*)) shown in FIG. 38(*b*).

(2-3) Disconnection Sequence
[A] Response is Sent

Figure 39:
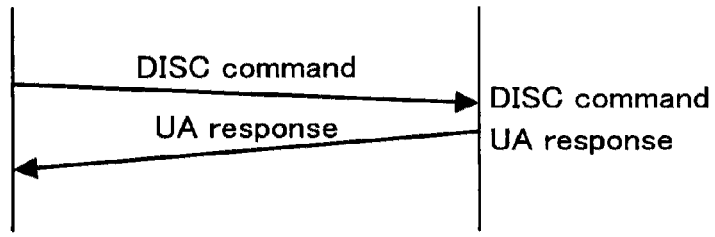
FIG. 39($a$) is a diagram illustrating a disconnection sequence in the embodiment of the present invention.
Figure 39:
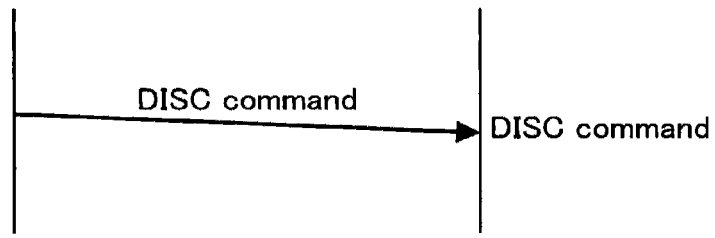
Figure 39:
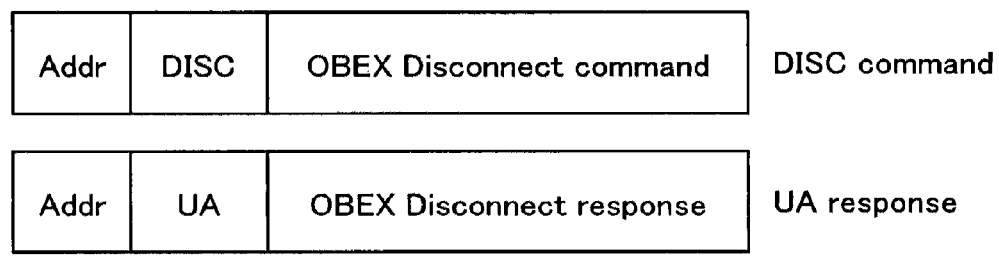

FIG. 39(*a*) is a sequence diagram showing a disconnection sequence of the present embodiment (response is sent). FIG. 39(*c*) is an illustration of the structure of communication data used in the disconnection sequence of the present embodiment (response is sent).

As shown in FIG. 39(*c*), in the present embodiment (response is sent), the DISC command and the UA response contain the parameters and commands required for a disconnection of the upper layers. such as the network layer, the transport layer, the session layer, and the presentation layer.

In this way, the present embodiment carries out a disconnection sequence with a single pair of packets, rather than a plurality of packets as required in conventional cases.

[B] No Response is Sent

FIG. 39(*b*) is a sequence diagram showing a disconnection sequence according to the present embodiment (no response is sent). FIG. 39(*c*) is an illustration of the structure of communication data used in the disconnection sequence of the present embodiment (response is sent). Note that in the present embodiment (no response is sent), the UA response (UA response in FIG. 39(*c*)) is not required.

As shown in FIG. 39(*b*), in the present embodiment (no response is sent), when the connection is established without requiring a response from the receiver, the DISC command alone can complete both search and disconnection.

(3) Sequence in Transmitter and Sequence in Receiver

In FIGS. 40 to 56, for ease of explanation, the data link layer, the network layer, the transport layer, and the session/presentation layer may be referred to as LAP, LAMP, TTP or SMP, and OBEX, respectively. To distinguish between the communication layers in the transmitter and those in the receiver, the layers in the transmitter are indicated by "P," and those in the receiver by "S." For example, "LAP(P)" denotes the data link layer in the transmitter.

(3-1) Connection Sequence
[A] Response is Sent

Figure 40:
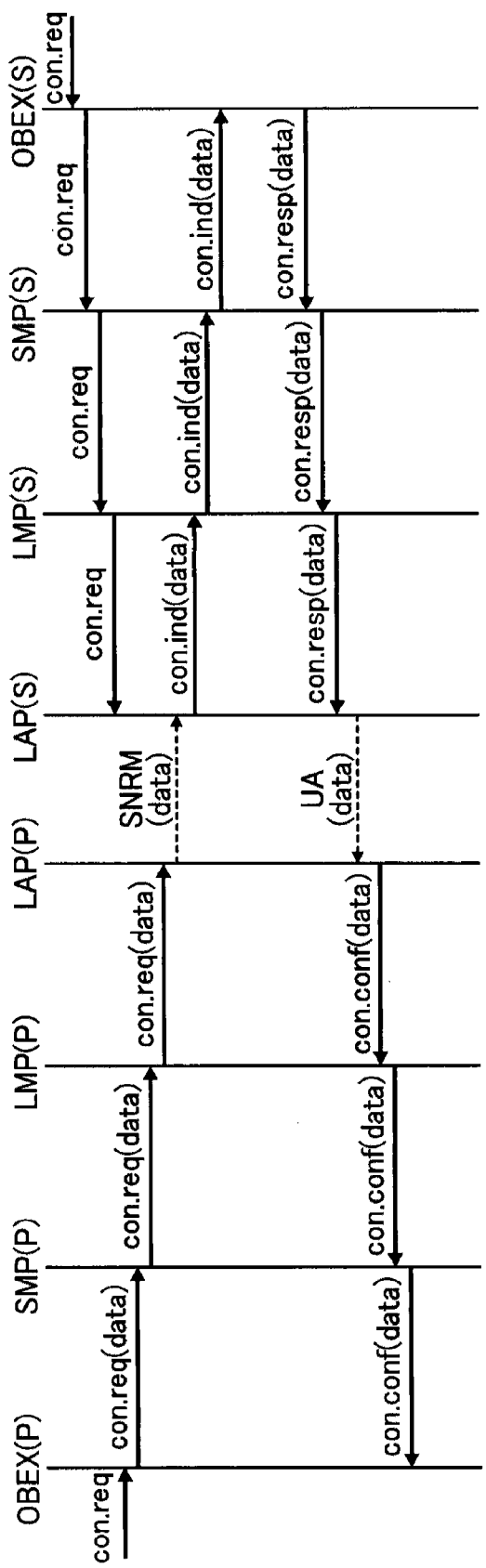
FIG. 40 is a sequence diagram illustrating flow of functions (commands, messages) and packets among layers in the connection sequence of the embodiment of the present invention.

FIG. 40 is a sequence diagram showing a connection sequence of the present embodiment (response is sent). FIGS. 41(*a*), 41(*b*) are illustrations of the structure of communication data used in the connection sequence of the present embodiment (response is sent).

As shown in FIG. 40, in the present embodiment (response is sent), the transmitter and the receiver first carry out preparation for a connection. Then, the transmitter passes on the request from the upper layer to the lower layers, and then transmits the request as a single packet (SNRM). Meanwhile, the receiver receives the SNRM packet, and passes on the notification of the successful establishment of a connection to the upper layers, and then passes on a response from the OBEX(S) from the upper to the lower layer, and transmits the response as a single packet (UA). The transmitter is notified of the establishment of the connection through the reception of UA, and passes on the notification (Connect.confirm) from lower to upper layers.

The following will separately describe the sequence in the transmitter and the sequence in the receiver.

First, the communication layers in the transmitter will be described.

When a connection request is transmitted from the application to the OBEX(P), the OBEX(P) emits a connection request function (Primitive), in which data contains a connection request command to the lower layer (SMP(P)). Furthermore, when a connection confirmation function is transmitted from the SMP(P) to the OBEX(P), the OBEX(P) checks a response for an OBEX connection which is contained in the data. When the response tells that the connection has been properly done ("Success"), the OBEX(P) finishes the connecting operation.

The SMP(P) receives the connection request function from the OBEX(P), and adds a parameters required for communication with the SMP(S) of the receiver to the data, and emits the connection request function to the lower layer (LMP(P)). When a connection confirmation function is transmitted from the LMP(P) to the SMP(P), the SMP(S) extracts a parameter generated by the SMP(S) of the receiver from the data of the function, and checks the value, and then finishes the negotiation with the SMP(S). Further, the SMP(P) removes the parameter of the SMP(S) from the data of the connection confirmation function, and transmits the resulting data to the OBEX(P) as the connection confirmation function.

The LMP(P) receives the connection request function from the SMP(P), and immediately adds parameter(s) required for communication with the LMP(S) of the receiver to the data of the connection request function from the SMP(P), and emits the connection request function to the lower layer (LAP(P)). When a connection confirmation function is transmitted from the LAP(P) to the LMP(P), the LMP(P) extracts parameter(s) generated by the LMP(S) of the receiver from the data of the function, and checks the value, and then finishes the negotiation with the LMP(S). Further, the LMP(P) removes the parameter(s) of the LMP(S) from the data of the connection confirmation function, and transmits the resulting data to the SMP(P) as the connection confirmation function.

Note that, in general operation, an LSAP (Link Service Access Point) is defined to manage the logic port. When the connection is established by connecting the layers one by one, the LMP is not required. In this case, a connectionless value is used as the fixed value of the LSAP. Therefore, the exchange of the connection parameter(s) for LMP is not required.

The LAP(P) receives the connection request function from the LMP(P), and immediately adds parameter(s) required for communication with the LAP(S) of the receiver to the data of connection request function from the LMP(P), and emits the SNRM command to the physical layer of the receiver. When the UA response is transmitted from the physical layer of the receiver to the LAP(P), the LAP(P) extracts the parameter(s) generated by the LAP(S) of the receiver from the data of the UA response, and checks the value, and then finishes the negotiation with the LAP(S). Further, the LAP(P) removes the parameter(s) of LAP(S) from the data of the UA response, and transmits the resulting data to the LMP(P) as the connection confirmation function.

Next, the communication layers in the receiver will be described.

The OBEX(S) receives the connection request function from the application, and stands by for the next reception. When a connection notification function (Indication) is transmitted from the lower layer (SMP(S)), the OBEX(S) checks a command for OBEX connection which is contained in the data. When the command indicates that the connection has been properly done, the OBEX(S) emits a response "Success" as a connection response function (Response) to the SMP(S), and finishes the connection operation.

The SMP(S) receives the connection request function from the OBEX(S), and stands by for the next reception. When the connection notification function is transmitted from the lower layer (SMP(S)), the SMP(S) extracts the parameter(s) generated by the SMP(P) of the transmitter from the data of the function, and creates parameter(s) for response, and emits the connection request function containing the data thus created by removing the parameter(s) of the SMP(P) from the data of the function, to the OBEX(S), and then stands by for a connection response function which comes from the OBEX(S). Further, when the connection response function is transmitted from the OBEX(S), the SMP(S) adds the parameter(s) of the response to the data of the connection response function of the OBEX(S), emits the connection response function to the LMP(S), and finishes the negotiation for the SMP layer.

The LMP(S) receives the connection request function from the SMP(S), and stands by for the next reception. When the connection notification function is transmitted from the lower layer (LAP(S)), the LMP(S) extracts the parameter(s) generated by the LMP(P) of the transmitter from the data of the function, and creates parameter(s) for response, and emits the connection request function containing the data thus created by removing the parameter(s) of the LMP(P) from the data of the function, to the SMP(S), and then stands by for a connection response function which comes from the SMP(S). Further, when the connection response function is transmitted from the SMP(S), the LMP(S) adds the parameter(s) of the response, to the data of connection response function of the SMP(S), emits the connection response function to the LAP(S), and finishes the negotiation for the LMP layer.

Note that in general operation, an LSAP (Link Service Access Point) is defined to manage the logic port. When the connection is established by connecting the layers one by one, the LMP is not required. In this case, a connectionless value is used as the fixed value of the LSAP. Therefore, the exchange of connection parameter(s) for LMP is not required.

The LAP(S) receives the connection request function from the LMP(S), and stands by for the next reception. When the SNRM command is transmitted from the physical layer to the LAP(S), the LAP(S) extracts parameter(s) generated by the LAP(P) of the transmitter from the data of the SNRM command, and creates parameter(s) for response after transmitting the connection request function, containing the data thus created by removing the parameter(s) of LAP(P) from the data of the SNRM command, to the LMP(S), and then stands by for a connection response function which comes from the LMP(S). Further, when the connection response function is transmitted from the LMP(S), the LAP(S) adds the parameter(s) of the response to the data of the connection response function of the LMP(S), emits the UA response to the physical layer, and finishes the negotiation for the LAP layer.

[B] No Response is Sent

Figure 42:
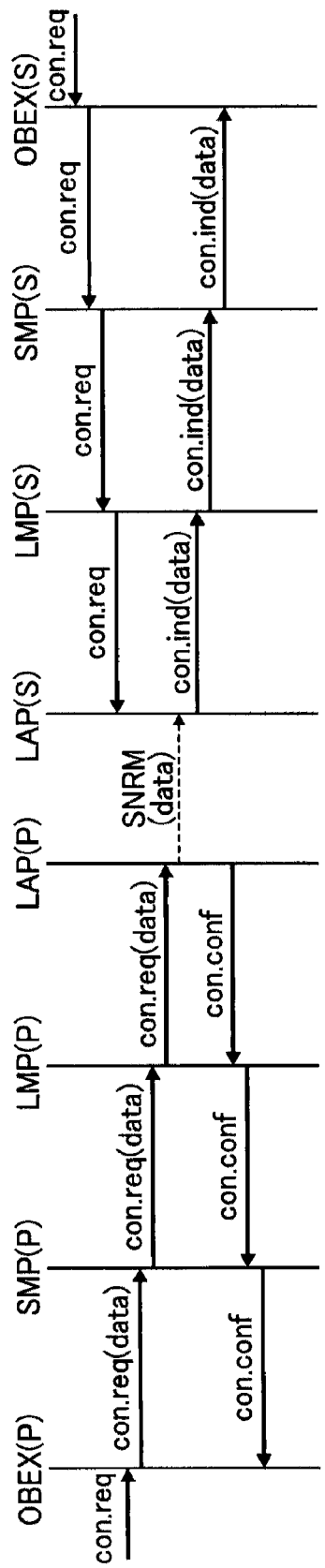
FIG. 42 is a sequence diagram illustrating flow of functions (commands, messages) and packets among layers in the connection sequence in the embodiment of the present invention.

FIG. 42 is a sequence diagram showing a connection sequence according to the present embodiment (no response is sent). FIG. 41(*a*) is an illustration of the structure of communication data used in the connection sequence according to the present embodiment (no response is sent).

As shown in FIG. 42, in the present embodiment (no response is sent), the transmitter and the receiver first carry out preparation for a connection. Then, the transmitter passes on the request from the upper layer to the lower layers, and then transmits the request as a single packet (SNRM). Having transmitted the SNRM packet, the transmitter passes on the notification of completion of a connection (Connect.confirm) from the LAP(P) to the upper layers. Meanwhile, the receiver receives the SNRM packet, and passes on the notification of completion of a connection from the lower to the upper layer. The connection is regarded completed when the notification of completion of a connection is received by the OBEX(S).

The following will describe the sequence in the transmitter and the sequence in the receiver.

First, the communication layers in the transmitter will be described.

When a connection request is transmitted from the application to the OBEX(P), the OBEX(P) immediately emits a connection request function (Primitive), in which data contains a connection request command, to the lower layer (SMP (P)). Further, when a connection confirmation function is transmitted from the SMP(P) to the OBEX(P), the OBEX(P) finishes the connecting operation.

The SMP(P) receives the connection request function from the OBEX(P), and immediately adds parameter(s) required for communication with the SMP(S) of the receiver to the data of the connection request function of the OBEX(P), and emits the connection request function to the lower layer (LMP (P)). When a connection confirmation function is transmitted from the LMP(P) to the SMP(P), the SMP(P) regards that the procedure has been done with the transmitted parameter(s), and finishes the negotiation for the SMP layer. Then, the SMP(P) transmits the connection confirmation function to the OBEX(P).

The LMP(P) receives the connection request function from the SMP(P), and immediately adds parameters required for communication with the LMP(S) of the receiver to the data of the connection request function from the SMP(P), and emits the connection request function to the lower layer (LAP(P)). When a connection confirmation function is transmitted from the LAP(P) to the LMP(P), the LMP(P) regards that the procedure has been done with the transmitted parameter(s), and finishes the negotiation for the LMP layer. Then the LMP(P) transmits the connection confirmation function to the SMP(P).

Note that in general operation, an LSAP (Link Service Access Point) is defined to manage the logic port. When the connection is established by connecting the layers one by one, the LMP is not required. In this case, a connectionless value is used as the fixed value of LSAP. Therefore, the exchange of connection parameter(s) for LMP is not required.

The LAP(P) receives the connection request function from the LMP(P), and immediately adds parameter(s) required for communication with the LAP(S) of the receiver to the data of the connection request function from the LMP(P), and emits the SNRM command to the physical layer of the receiver. Transmitting the SNRM command, the LAP(P) regards that the procedure has been done with the transmitted parameter(s), and finishes the negotiation for the LAP layer. Then the LAP(P) transmits the connection confirmation function to the LMP(P).

Next, the communication layers in the receiver will be described.

The OBEX(S) receives the connection request function from the application, and stands by for the next reception. When a connection notification function (Indication) is transmitted from the lower layer (SMP(S)) to the OBEX(S), the OBEX(S) checks a command for OBEX connection which is contained in the data. When the command indicates that the connection has been properly done, the OBEX(S) finishes the connecting operation.

The SMP(S) receives the connection request function from the OBEX(S), and stands by for the next reception. When the connection notification function is transmitted from the lower layer (SMP(S)), the SMP(S) extracts parameter(s) generated by the SMP(P) of the transmitter from the data of the function, and finishes negotiation by using the parameter(s). Then the SMP(S) emits the connection request function containing the data thus created by removing the parameter(s) of SMP(P) from the data of the function, to the OBEX(S).

The LMP(S) receives the connection request function from the SMP(S), and stands by for the next reception. When the connection notification function is transmitted from the lower layer (LAP(S)), the LMP(S) extracts parameter(s) generated by the LMP(P) of the transmitter from the data of the function, and finishes negotiation by using the parameter(s). Then the LMP(S) emits connection request function containing the data thus created by removing the parameter(s) of the LMP(P) from the data of the function, to the SMP(S).

Note that in general operation, an LSAP (Link Service Access Point) is defined to manage the logic port. When the connection is established by connecting the layers one by one, the LMP is not required. In this case, a connectionless value is used as the fixed value of the LSAP. Therefore, the exchange of connection parameter(s) for the LMP is not required.

The LAP(S) receives the connection request function from the LMP(S), and stands by for the next reception. When the SNRM command is transmitted from the physical layer, the LAP(S) extracts parameter(s) generated by the LAP(P) of the transmitter from the data of the SNRM command, and finishes negotiation by using the parameter(s). Then the LAP(S) emits the connection request function containing the data thus created by removing the parameter(s) of LAP(P) from the data of the function, to the LMP(S).

(3-2) Data Exchange Sequence

[A] Response is Sent

Figure 43:
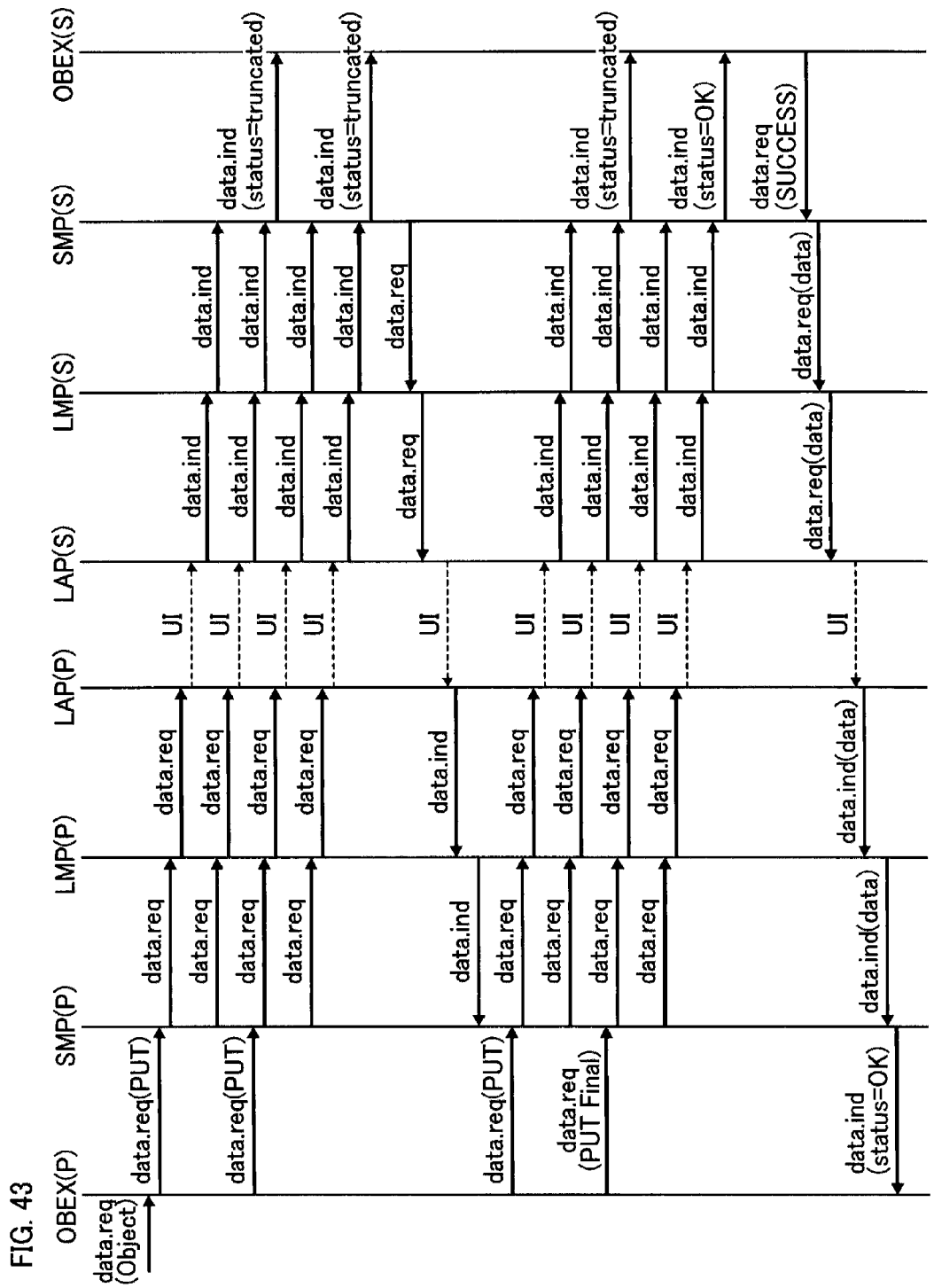
FIG. 43 is a sequence diagram illustrating flow of functions (commands, messages) and packets among layers in the data exchange sequence in the embodiment of the present invention.
Figure 44:
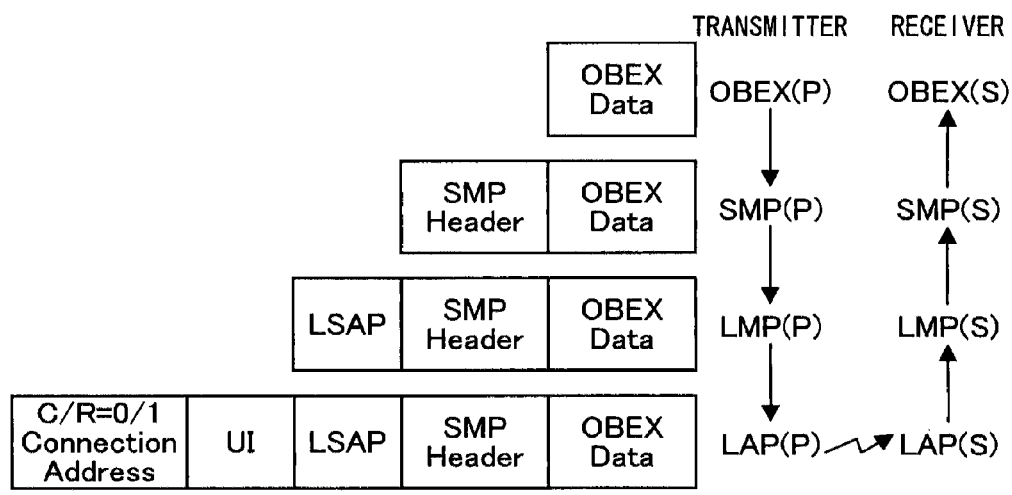
FIG. 44 is a diagram illustrating change of data in the functions among the layers, which functions are described in FIG. 43 and FIG. 45 and which functions are used in the data exchange sequence of the embodiment of the present invention.

FIG. 43 is a sequence diagram showing a data exchange sequence according to the present embodiment (response is sent). FIG. 44 is an illustration of the structure of communication data used in the data exchange sequence of the present embodiment (response is sent).

As shown in FIG. 43, in the present embodiment (response is sent), the transmitter generates a PUT command, which is propagated through the lower layers to be transmitted as a UI frame (FIG. 37($b$)).

Obtaining the data, the receiver propagates a notification from lower to upper layers. At this time, the SMP(S) notifies the upper layer OBEX(S) of continuity of data (status=truncated).

After transmitting a predetermined number of packets, the transmitter transmits a packet in which the flag for confirming proper data transmission is on. The receiver receives the data with the flag on, and checks if the transmission has been done properly. If an error is detected, the SMP(S) informs the transmitter of the packet number which has not been received due to the error.

if no error is detected, the transmitter outputs the next packets. If an error is detected, the transmitter retransmits the packets having been suspended after the error.

The transmitter puts an ON-flag in the final data, the flag indicating that this is the final data. Meanwhile, the SMP(S) notifies the OBEX(S) that all data items have been received (status=OK), and stands by for a response from the OBEX(S). The response generated from the OBEX(S) is propagated to the lower layers, and is outputted as a UI frame.

If the response is "Success," the transmitter finishes the operation in a general way.

The following will separately describe the sequence in the transmitter and the sequence in the receiver.

In the transmitter, the OBEX(P) outputs a PUT command to the lower layers as a data transmission function. However, if the SMP(P) is capable of transmission without a response ("Continue" in general) with respect to a PUT command, except for the PUT Final (final PUT), the OBEX(P) outputs the next command. In the case of a command other than the PUT Final or the PUT command, the operation is suspended to wait for the data notification function from the lower layer, and the command is finished after checking the response in the data.

The data transmission function denotes a function (Data Request) for requesting the lower layer to transmit data. Further, the data notification function denotes a function (Data Indicate) serving as a notification of data reception from the lower layer.

In the receiver, the OBEX(S) receives data from the lower layer with the data notification function. However, the OBEX(S) does not send back a response to PUT commands other than the PUT Final command, and sends back, as a response, a data transmission function to commands other than the PUT Final command or PUT command.

The following will describe a header, etc. of the data transmission functions and the data notification functions in the upper and lower layers. These data items are used for both the transmitter and the receiver.

In receiving the data transmission function from the OBEX, (a) if the predetermined size for transmission data in the LMP is smaller than the size of data in the data transmission function, the SMP divides the data into smaller items to allow the LMP to transmit the data. On the other hand, (b) if the predetermined size for transmission data in the LMP is larger than the size of data in the data transmission function, the SMP combines plural data items of the data transmission function to make data having a larger volume but being transmittable. The SMP also creates a SMP header constituted of, for example, a sequential number, an argument for asking the other device about data reception condition, an argument indicating the end of data, an argument indicating necessity of transmission of OBEX response to the SMP of the other device, and an argument indicating whether the received data was a complete set of data items. Further, the SMP header is added to the divided/combined data and is contained in the data transmission function. The data transmission function is transmitted to the LMP.

When the SMP receives the data notification function from the LMP, the SMP extracts the SMP header from the data in the function, and checks whether the sequential numbers are appropriate (i.e., the numbers are in sequence). If the numbers are in sequence, the SMP transmits the data notification function to the OBEX. At this point, the data notification function may be outputted for each data notification function coming from the lower layer, or for a predetermined set of those.

The SMP(P) of the transmitter modifies the data transmission function from the OBEX(P), into a data transmission function suitable for the LMP(P), and emits the data transmission function with a predetermined amount of data. After that, the SMP(P) sets "true" for the argument for asking the receiver about data reception condition, and transmits the data transmission function. The SMP(P) then stands by for the data notification function from the LMP(P).

The SMP(P) analyzes the SMP header in the data notification function sent from the LMP(S), and confirms if the transmission has been done properly, by referring to the argument indicating whether the received data was a complete set of data items. Having been confirmed that the transmission has been done properly, the SMP is turned into a state allowing transmission to the OBEX(P), that is, it is ready to send the next data. In this state, the SMP(P) is capable of receiving data from the OBEX(P).

On the other hand, when the SMP(P) has found out, according to the argument indicating whether the received data was a complete set of data items, that the transmission has not been done properly, the SMP(P) regenerates data sequence from the unsent data transmission function to the argument set to "true" for asking the receiver about data reception condition. The SMP(P) repeats the regeneration predetermined times, or until the all data of the data transmission function is received in the receiver.

Further, when the SMP(P) receives from OBEX(P) the data transmission function with an argument indicating the end of data, which is set to "true," the SMP(P) sets "true" for the argument indicating the end of data, or for the argument indicating necessity of response from OBEX(S) in the data of transmission function to the LMP(P), and sends this new transmission function to the LMP(P).

On the other hand, when the SMP(S) of the receiver receives from the LMP(S) the data notification function in which either the argument indicating the end of data or the argument indicating necessity of transmission of OBEX(S) response to the other end is set to "true," the SMP(S) removes the header of the SMP(S) from the data notification function before transmitting the function to the OBEX(S).

Further, when the SMP(S) receives the data notification function from the LMP(S), the SMP(S) analyzes the SMP header in the data in the data notification function, and checks the sequential number. If the SMP(S) confirms that the receiver has received all data items until the header in which the argument for asking the receiver about data reception condition is "true," the SMP(S) creates a SMP header by modifying the argument indicating whether the received data was a complete set of data items into an appropriate format for indicating that the received data was a complete set of data items. With this data, the SMP(S) transmits the data transmission function to the LMP(S).

On the other hand, when the SMP(S) found out that there was a problem in data reception in the receiver, the SMP(S) infers the number of SMP header not transmitted and stores the number. For example, when the data items 0, 1, 2, 3, 5 are received, obviously the fifth number should be "4," but "4" is missing. That is, the number of data not received is "4." After this, the SMP(S) only checks if the argument for asking the receiver about data reception condition is set to "true" in the SMP header, and stops output of the data notification function to the OBEX(S).

When the SMP(S) receives the data notification function in which the argument for asking the receiver about data reception condition is "true," the SMP(S) creates a SMP header by modifying the argument indicating whether the received data was a complete set of data items into an appropriate format for indicating that the received data was not a complete set of data items, and inserting the number of the SMP header not properly received into the field for the sequential number. With this data, the SMP(S) transmits the data transmission function to the LMP(S).

Further, when the SMP(S) receives the data notification function in which either the argument indicating the end of data or an argument indicating necessity of transmission of OBEX(S) response to the other end is "true," the SMP(S) transmits the data notification function to the OBEX(S), and stands by for a data transmission request from the OBEX(S).

When the SMP(S) receives a data transmission request from the OBEX(S), the SMP(S) creates a SMP header by modifying argument indicating whether the received data was a complete set of data items into an appropriate format for indicating that the received data was a complete set of data items. The SMP(S) adds the SMP header to the data transmission function from the OBEX(S), and sends the resulting data to the LMP(S). Note that, since the notification to the OBEX(S) stops in case of error, the SMP(S) stands by only when the transmission is properly completed.

When the LMP receives the data transmission request function from the upper layer, the LMP adds a LMP header to the data of the data transmission request function, and adds the data to the data transmission function, and transmits the function to the LAP. Further, when the LMP receives the data notification function from the LAP, the LMP removes the LMP header from the data of the function and provides the resulting data in the data notification function, and transmits the function to the SMP.

Note that, when the connection is established by connecting the layers one by one, the LMP is not required. In this case, the LMP header includes LSAP having a connectionless value.

When the LAP receives the data transmission request function from the LMP, the LAP adds a LAP header to the data of the data transmission request function, and incorporates this data into a UI frame, and transmits the UI frame to the physical layer. Further, when the LAP receives the data reception notification from the physical layer, the LAP removes the LAP header from the data of the UI frame and incorporates the resulting data into the data notification function, and transmits the function to the LMP. Note that in the present embodiment, the LAP header contains a connection address and a UI indicator.

[B] No Response is Sent

Figure 45:
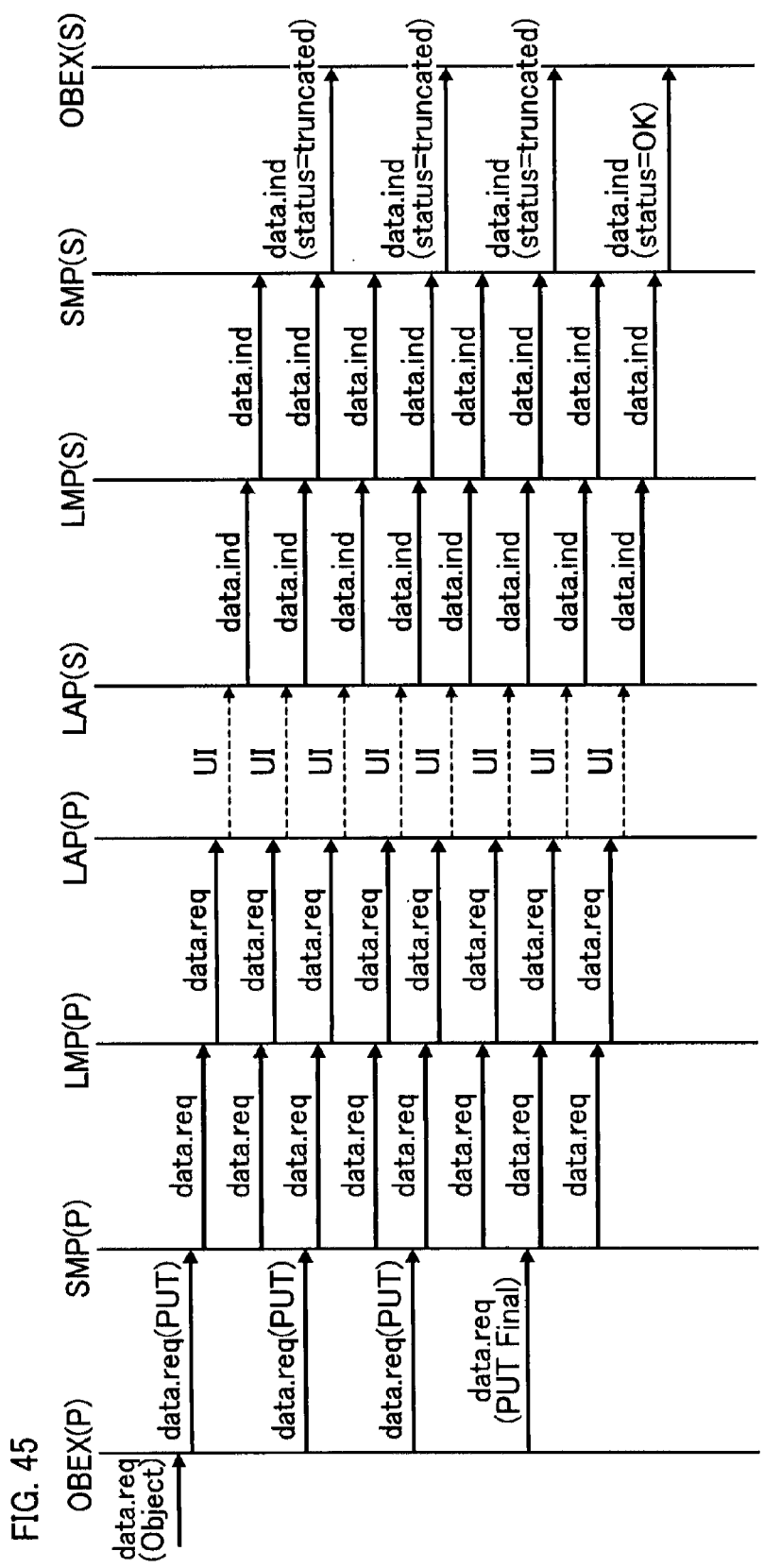
FIG. 45 is a sequence diagram illustrating flow of functions and packets among layers in the data exchange sequence according to the embodiment of the present invention.

FIG. 45 is a sequence diagram showing a data exchange sequence according to the present embodiment (no response is sent). FIG. 44 is an illustration of the structure of communication data used in the data exchange sequence according to the present embodiment (no response is sent).

As shown in FIG. 45, in the present embodiment (no response is sent), the transmitter generates a PUT command, and the PUT command is propagated through the lower layers, and is outputted as a UI frame.

Obtaining the data, the receiver propagates a notification from lower to upper layers. At this time, the SMP(S) notifies the upper layer OBEX(S) of continuity of data (status=truncated).

The transmitter puts an ON-flag in the final data, the flag indicating that this is the final data. Meanwhile, the receiver confirms the ON-flag of the SMP(S), and notifies the OBEX(S) that all data items have been received (status=OK), and then finishes data exchange sequence.

The following will separately describe the sequence in the transmitter and the sequence in the receiver.

In the transmitter, the OBEX(P) outputs a PUT command to the lower layers as a data transmission function. However, the OBEX(P) is capable of finishing a command without a response with respect to each command. Then, the OBEX(P) outputs the next command if transmission is allowed in the SMP(P).

In the receiver, the OBEX(S) receives the data notification function from the lower layer. However, the OBEX(S) does not send back a response for each command, only receiving data.

The following will describe a header, etc. of the data transmission functions and the data notification functions in the upper and lower layers. These data items are used for both the transmitter and the receiver.

In receiving the data transmission function from the OBEX, (a) if the predetermined size for transmission data in the LMP is smaller than the size of data in the data transmission function, the SMP divides the data into smaller items to allow the LMP to transmit the data. On the other hand, (b) if the predetermined size for transmission data in the LMP is larger than the size of data in the data transmission function, the SMP combines plural data items of the data transmission function to make data having a larger volume but being transmittable. The SMP also creates a SMP header constituted of, for example, a sequential number, an argument for asking the other device about data reception condition, an argument indicating the end of data, an argument indicating necessity of transmission of OBEX response to the SMP of the other device, and an argument indicating whether the received data was a complete set of data items. Further, the SMP header is added to the divided/combined data and is contained in the data transmission function. The data transmission function is transmitted to the LMP.

When the SMP receives the data notification function from the LMP, the SMP extracts the SMP header from the data in the function, and checks whether the sequential numbers are appropriate (i.e., the numbers are in sequence). If the numbers are in sequence, the SMP transmits the data notification function to the OBEX. At this time, the data notification function may be outputted for each data notification function coming from the lower layer, or for a predetermined set of those.

The SMP(P) of the transmitter modifies the data transmission function from OBEX(P), into a data transmission function suitable for the LMP(P). When the SMP(P) receives from the OBEX(P) a data transmission function in which the argument for asking the receiver about data reception condition is set to "false," the SMP(P) adds the SMP header to the data, and transmits the data to the LMP(P). On the other hand, when the SMP(P) of the receiver receives from the OBEX(P) a data transmission function in which the argument indicating the end of data is set to "true," the SMP(P) sets "true" for the argument indicating the end of data, or for the argument indicating necessity of transmission of OBEX(S) response in the transmission function to the LMP(P), and sends this new transmission function to the LMP(S).

Further, when the SMP(S) receives the data notification function from the lower layer, the SMP(S) analyzes the SMP header in the data in the data notification function, and checks the sequential number. If the SMP(S) confirms that the reception has been done normally, the SMP(S) transmits the data transmission function to the LMP(S).

On the other hand, when the SMP(S) found out that there was a problem in data reception in the receiver, the SMP(S) notifies the OBEX(S) of the error. For example, when the data items 0, 1, 2, 3, 5 are received, obviously the fifth number should be "4," but "4" is missing.

After that, the SMP(S) stands by for a function with a SMP header in which the argument indicating the end of data or the argument indicating necessity of transmission of OBEX(S) response to the receiver and is set to "true." The SMP(S) stops data notification to the OBEX(S) until it receives either the "true" data notification function (however no notification is sent to the OBEX(S)), receives a disconnection notification function, or does not carry out the data notification to the OBEX(S) until a certain time period has been elapsed.

When the LMP(P) of the transmitter receives a data transmission request function from the SMP(S), the LMP(P) adds the LMP header to the data of the function. The LMP(P) then transmits the data transmission request function containing the created data to the LAP(P).

When the LMP(S) of the receiver receives the data notification function from the LAP(S), the LMP(S) removes the LMP header from the data of the data notification function, and provides the data to the data notification function, and transmits the function to the SMP(S).

Note that when the connection is established by connecting the layers one by one, the LMP is not required. In this case, a connectionless value is used as the fixed value of LSAP in the LMP header.

When the LAP(P) of the transmitter receives the data transmission request function from the LMP(P), the LAP(P) adds a LAP header to the data of the data transmission request function, and incorporates this data into a UI frame, and transmits the UI frame to the physical layer.

Further, when the LAP(S) of the receiver receives the data reception notification from the physical layer, the LAP(S) removes the LAP header from the data of the UI frame and incorporates the resulting data into the data notification function, and transmits the function to the LMP(S). Note that, in the present embodiment, the LAP header contains a connection address and a UI indicator.

(3-3) Disconnection Sequence

[A] Response is Sent

Figure 46:
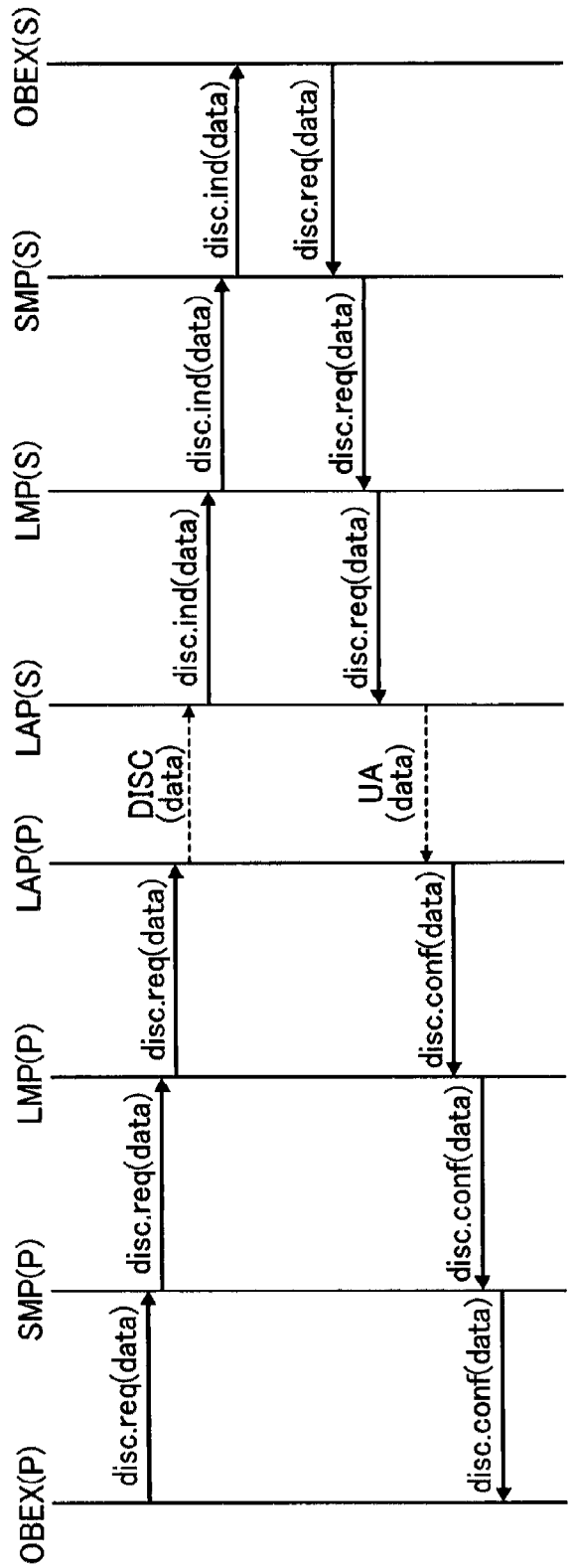
FIG. 46 is a sequence diagram illustrating flow of functions (commands, messages) and packets among layers in the disconnection sequence of the embodiment of the present invention.

FIG. 46 is a sequence diagram showing a disconnection sequence according to the present embodiment (response is sent). FIGS. 47(a), 47(b) are illustrations of the structure of communication data used in the disconnection sequence of the present embodiment (response is sent).

As shown in FIG. 46, in the present embodiment (response is sent), the disconnection command of the transmitter is propagated from upper to lower layers, and a DISC command is generated. Meanwhile, the receiver receives the DISC command, and passes on the command from lower to upper layers, and then passes on a response from upper to lower layers, and a UA response is generated. The notification of reception of the UA response is passed on from lower to upper layers of the transmitter, and the sequence is completed.

The following will separately describe the sequence in the transmitter and the sequence in the receiver.

First, the communication layers in the transmitter will be described.

When a disconnection request is transmitted from the application to the OBEX(P), the OBEX(P) immediately emits a disconnection request function (Primitive), which contains a disconnection request command, to the lower layer (SMP(P)). Further, when a disconnection confirmation function is transmitted from the SMP(P) to the OBEX(P), the OBEX(P) checks a response for OBEX disconnection which is contained in the data. When the response tells that the disconnection has been properly done ("Success"), the OBEX(P) finishes the disconnecting operation.

The SMP(P) receives the disconnection request function from the OBEX(P), and immediately adds parameter(s) required for communication with the SMP(S) of the receiver to the data, and emits the disconnection request function to the lower layer (LMP(P)). When a disconnection confirmation function is transmitted from LMP(P) to the SMP(P), the SMP(P) extracts parameter(s) generated by the SMP(S) of the receiver from the data of the function, and checks the value, and then finishes the disconnection process with the SMP(S). Further, the SMP(P) removes the parameter(s) of the SMP(S) from the data of the disconnection confirmation function, and transmits the resulting data to the OBEX(P) as the disconnection confirmation function. It however should be noted that there is normally no parameter to be added to the disconnection request function in the SMP(P).

The LMP(P) receives the disconnection request function from the SMP(P), and immediately adds parameter(s) required for communication with the LMP(S) of the receiver to the data of the disconnection request function from the SMP(P), and emits the disconnection request function to the lower layer (LAP(P)). When a disconnection confirmation function is transmitted from the LAP(P) to the LMP(P), the LMP(P) extracts parameter(s) generated by the LMP(S) of the receiver from the data of the function, and checks the value, and then finishes the disconnecting operation with the LMP(S). Further, the LMP(P) removes the parameter(s) of the LMP(S) from the data of the disconnection confirmation function, and transmits the resulting data to the SMP(P) as the disconnection confirmation function. It however should be noted that there is normally no parameter to be added to the disconnection request function in the LMP(P).

The LAP(P) receives the disconnection request function from the LMP(P), and immediately adds parameter(s) required for communication with the LAP(S) of the receiver to the data of the disconnection request function form the LMP(P), and emits the DISC command to the physical layer of the receiver. When the UA response is transmitted from the physical layer of the receiver to the LAP(P), the LAP(P) extracts parameter(s) generated by the LAP(S) of the receiver from the data of the UA response, and checks the value, and then disconnects from the LAP(S). Further, the LAP(P) removes the parameter(s) of LAP(S) from the data of the UA response, and transmits the resulting data to the LMP(P) as the disconnection confirmation function. It however should be noted that there is normally no parameter to be added to the disconnection request function in the LAP(P).

Next, the communication layers in the receiver will be described.

When a disconnection notification function (Indication) is transmitted from the lower layer (SMP(S)), the OBEX(S) checks a command for OBEX disconnection which is contained in the data. When the command indicates that the disconnection has been properly done, the OBEX(S) emits a response called "Success" as a disconnection response function to the SMP(S), and finishes the disconnecting operation.

When the disconnection notification function is transmitted from the lower layer (SMP(S)), the SMP(S) extracts parameter(s) generated by the SMP(P) of the transmitter from the data of the function, and creates parameter(s) for response, and emits the disconnection request function containing the data thus created by removing the parameter(s) of the SMP(P) from the data of the function, to the OBEX(S), and then stands by for a disconnection response function which comes from the OBEX(S). Further, when the disconnection response function is transmitted from the OBEX(S), the SMP(S) adds the parameter(s) of the response to the data of the disconnection response function of the OBEX(S), emits the disconnection response function to the LMP(S), and finishes the disconnection in the SMP layer. It however should be noted that there is normally no parameter to be added to the disconnection request function in the SMP(S).

When the disconnection notification function is transmitted from the lower layer (LAP(S)), the LMP(S) extracts parameter(s) generated by the LMP(P) of the transmitter from the data of the function, and creates parameter(s) for response, and emits the disconnection request function containing the data thus created by removing the parameter(s) of the LMP(P) from the data of the function, to the SMP(S), and then stands by for a disconnection response function which comes from the SMP(S). Further, when the disconnection response function is transmitted from the SMP(S), the LMP(S) adds the parameter(s) of the response to the data of the disconnection response function of the SMP(S), emits the disconnection response function to the LAP(S), and finishes the disconnection in the LMP layer. It however should be noted that there is normally no parameter to be added to the disconnection request function in the LMP(S).

When the DISC command is transmitted from the physical layer, the LAP(S) extracts parameter(s) generated by the LAP(P) of the transmitter from the data of the DISC command, and creates parameter(s) for response after transmitting the disconnection request function, containing the data thus created by removing the parameter(s) of LAP(P) from the data of the DISC command, to the LMP(S), and then stands by for a disconnection response function which comes from the LMP(S). Further, when the disconnection response function is transmitted from the LMP(S), the LAP(S) adds the parameter(s) of the response to the data of the disconnection response function of the LMP(S), emits the UA response to the physical layer, and finishes the disconnection process in the LAP layer. It however should be noted that there is normally no parameter to be added to the disconnection request function in the LAP(S).

[B] No Response is Sent

Figure 47:
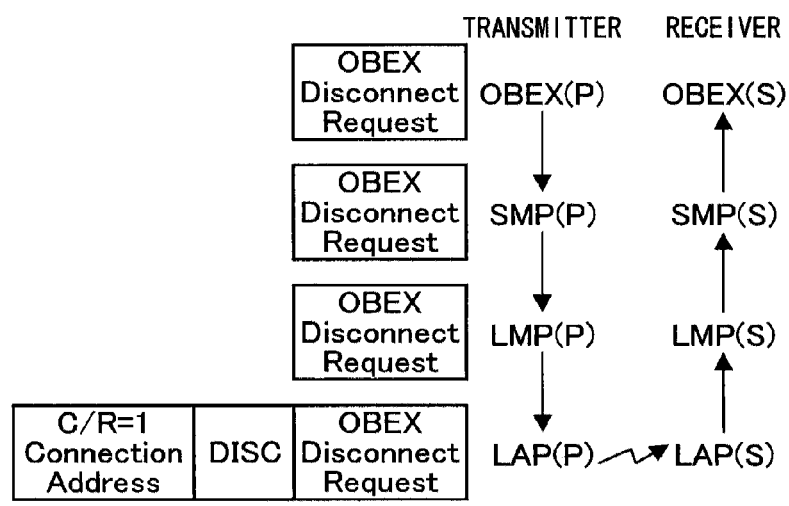
FIG. 47($a$) is an explanatory diagram illustrating change of data in the functions among the layers, which functions are indicated by right arrows in FIG. 46 and FIG. 48 and which functions are used in the disconnection sequence of the embodiment of the present invention.
Figure 47:
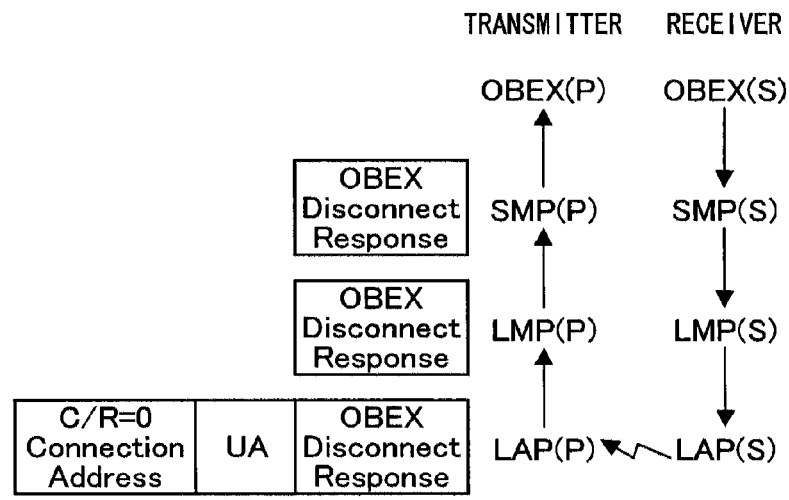
Figure 48:
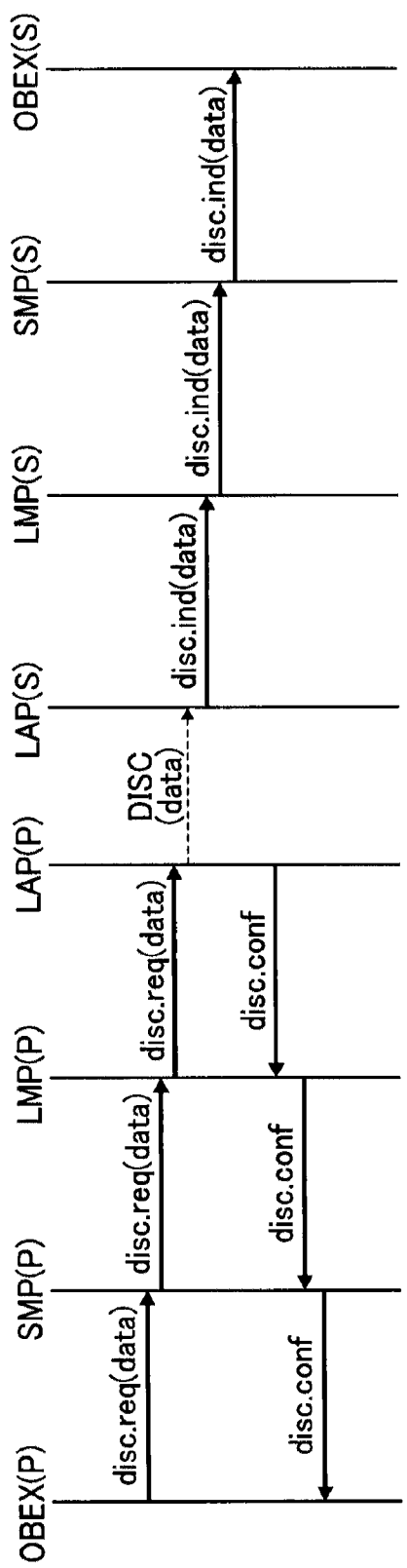
FIG. 48 is a sequence diagram illustrating flow of functions (commands, messages) and packets among layers in the disconnection sequence of the embodiment of the present invention.

FIG. 48 is a sequence diagram showing a disconnection sequence according to the present embodiment (no response is sent). FIG. 47(*a*) is an illustration of the structure of communication data used in the disconnection sequence of the present embodiment (no response is sent).

As shown in FIG. 48, in the present embodiment (no response is sent), the disconnection command of the transmitter is propagated from upper to lower layers, and a DISC command is generated. In the transmitter, the disconnection operation is completed at this point. Meanwhile, the receiver receives the DISC command, and passes on the DISC command from lower to upper layers. When the DISC command is passed onto the OBEX layer, the disconnection sequence is completed.

The following will describe the sequence in the transmitter and the sequence in the receiver.

First, the communication layers in the transmitter will be described.

When a disconnection request is transmitted from the application to the OBEX(P), the OBEX(P) immediately emits a disconnection request function (Primitive), which contains a disconnection request command, to the lower layer (SMP(P)). Further, when a disconnection confirmation function is transmitted from SMP(P) to the OBEX(P), the OBEX(P) finishes the disconnecting operation.

The SMP(P) receives the disconnection request function from the OBEX(P), and immediately adds parameter(s) required for communication with the SMP(S) of the receiver to the data of the disconnection request function from the OBEX(P), and emits the disconnection request function to the lower layer (LMP(P)). When a disconnection confirmation function is transmitted from the LMP(P) to the SMP(P), the SMP(P) regards the disconnection as being completed with the transmitted parameter(s) and finishes the disconnection in the SMP layer. Further, the SMP(P) transmits the disconnection confirmation function to the OBEX(P). It however should be noted that there is normally no parameter to be added to the disconnection request function in the SMP(P).

The LMP(P) receives the disconnection request function from the SMP(P), and immediately adds parameter(s) required for communication with the LMP(S) of the receiver to the data of the disconnection request function from the SMP(P), and emits the disconnection request function to the lower layer (LAP(P)). When a disconnection confirmation function is transmitted from the LAP(P) to the LMP(P), the LMP(P) regards the disconnection as being completed with the transmitted parameter(s) and finishes the disconnection in the LMP layer. Further, the LMP(P) transmits the disconnection confirmation function to the SMP(P). It however should be noted that there is normally no parameter to be added to the disconnection request function in the LMP(P).

The LAP(P) receives the disconnection request function from the LMP(P) and immediately adds parameter(s) required for communication with the LAP(S) of the receiver to the data of the disconnection request function from the LMP(P), and emits the DISC command to the physical layer of the receiver. When a DISC command is outputted, the LAP(P) regards the disconnection as being completed with the transmitted parameter(s) and finishes the disconnection process in the LAP layer. Further, the LAP(P) transmits the disconnection confirmation function to the LMP(P). It however should be noted that there is normally no parameter to be added to the disconnection request function in the LAP(P).

Next, the communication layers in the receiver will be described.

When a disconnection notification function (Indication) is transmitted from the lower layer (SMP(S)), the OBEX(S) checks a command for OBEX disconnection which is contained in the data. When the command indicates that the disconnection has been properly done, the OBEX(S) finishes the disconnecting operation.

When the disconnection notification function is transmitted from the lower layer (SMP(S)), the SMP(S) extracts parameter(s) generated by the SMP(P) of the transmitter from the data of the function, and completes the disconnection with the parameter(s). Further, the SMP(S) removes the SMP(P) parameter(s) from the data of the disconnection notification function, incorporates the resulting data into a disconnection request function, and sends it to the OBEX(S). It however should be noted that there is normally no parameter to be added to the disconnect request function in the SMP(S).

When the disconnection notification function is transmitted from the lower layer (LAP(S)), the LMP(S) extracts parameter(s) generated by the LMP(P) of the transmitter from the data of the function, and finishes the disconnection with the parameter(s). Further, the LMP(S) removes the parameter(s) of LMP(P) from the data of the function, incorporating the data into a disconnection request function, and sends it the SMP(S). It however should be noted that there is normally no parameter to be added to the disconnection request function in the LMP(S).

When the DISC command is transmitted from the physical layer, the LAP(S) extracts parameter(s) generated by the LAP(P) of the transmitter from the data of the DISC command, and completes disconnection with the parameter(s). Further, the LAP(S) removes the parameter(s) of LAP(P) from the data of the DISC command, and incorporates the resulting data to the disconnection request function and then emits the function to the LMP(S). It however should be noted that there is normally no parameter to be added to the disconnection request function in the LAP(S).

(4) Selection as to Whether or Not a Response is to Be Sent

With reference to FIGS. 49 to 56, the following will describe a flow of data and parameter(s) between the communication layers in the transmitter and the receiver.

In the present embodiment, the communication layers LAP, LMP, SMP, OBEX in the transmitter and the receiver each have a connection request function, a connection notification function, a connection response function, and a connection confirmation function. These functions are used for access to the LAP layer from the upper layer (i.e., LMP layer).

For the functions, Data (hereinafter, referred to simply as data), Requested-QoS, or Returned-QoS may be specify as arguments. As mentioned earlier, the data is set up in each communication layer.

Meanwhile, QoS notifies the upper layer, including OBEX, of the negotiation parameter(s), such as the baud rate determined in the LAP, and a result of negotiation. Note that conventional IrDA schemes also use QoS.

For example, when the application or the OBEX(P) of the transmitter emits a QoS having a parameter indicating that a response is required or is not required, it is propagated through the lower layers and reaches the LAP(P). Then, the LAP(P) uses the value of the QoS as the value of the negotiation parameter(s) (Ack Less Connect), and transmits the parameter(s) to the receiver.

Consequently, the communication layers of the transmitter and those of the receiver are operated depending on whether or not the application or the OBEX(P) of the transmitter requires a response, thereby enabling connection both in a two-way manner and in a one-way manner.

FIGS. 49 to 53 are illustrations of a flow of data and parameter(s) between the communication layers in the connection sequence (FIG. 40) according to the present embodiment (response is sent). Note that the QoS parameter(s) between OBEX-SMP, between SMP-LMP, between LMP-LAP may be identical or different. They are identified by the added symbols -a, -b, and -c in the figures.

Figure 49:
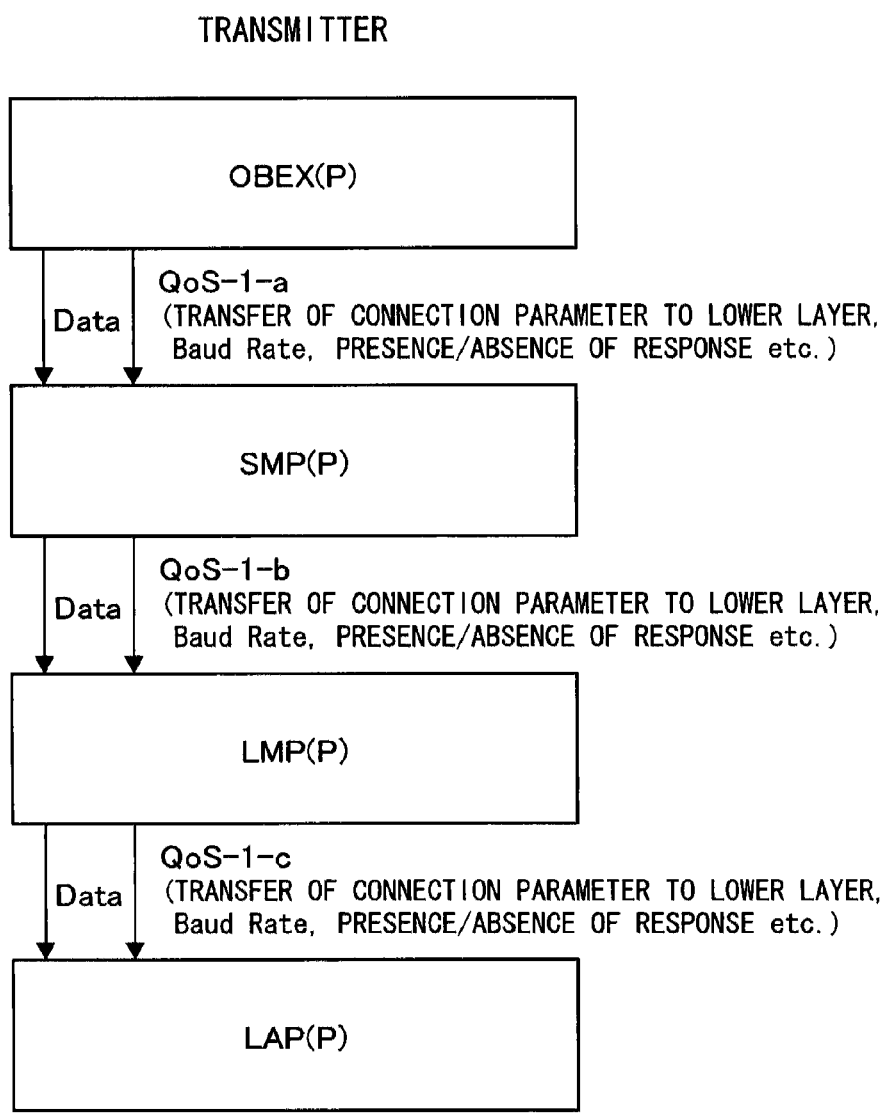
FIG. 49 is a diagram schematically illustrating transfer of (i) data of a connection request function and (ii) a connection parameter in a primary station, in the embodiment of the present invention.

In the transmitter, as shown in FIG. 49, the data to be transmitted to the receiver and the data of QoS-1 (QoS requested by the transmitter) are propagated through upper to lower layers by con.req(data) (FIG. 40).

Figure 50:
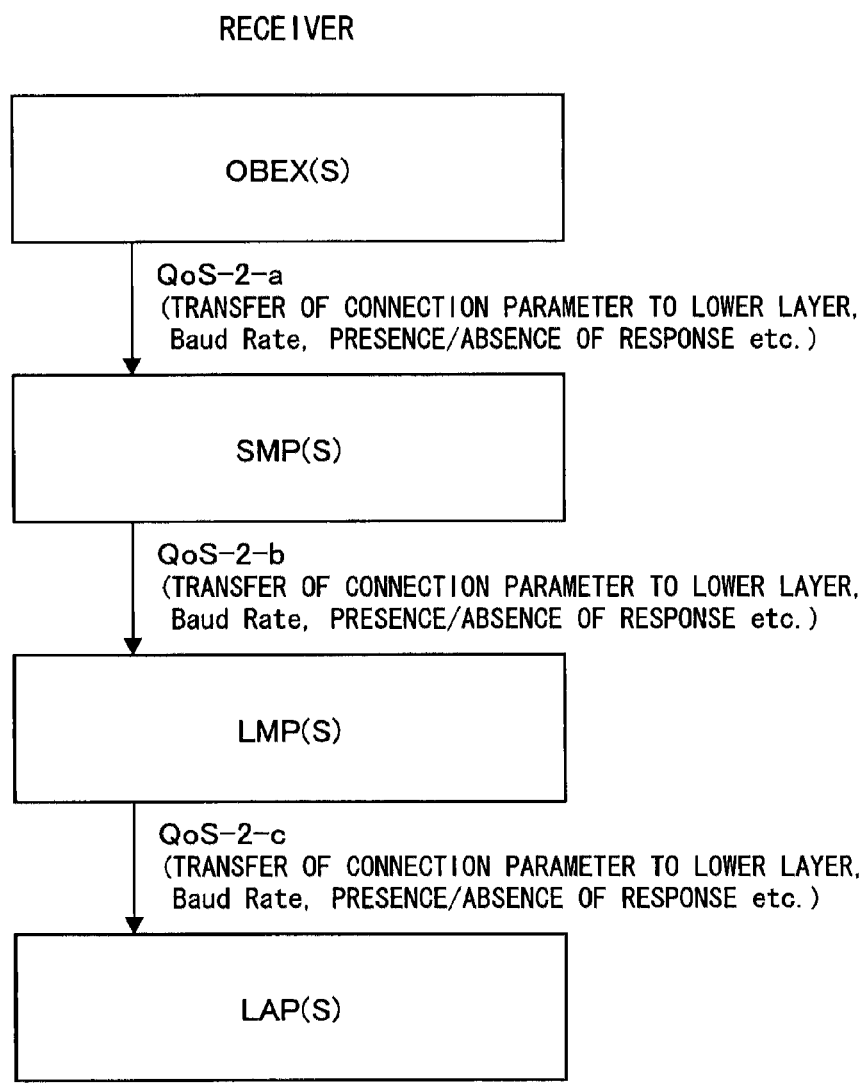
FIG. 50 is a diagram schematically illustrating transfer of (i) data of a connection request function and (ii) a connection parameter in a secondary station, in the embodiment of the present invention.

Meanwhile, in the receiver, as shown in FIG. 50, only the data of QoS-2 (QoS requested by the receiver) is propagated through upper to lower layers by the con.req.

Figure 51:
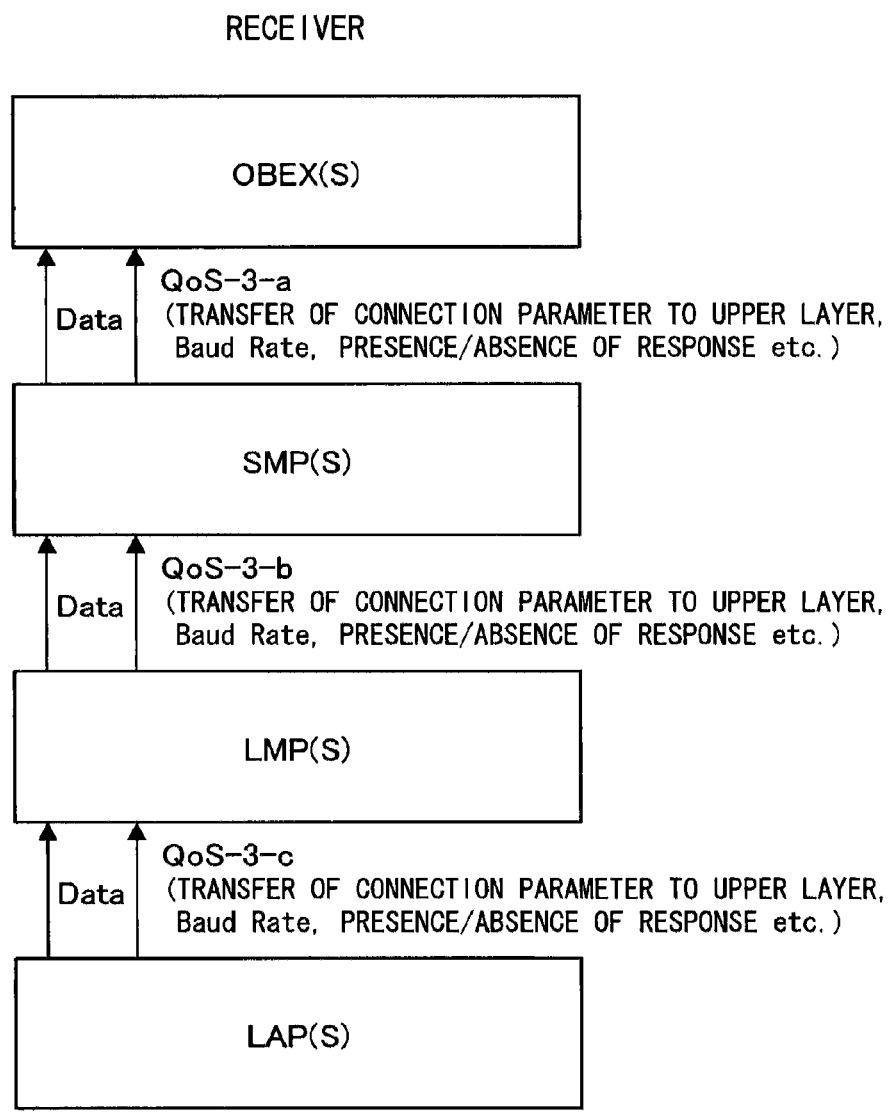
FIG. 51 is a diagram schematically illustrating how a connection confirmation function sent from the primary station, data of a connection notification function, and a connection parameter are transferred in the secondary station according to the embodiment of the present invention.

Thereafter, in the receiver, the QoS-1 of the transmitter and the QoS-2 of the receiver are compared at the time of receiving the SNRM command in the LAP(S), thereby creating common negotiation parameter(s) QoS-3. Then, as shown in FIG. 51, the LAP(S) passes on the QoS-3 and the data from the transmitter to the upper layers by con.ind(data). The upper layers each store the QoS-3 and hold it as connection parameter(s) to establish a connection.

Figure 52:
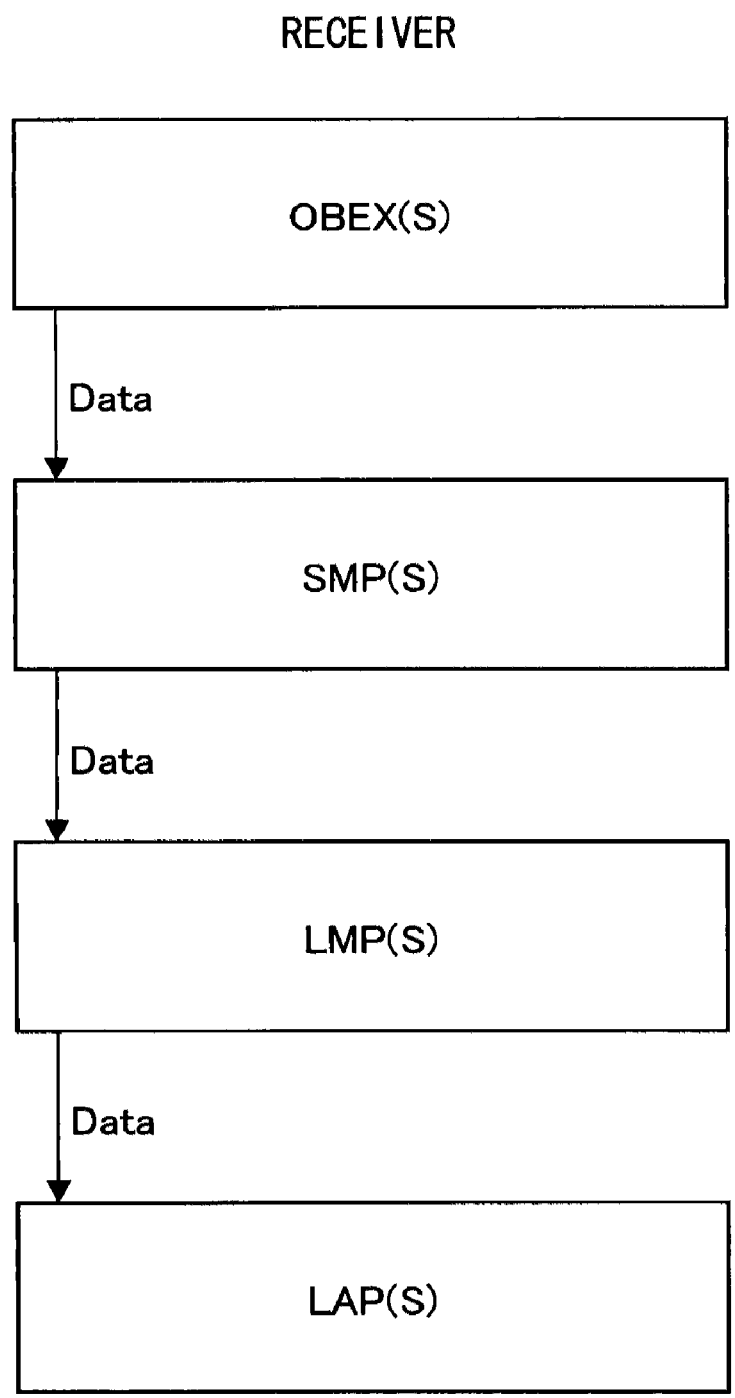
FIG. 52 is a diagram schematically illustrating transfer of data of a connection response function in the secondary station according to the embodiment of the present invention.

In the receiver, QoS is not required in propagation of con.resp(data). Therefore, as shown in FIG. 52, only data is propagated from upper to lower layers by the con.resp(data). Then, when the LAP(S) receives the con.resp(data), the QoS-3 is incorporated into the UA response, and the UA response is transmitted.

Figure 53:
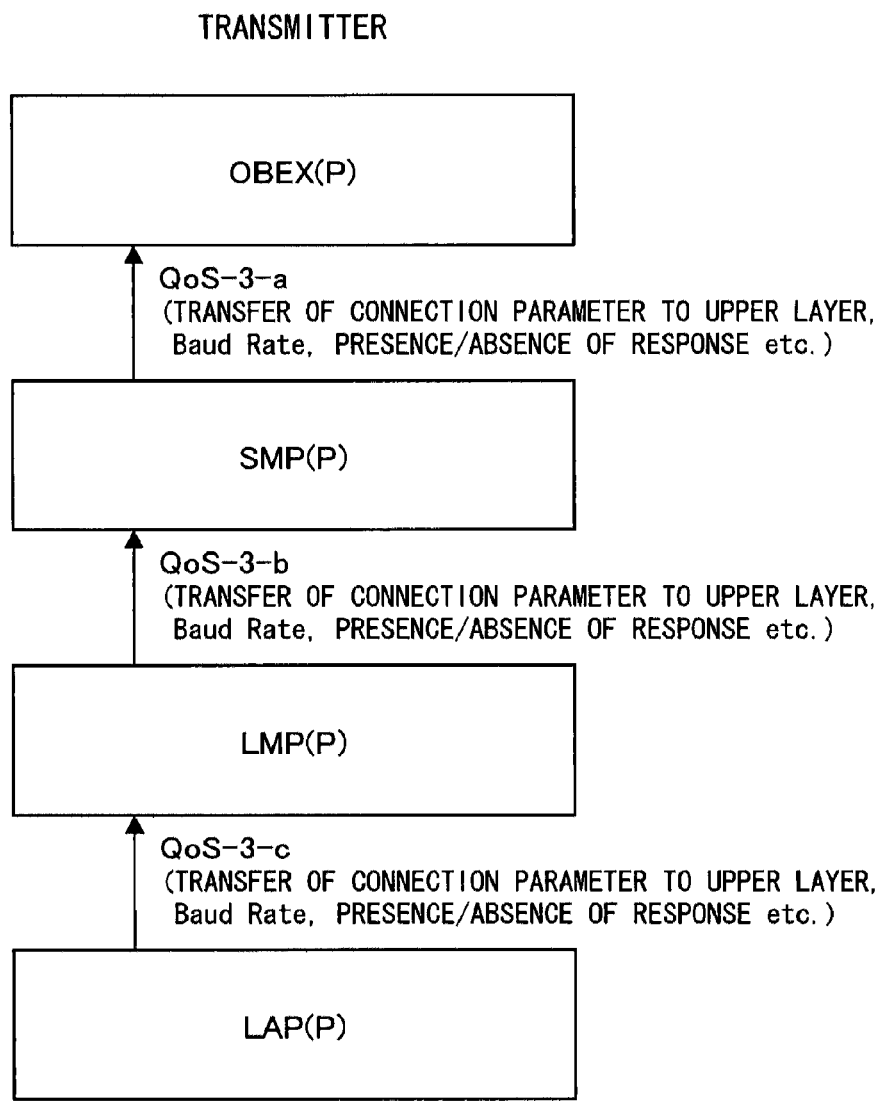
FIG. 53 is a diagram schematically illustrating transfer of a connection parameter of a connection confirmation function in the primary station, in the embodiment of the present invention.

In the transmitter, the LAP(P) receives the UA response and stores the QoS-3 as negotiation parameter(s). Then, as shown in FIG. 53, the LAP(P) passes on the QoS-3 and the data from the receiver to the upper layers by con.conf(data). The communication layers each store the QoS-3 and hold it as connection parameter(s) to establish a connection.

In the present embodiment, as a QoS of con.req, for example, "Requested-QoS: Baud-Rate+Max-Turn-Around-Time+Disconnect-Threshold+DataSize+Ack less connection+Min-Packet-Interval" is used. Further, as a QoS of Con.ind,con.conf, "Resultant-QoS: Baud-Rate+Disconnect-Threshold+DataSize+Ack less connection (indication primitive only)" is used.

The following will describe a flow of data and parameter(s) between the communication layers in the connection sequence (FIG. 42) according to the present embodiment (no response is sent).

In the transmitter, as shown in FIG. 49, the data to be transmitted to the receiver and the data of QoS-1 (QoS requested by the transmitter) are propagated through upper to lower layers by con.req(data) (FIG. 42).

Then, the LAP(P) of the transmitter stores the QoS-1 as QoS-3. Further, as shown in FIG. 53, the LAP(P) passes on the QoS-3 to the upper layers by con.conf. The communication layers each store the QoS-3 and hold it as connection parameter(s) for the established connection.

Meanwhile, in the receiver, only data of QoS-2 (QoS requested by the receiver) is propagated from upper to lower layers by the con.req, as shown in FIG. 50.

Thereafter, in the receiver, the QoS-1 of the transmitter is determined as QoS-3 at the time of receiving a SNRM command in the LAP(S). Note that when the combination of the parameter(s) of QoS-2 and the QoS-1 is not adequate, the SNRM command cannot be received.

Then, as shown in FIG. 51, the LAP(S) passes on the QoS-3 and the data from the transmitter, to the upper layers by con.ind(data). The upper layers each store the QoS-3 and hold it as connection parameter(s) to establish a connection.

In this manner, QoS-1 and QoS-2 are controlled by the application in the upper layer (application), thereby selecting whether or not a response is to be sent.

The selection as to whether or not a response is to be sent is carried out according to, e.g., a file type of the file to be transmitted, application, and a user selection.

Specifically, for example, consider a case where the selection is carried out according to a type of file. In the case of multimedia-related file, it is possible to select whether or not a response is to be sent. In the case of data that the user would like to confirm its reception such as a file of a telephone book, email, schedule, it is automatically selected that a response is to be sent. Further, consider a case where the selection is carried out according to application. In the case of a slide show, it is automatically selected that no response is to be sent, for example. Further, consider a case where the selection is carried out according to user selection. In this case, the user selects, from a displayed menu, whether or not a response is to be sent, for example.

Figure 54:
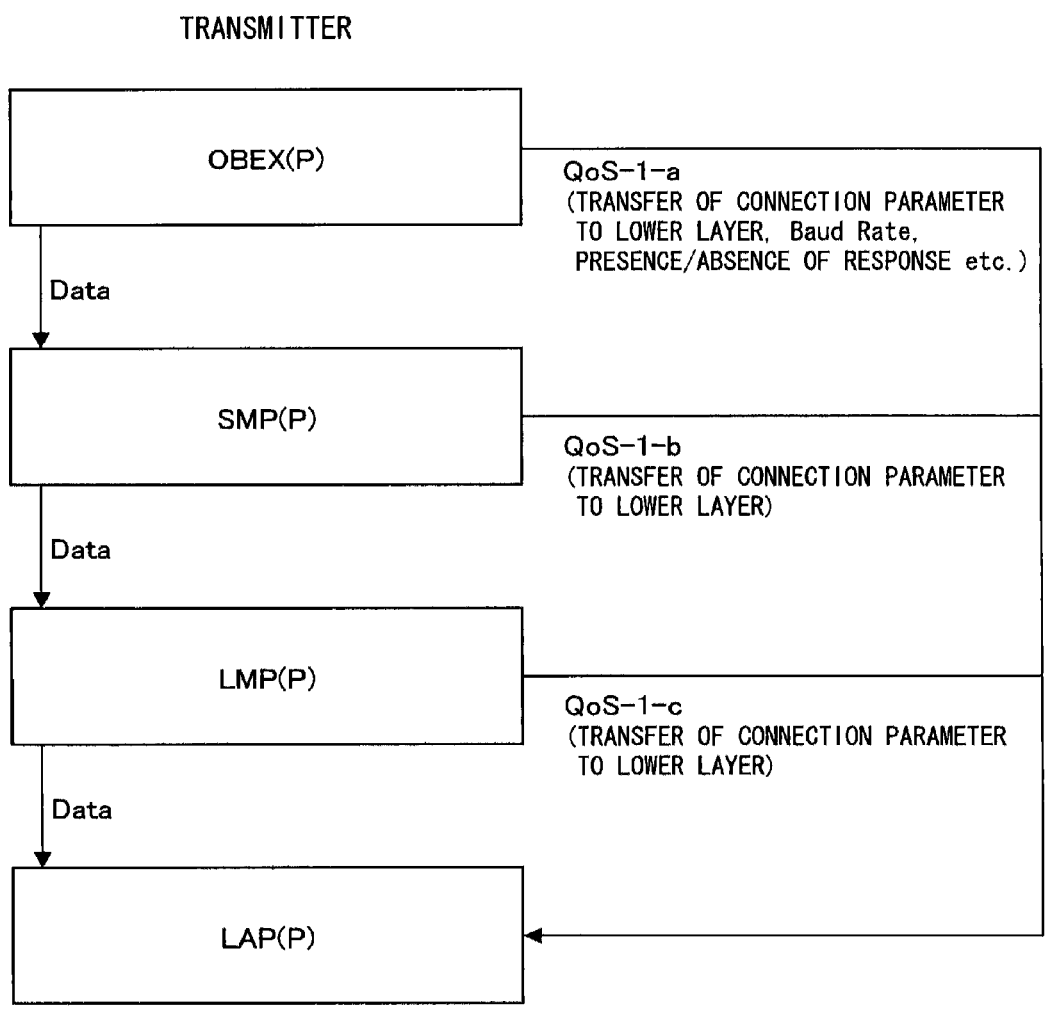
FIG. 54 is a diagram schematically illustrating a modified example of the embodiment, i.e., illustrating how data of a connection request function and a connection parameter are transferred in the primary station in cases where the connection parameter is shared by the layers.
Figure 55:
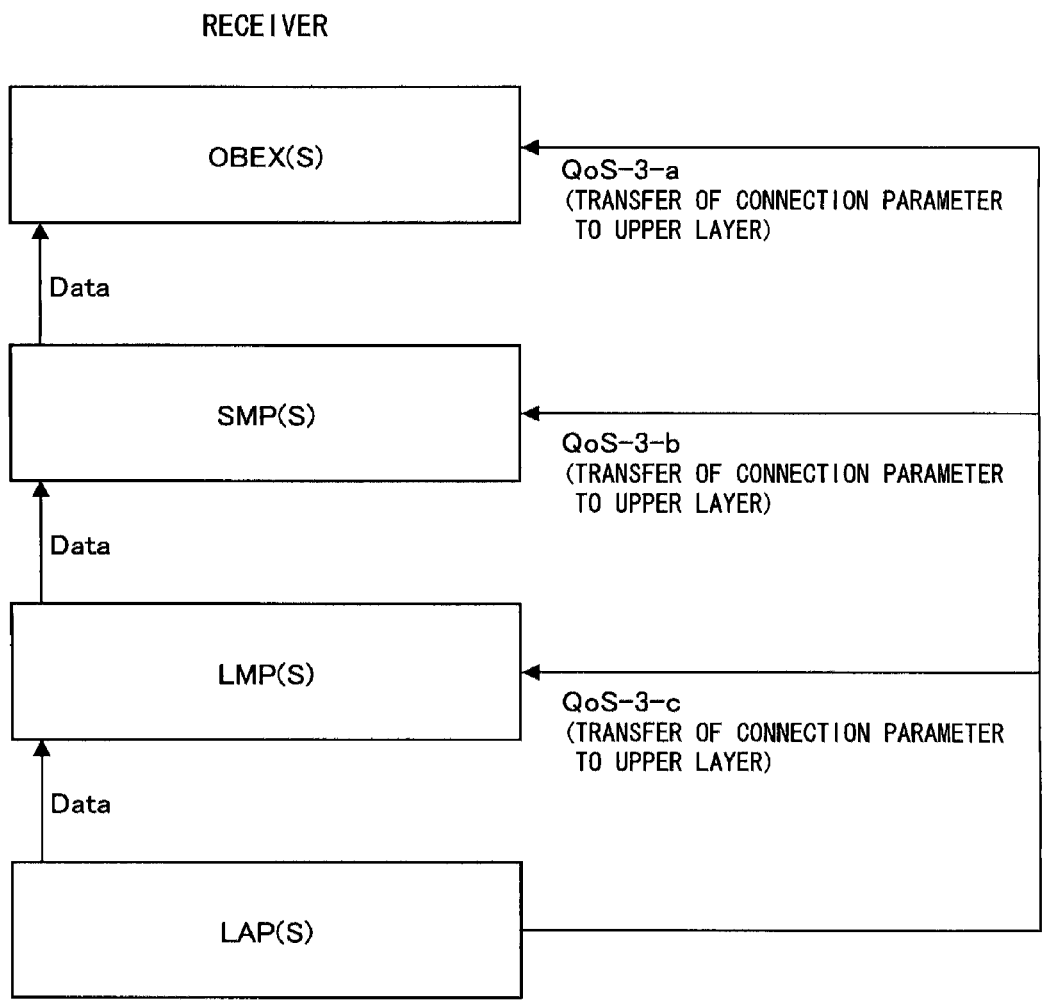
FIG. 55 is a diagram schematically illustrating a modified example of the embodiment, i.e., illustrating how data of a connection notification function and a connection parameter are transferred in the secondary station in cases where the connection parameter is shared by the layers.
Figure 56:
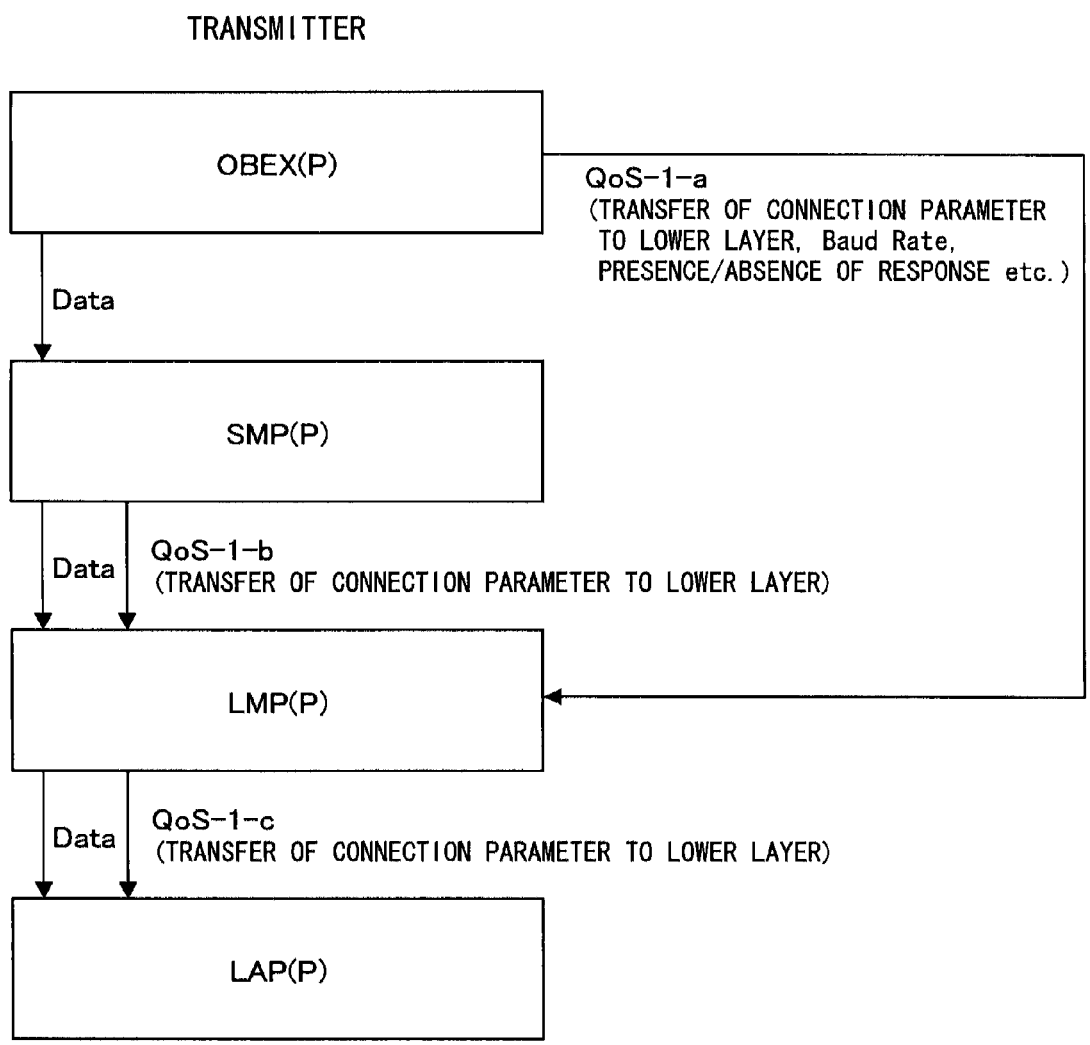
FIG. 56 is a diagram schematically illustrating a modified example of the embodiment, i.e., illustrating how data of a connection request function and a connection parameter are transferred in the primary station in cases where the layers separately send connection parameters to the lower layer.

FIGS. 54 through 56 are illustrations showing alternative flows of data and parameter(s) between the communication layers in a connection sequence according to the present embodiment.

In the transmitter, when the first SNRM command includes information of all the communication layers (FIG. 40), the data and parameter(s) may be directly transmitted to the LAP layer from each communication layer, instead of relaying those from one communication layer to the other (FIG. 49). This direct transmission to the LAP layer is shown in FIG. 54.

On the other hand, as shown in FIG. 55, the receiver may be arranged so that all of the data and the parameter(s) contained in the SNRM command are extracted, and are transmitted directly from the LAP layer to the respective corresponding communication layers.

Further, as shown in FIG. 56, the transmitter may be arranged so that the data and parameter(s) for the OBEX(P), the SMP(P), and the LMP(P) are unified in the LMP(P), and the parameter(s) of the LAP(P) is added to the unified data and parameter(s) in the LAP(P), thereby generating a SNRM command.

Each communication procedure (communication method, protocol) described in the above embodiments of the present invention may be realized by software. Each communication procedure may be a program executable by a computer. The present invention may be a computer-readable storage medium in which the program is stored. Examples of the storage medium include CDs, DVDs, memories, and hard discs.

In order to solve the foregoing problems, a wireless communication device serving as a transmitter/receiver of the present invention may be a wireless communication device which transmits a predetermined amount of transfer data using an infrared ray, including a transmission control section for transmitting an SNRM command to the other station without transmitting a station-search command (XID) to search the other station, the SNRM command including connection parameters such as maximum transferable speed and maximum receivable data length of the wireless communication device.

In order to solve the foregoing problems, another wireless communication device serving as a transmitter/receiver of the present invention may be a wireless communication device which receives a predetermined amount of transfer data using an infrared ray, including a reception control section for transmitting a UA response including connection parameters such as maximum transferable speed and maximum receivable data length of the wireless communication device, the UA response being transmitted when a first command from the transmitter is an SNRM command including parameters such as maximum transferable speed and maximum receivable data length of the transmitter.

The wireless communication device may be arranged so as to include a setting section for assigning a predetermined unused code (0xFFFFFFFF) to the other station's address (Destination Device Address) field of an SNRM command.

The wireless communication device may be arranged so that the device includes an identification section for identifying whether the unused code (0xFFFFFFFF) is assigned to the other station's address (Destination Device Address) field of the received SNRM command or not, and the reception control section immediately transmits the UA response only when the unused code (0xFFFFFFFF) is assigned to the other station's address (Destination Device Address) field.

The wireless communication device may be arranged so that an SNRM command includes an area in which upper layer user data is put, and the transmission control section transmits the upper layer user data as well as the connection parameters. In the wireless communication device, a user data identifier and a user data length may be positioned before the upper layer user data.

In the wireless communication device, the upper layer user data may include a CONNECT command in OBEX.

The wireless communication device may be arranged so that a UA response includes an area in which upper layer user data is put, and the reception control section transmits the upper layer user data as well as the connection parameters. In the wireless communication device, a user data identifier and a user data length may be positioned before the upper layer user data.

In the wireless communication device, the upper layer user data may include a SUCCESS response in OBEX.

In order to solve the foregoing problems, further another wireless communication device serving as a transmitter/receiver of the present invention may be a wireless communication device which transmits a predetermined amount of transfer data using an infrared ray to the receiver, a DISC command in particular including an area to which upper layer user data is put, and the wireless communication device including a transmission control section for transmitting user data from an upper layer. In the wireless communication device, a user data identifier and a user data length may be positioned before the upper layer user data.

In the wireless communication device, the user data from the upper layer may include a DISCONNECT in OBEX.

In order to solve the foregoing problems, further another wireless communication device serving as a transmitter/receiver of the present invention may be a wireless communication device which transmits a predetermined amount of transfer data using an infrared ray to the receiver, wherein when a UA response is received after an SNRM command is transmitted and the UA response does not include user data from an upper layer, the wireless communication device regards the connection as an error, and does not enter a data transfer mode. In the wireless communication device, the user data from the upper layer may be a SUCCESS response in OBEX.

In order to solve the foregoing problems, further another wireless communication device serving as a transmitter/receiver of the present invention may be a wireless communication device which transmits a predetermined amount of transfer data using an infrared ray to the receiver, including a transmission control section for, when receiving a DISC command, transmitting upper layer user data by providing a UA response with an area for including the upper layer user data. In the wireless communication device, the upper layer user data may include a SUCCESS response in OBEX. In the wireless communication device, a user data identifier and a user data length may be positioned before the upper layer user data.

In order to solve the foregoing problems, further another wireless communication device serving as a transmitter/receiver of the present invention may be a wireless communication device which transmits a predetermined amount of transfer data using an infrared ray to the receiver, wherein when a UA response is received after a DISC command is transmitted and the UA response does not include upper layer user data, the wireless communication device regards the connection as an error, and carries out a subsequent process accordingly. In the wireless communication device, the upper layer user data may be a SUCCESS response in OBEX.

In order to solve the foregoing problems, further another wireless communication device serving as a transmitter/receiver of the present invention may be a wireless communication device which transmits a predetermined amount of transfer data using an infrared ray to the receiver, including a transmission control section for, when receiving an SNRM command, transmits upper layer user data by providing a DM response with an area for including the upper layer user data. In the wireless communication device, the upper layer user data may include an Internal Server Error response in OBEX. In the wireless communication device, a user data identifier and a user data length may be positioned before the upper layer user data.

It is preferable to arrange the wireless communication device so that a connection or a disconnection of all layers (from lower layers to upper layers) is carried out by only one exchange of packets.

The wireless communication device may be arranged so that, when the transmission control section does not receive a UA response from the other station after a predetermined time has passed since transmission of the SNRM command, the transmission control section transmits an XID command.

The wireless communication device may be arranged so that, when the device receives an XID response to the XID command, the device transmits an XID-END command, and then transmits an SNRM command in IrDA, and enters a connection process in IrDA.

The wireless communication device may be arranged so that, when the device does not receive an XID response after a predetermined time has passed since transmission of the XID command, the device transmits an XID-END command, and after a predetermined time, the device transmits the SNRM command again.

The wireless communication device may be arranged so that, when the device receives an XID command as a first command, the device stores the reception of the XID command, and thereafter, when the device does not receive an SNRM command but receives again an XID command which is not an XID-END command, the device transmits an XID response in accordance with a rule defined by IrDA.

The wireless communication device may be arranged so that, when the device receives an XID command as a first command, the device stores reception of the XID command, and when the device receives an SNRM command without transmitting an XID response, the device transmits the UA response.

The wireless communication device may be arranged so that, when the device receives an XID command as a first command, the device confirms the number in a Discovery Flag area of the XID command, and thereafter, when the XID slot indicates one of 6, 8, and 16, the device transmits an XID response in accordance with a rule defined by IrDA.

The wireless communication device may be arranged so that an SNRM command in particular includes a flag indicating whether a communication direction is one-way or two-way, and the flag as well as the connection parameters are transmitted.

The wireless communication device may be arranged so that, after transmitting an SNRM command in which a flag indicative of a communication direction indicates one-way, the device starts data transmission without waiting for a response from a reception station.

The wireless communication device may be arranged so that, when the device receives an SNRM command in which a flag indicative of a communication direction is added and the flag indicates one-way, the device enters a mode for receiving a data packet, without transmitting a UA response.

The mobile phone including a transmission/reception function of the present invention may carry out a connection process and a disconnection process by positioning the upper layer data in an SNRM command or in a UA response. Further, the mobile phone may be arranged so that a flag for indicating a one-way communication or two-way communication is provided in an SNRM command, the SNRM command is transmitted or received, and in a case of one-way communication, the transmitter may transfer data without waiting for a response after transmitting an SNRM, and the receiver may receive data without transmitting a response.

The display device including a transmission/reception function of the present invention may carry out a connection process and a disconnection process by positioning the upper layer data in an SNRM command or in a UA response. Further, the mobile phone may be arranged so that a flag for indicating a one-way communication or two-way communication is provided in an SNRM command, the SNRM command is transmitted or received, and in a case of one-way communication, the transmitter may transfer data without waiting for a response after transmitting an SNRM, and the receiver may receive data without transmitting a response.

The printing device including a transmission/reception function of the present invention may carry out a connection process and a disconnection process by positioning the upper layer data in an SNRM command or in a UA response. Further, the mobile phone may be arranged so that a flag for indicating a one-way communication or two-way communication is provided in an SNRM command, the SNRM command is transmitted or received, and in a case of one-way communication, the transmitter may transfer data without waiting for a response after transmitting an SNRM, and the receiver may receive data without transmitting a response.

The recording device including a transmission/reception function of the present invention may carry out a connection process and a disconnection process by positioning the upper layer data in an SNRM command or in a UA response. Further, the mobile phone may be arranged so that a flag for indicating a one-way communication or two-way communication is provided in an SNRM command, the SNRM command is transmitted or received, and in a case of one-way communication, the transmitter may transfer data without waiting for a response after transmitting an SNRM, and the receiver may receive data without transmitting a response.

Each block of the transmitters (communication device) 1 and 3 and of the receiver (communication device) 2, particularly LAP layers 100A to 100D, may be constituted of a hardware logic, or may be realized by software by using a CPU, as detailed below.

Specifically, the transmitters 1 and 3 and the receiver 2 include, for example, a CPU (Central Processing Unit) for carrying out commands of a control program for realizing each function, a ROM (Read Only Memory) for storing the program; a RAM (Random Access Memory) for developing the program; and a storage device (storage medium) such as a memory for storing the program and the various data. Further, when the functions of the transmitters 1 and 3 and the receiver 2 are realized by software, the program code (execute form program, intermediate code program, source program) of the control program (communication program) is stored in a program medium readable by a computer, which medium is mounted to the transmitters 1 and 3 and the receiver 2. In this way, the objective of the present invention may also be achieved by causing the computer (or CPU, MPU) to read out the program code from the storage medium, and carry out the program code to activate the functions.

The storage medium may be tape based, such as a magnetic tape or cassette tape; disc based, such as a magnetic disc like a Floppy Disc®, hard disc or an optical disc such as CD/MO/MD/DVD/CD-R; card based, such as an IC card (including a memory card), an optical card; or a semiconductor memory, such as a mask ROM, EPROM, EEPROM, and a flash ROM.

Further, the transmitters 1 and 3 and the receiver 2 may be constituted to be connectable to a communication network, so as to allow provision of the program code via a communication network. The communication network is not particularly limited, and it may be: the Internet, Intranet, Extranet, LAN, ISDN, VAN, CATV communication network, virtual private network, telecommunication network, mobile body communication network, satellite communication network etc. Further, a transmission medium for constituting the communication network is not particularly limited, and it may be wired based, such as IEEE1394, USB, power-line carrier, cable TV line, telephone line, ADSL line, or radio based, such as infrared medium such as IrDA, remote control, Bluetooth®, 802.11 radio, HDR, mobile phone network, satellite communication line, ground wave digital network. Note that, the present invention can be realized by a series of computer data signals which represent the aforesaid program code, and which are electrically transmitted, and which are embedded in a carrier wave.

As described above, the communication device of the present invention is a communication device, serving as a primary station which carries out communication with a secondary station, including a first protocol control section for transmitting a first connection request command without transmitting a station-search command to confirm a presence of the secondary station, so that a communication connection between the communication device and the secondary section is established.

Further, the communication device of the present invention is a communication device, serving as a secondary station which carries out communication with a primary station, including a first protocol control section for, when receiving a first connection request command from the primary station without receiving a station-search command with which the primary station confirms a presence of the secondary station, transmitting a connection response to the first connection request command, so that a connection is established.

Further, the communication method of the present invention is a communication method of a communication device serving as a primary station which carries out communication with a secondary station, including the step of transmitting a first connection request command without transmitting a station-search command to confirm a presence of the secondary station, so that a communication connection between the communication device and the secondary station is established.

Further, the communication method of the present invention is a communication method of a communication device serving as a secondary station which carries out communication with a primary station, including the step of transmitting a connection response to a first connection request command from the primary station so that a connection is established, when the communication device receives the first connection request command without receiving a station-search command with which the primary station confirms a presence of the secondary station.

Further, the communication system of the present invention is a communication system, including a communication device serving as the primary station and a communication device serving as the secondary station.

With the arrangements and the methods, when the primary station establishes a communication connection with the secondary station, the primary station transmits a connection request command (e.g. SNRM in IrSimple) without transmitting a station-search command (e.g. XID in IrDA) with which the primary station confirms the presence of the secondary station. On the other hand, when the secondary station receives the connection request command (corresponding to SNRM) from the primary station without receiving the station-search command (corresponding to XID) with which the primary station confirms the presence of the secondary station, the secondary station transmits a connection response (e.g. UA in IrSimple) to the connection request command.

With the above connection sequence, it is unnecessary to carry out a communication for searching a station. Consequently, a connection sequence is made simpler, which has an effect of reducing a time necessary for commutation connection.

Further, the communication device of the present invention further includes: a second protocol control section for transmitting a station-search command to confirm a presence of the secondary station and then transmitting a second connection request command, so that a communication connection between the communication device and the secondary section is established; and a protocol switching section for causing the second protocol control section to transmit the station-search command when the first protocol control section transmits the first connection request command and then does not receive a connection response to the first connection request command from the secondary station within a predetermined time.

Further, the communication device of the present invention further includes: a second protocol control section for transmitting a station-search response to the station-search commands from the primary station, and then transmitting a connection response to a second connection request command, so that a connection is established; and a protocol switching section for causing the second protocol control section to transmit the station-search response, when the communication device receives two or more of the station-search commands in which whole slot numbers are set to 1, or receives one of the station-search commands in which whole slot numbers are set to a number other than 1, without receiving the first connection request command from the primary station.

With the arrangements, in the primary station, when the first protocol control section (e.g. IrSimple) transmits a first connection request command (e.g. SNRM in IrSimple) and then does not receive a connection response (e.g. UA in IrSimple) to the first connection request command from the secondary station within a predetermined time, the protocol switching section switches to the second protocol control section (e.g. IrDA) and causes the second protocol control section to transmit a station-search command (e.g. XID in IrDA). On the other hand, when the secondary station receives two or more of the station-search commands (e.g. XID in IrDA) in which whole slot numbers are set to 1, or receives one of the station-search commands (e.g. XID in IrDA) in which whole slot numbers are set to a number other than 1, without receiving the first connection request command (corresponding to SNRM in IrSimple) from the primary station, the protocol switching section switches to the second protocol control section (e.g. IrDA) and causes the second protocol control section to transmit a station-search response (e.g. XID in IrDA).

The first protocol allows establishment of connection only by exchanging a connection request command and a connection response without exchanging a station-search command and a station-search response. On the other hand, the second protocol allows establishment of connection by exchanging a connection request command and a connection response after exchanging a station-search command and a station-search response.

With the above connection sequence, if a connection by the first protocol results in failure, then it is possible to try connection by the second protocol. Consequently, regardless of whether the primary station and the secondary station support the first protocol or the second protocol (the primary station and the secondary station may support both of the protocols), it is possible to establish a connection only by exchanging a connection request command—a connection response and a station-search command—a station-search response. That is, it is possible to establish a connection by selecting a protocol which can be established between the primary station and the secondary station, without clearly specifying a protocol used in the connection.

Therefore, when both the primary station and the secondary station support the first protocol, the first protocol allows establishing a connection between the primary station and the secondary station in a short time. When otherwise, the second protocol allows establishing a connection between the stations.

Further, the communication device of the present invention is arranged so that, when the second protocol control section transmits the station-search command and then does not receive a station-search response to the station-search command from the secondary station within a predetermined time, the protocol switching section causes the first protocol control section to transmit the first connection request command.

Further, the communication device of the present invention is arranged so that, when the protocol switching section receives one of the station-search commands in which whole slot numbers are set to 1 and then receives the first connection request command, the protocol switching section causes the first protocol control section to transmit the connection response to the first connection request command.

With the arrangements, in the primary station, when the second protocol control section (e.g. IrDA) transmits the station-search command (e.g. XID in IrDA) and then does not receive a station-search response (e.g. XID in IrDA) to the station-search command from the secondary station within a predetermined time, the protocol switching section switches to the first protocol control section (e.g. IrSimple) and causes the first protocol control section to transmit the first connection request command (e.g. SNRM in IrSimple). On the other hand, in the secondary station, when the protocol switching section receives one of the station-search commands (e.g. XID in IrDA) in which whole slot numbers are set to 1 and then receives the first connection request command (e.g. SNRM in IrSimple), the protocol switching section causes the first protocol control section (corresponding to IrSimple) to transmit the connection response (corresponding to UA in IrSimple) to the first connection request command.

With the above connection sequence, if a connection by the second protocol results in failure, then it is possible to try connection by the first protocol. Consequently, regardless of whether the primary station and the secondary station support the first protocol or the second protocol (the primary station and the secondary station may support both of the protocols), it is possible to establish a connection only by exchanging a connection request command—a connection response and a station-search command—a station-search response. That is, it is possible to establish a connection by selecting a protocol which can be established between the primary station and the secondary station, without clearly specifying a protocol used in the connection.

Therefore, when both the primary station and the secondary station support the first protocol, the first protocol allows establishing a connection between the primary station and the secondary station in a short time. When otherwise, the second protocol allows establishing a connection between the stations.

Further, the communication device of the present invention is arranged so that the first protocol control section assigns information indicative of any secondary station to a field of the first connection request command which field specifies a secondary station.

Further, the communication device of the present invention is arranged so that the first protocol control section transmits the connection response only when information indicative of any secondary station is assigned to a field of the first connection request command which field specifies a secondary station.

With the arrangements, the primary station assigns information indicative of any secondary station to a field of the first connection request command which field specifies a secondary station. For example, when the first connection request command is SNRM in IrSimple, 0xFFFFFFFF is assigned to Destination Device Address. In IrDA, 0xFFFFFFFF of Destination Device Address is unused code. On the other hand, the secondary station transmits the connection response only when information indicative of any secondary station is assigned to a field of the first connection request command which field specifies a secondary station.

Consequently, the secondary station can judge whether a received command is the first connection request command or the second connection request command according to whether an identifier (address) of a specific secondary station is assigned to a field of the connection request command which field specifies a secondary station or information indicative of any secondary station is assigned to the field.

Therefore, it is unnecessary to provide a new field so as to indicate whether a connection request command is in compliance with the first protocol or the second protocol. Consequently, it is possible to provide a common format both for the format of the first connection request command of the first protocol and for the second connection request command of the second protocol.

Further, the communication device of the present invention is arranged so that the first protocol control section transmits the first connection request command in which information indicative of one-way is assigned to a field for specifying a communication direction, and after a predetermined time, the first protocol control section starts data transfer.

Further, the communication device of the present invention is a communication device, serving as a secondary station which carries out communication with a primary station, including a first protocol control section for establishing connection and entering a data transferable mode without transmitting a connection response to a first connection request command from the primary station, when the communication device receives the first connection request command without receiving a station-search command with which the primary station confirms a presence of the secondary station and information indicative of one-way is assigned to a field of the first connection request command which field specifies a communication direction.

With the arrangements, in the primary station, the first protocol control section (e.g. IrSimple) transmits the first connection request command (e.g. SNRM in IrSimple) in which information indicative of one-way is assigned to a field for specifying a communication direction, and after a predetermined time, the first protocol control section starts data transmission. On the other hand, when the secondary station receives the first connection request command from the primary station and information indicative of one-way is assigned to a field of the first connection request command which field specifies a communication direction, the secondary station enters a data transferable mode without transmitting a connection response to the first connection request command from the primary station.

This allows one-way communication from the primary station to the secondary station in which communication the secondary station does not transmit response to the primary station.

Note that, the communication device may be realized by a computer. At that time, the present invention includes: a communication program which causes a computer to function as each section of the communication device and thus realizes the communication device by the computer; and a computer-readable storage medium in which the communication program is stored.

Further, the communication device may be realized by a communication circuit which functions as each section of the communication device.

Further, the communication device is preferably applicable to a mobile phone which carries out communication using the communication device.

Further, the communication device is preferably applicable to a display device which carries out display based on data received by the communication device.

Further, the communication device is preferably applicable to a printing device which carries out printing based on data received by the communication device.

Further, the communication device is preferably applicable to a recording device which records data received by the communication device.

Lastly, the communication device of the present invention may be constituted as follows.
(1. Transmission of SNRM from Primary Station)

The communication method [1] of the present invention may be a communication method for transmitting/receiving a predetermined amount of transfer data using an infrared ray, including the step of, in a disconnection state, transmitting an SNRM command serving as a connection request packet without transmitting an XID command serving as a station-search packet to confirm a presence of the other station, so that a connection with the other station is established.

(2. Transmission of SNRM and Transmission of XID from Primary Station)

The communication method [2] of the present invention may be a communication method for transmitting/receiving a predetermined amount of transfer data using an infrared ray, including the steps of, in a disconnection state, transmitting an SNRM command serving as a connection request packet and thereafter, transmitting an XID command serving as a station-search packet when it is judged that there is no response within a predetermined time, so that searching of a station is carried out.

(3. Destination Device Address in SNRM is Global Address)

The communication method of the present invention may be the communication method [1] or [2], wherein 0xFFFFFFFF (global address) is assigned to a Destination Device Address field in the SNRM command.

(4. Upper Layer Data is Put in SNRM)

The communication method [4] of the present invention may be the communication method [1] or [2], wherein connection request data of an upper layer in particular is put in the SNRM command to be transmitted.

(5. CONNECT in OBEX is Put in Upper Layer Data in SNRM)

The communication method of the present invention may be the communication method [4], wherein at least a CONNECT command in an OBEX layer is included in connection request data of the upper layer.

(6. IrDA Connection when Receiving XID Response to XID Command after Transmission of SNRM)

The communication method of the present invention may be the communication method [2], further comprising the steps of, when an XID response is sent back for the XID command, transmitting an XID-End and then entering a connection sequence in existing IrDA, and when a response is not sent back for the XID command within a predetermined time, transmitting XID-End and then transmitting the SNRM command, so that a connection is established.

(7. Upper Layer Data of SNRM is in PI, PL, and PV Formats)

The communication method of the present invention may be the communication method [4], wherein, before the connection request data of the upper layer, a predetermined identifier in accordance with a format of an identifier which is a connection parameter in existing IrDA and the length of the connection request data are positioned.

(8. Connection is Established when Receiving UA for SNRM)

The communication method [8] of the present invention may be the communication method [1] or [2], further including the step of establishing a connection and starting data transmission, when receiving a UA response within a predetermined time after transmitting the SNRM command.

(9. Connection is Established Only when UA Includes Upper Layer Data)

The communication method [9] of the present invention may be the communication method [8], wherein the connection is established and data transmission is started, only when the UA response includes upper layer data.

(10. Connection is Established Only when Upper Layer Data of UA Includes SUCCESS in OBEX)

The communication method of the present invention may be the communication method [9], wherein the upper layer data includes a SUCCESS response in an OBEX layer.

(11. Flag Indicative of One-Way or Two-Way Communication is Positioned in SNRM)

The communication method [11] of the present invention may be the communication method [1] or [2], wherein the SNRM command in particular includes a field in which a communication direction control flag indicative of one-way communication or two-way communication is positioned, and when the communication direction control flag indicates one-way communication, data transmission is started after a predetermined time has passed.

(12. Communication Direction Control Flag is in PI, PL, and PV Formats)

The communication method of the present invention may be the communication method [11], wherein, before the field in which the communication direction control flag is positioned, a predetermined identifier in accordance with a format of an identifier which is a connection parameter in existing IrDA and the length of the field are positioned.

(13. Receiving End Transmits UA Response after Receiving SNRM Instead of XID Command)

The communication method [13] of the present invention may be a communication method for transmitting/receiving a predetermined amount of transfer data using an infrared ray, including the step of, in a disconnection state, transmitting a UA response which is a connection response packet, when receiving an SNRM command which is a connection request packet without receiving an XID command which is a station-search packet.

(14. Receiving End does not Respond to First XID Command with Slot Number 1)

The communication method [14] of the present invention may be a communication method for transmitting/receiving a predetermined amount of transfer data using an infrared ray, including the step of, in a disconnection state, receiving XID commands which are station-search packets, and not transmitting an XID response to a first XID command out of the XID commands when the XID command includes a Discovery Flag field indicating that whole slot numbers are 1.

(15. Receiving End Transmits XID Response when Receiving Two or More XID Commands with Slot Number 1)

The communication method of the present invention may be the communication method [14], further including the step of, upon reception of two or more XID commands whose whole slot numbers are 1 and without reception of an SNRM command, transmitting an XID response and then receiving an XID-End from the other station, so that a station-search process in existing IrDA is finished.

(16. IrDa Connection by Transmitting XID Response after Receiving XID Command without Slot Number 1)

The communication method of the present invention may be the communication method [14], further including the step of, upon reception of an XID command whose whole slot numbers are not 1, transmitting an XID response and then receiving an XID-End command from the other station, so that a station-search process in existing IrDA is finished.

(17. Receiving End Transmits UA when Receiving SNRM After Receiving One XID)

The communication method [17] of the present invention may be the communication method [14], further including the step of, upon reception of an SNRM command after reception of one XID command with whole slot number 1, transmitting a UA response, so that a connection is established.

(18)

The communication method of the present invention may be the communication method [13] or [17], wherein the UA response is transmitted and a connection is established only when 0xFFFFFFFF is assigned to a Destination Device Address field of the SNRM command.

(19)

The communication method [19] of the present invention may be the communication method [13] or [17], wherein connection response data of an upper layer is positioned in the UA response to be transmitted.

(20)

The communication method of the present invention may be the communication method [19], wherein the connection response data of the upper layer includes at least a SUCCESS response in an OBEX layer.

(21)

The communication method of the present invention may be the communication method [19], wherein, before the connection response data of the upper layer, a predetermined identifier in accordance with a format of an identifier which is a connection parameter in existing IrDA and the length of the connection response data are positioned.

(22)

The communication method [22] of the present invention may be the communication method [13] or [17], wherein the UA response is transmitted only when the SNRM command includes upper layer data.

(23)

The communication method of the present invention is the communication method [22], wherein the upper layer data is a CONNECT command in the OBEX layer.

(24. Transmission of DM for First SNRM)

The communication method [24] of the present invention may be a communication method for transmitting/receiving a predetermined amount of transfer data using an infrared ray, including the step of, in a disconnection state, transmitting a DM response indicative of refusal of a connection when a first received packet is an SNRM command, so that a disconnection is carried out.

(25. Transmission of DM for SNRM after Receiving XID with 1 Slot)

The communication method [25] of the present invention may be the communication method [14], further including the step of, in a disconnection state, upon reception of an SNRM command after reception of one XID command whose whole slot numbers are 1, transmitting a DM response indicative of refusal of a connection, so that a disconnection is carried out.

(26. Upper Layer Data is Positioned in Connection Refusal DM)

The communication method [26] of the present invention may be the communication method [24] or [25], wherein connection refusal data of an upper layer is positioned in the DM response to be transmitted.

(27. Upper Layer Data in Connection Refusal DM is Internal Server Error)

The communication method of the present invention may be the communication method [26], wherein the connection refusal data of the upper layer includes at least an Internal Server Error response in an OBEX layer.

(28. Upper Layer Data in Connection Refusal DM is in PI, PL, and PV Formats)

The communication method of the present invention may be the communication method [26], wherein, before the connection refusal data of the upper layer, a predetermined identifier in accordance with a format of an identifier which is a connection parameter in existing IrDA and the length of the connection refusal data are positioned.

(29. UA is not Sent Back when Communication Direction Control Flag in SNRM Indicates One-Way Communication)

The communication method [29] of the present invention may be a communication method for transmitting/receiving a predetermined amount of transfer data using an infrared ray, including the step of, in a disconnection state, upon reception of an SNRM command which is a connection request packet, entering a data transferable state without transmitting a UA response, when the SNRM command includes the communication direction control flag indicative of one-way communication or two-way communication in a predetermined format and the flag indicates one-way communication.

(30. Data Transferable State is Entered Only when SNRM Includes Communication Direction Control Flag Indicative of One-Way and Includes Upper Layer Data)

The communication method of the present invention may be the communication method [29], wherein the data transferable state is entered only when the SNRM command includes upper layer data.

(31. Data Transferable State is Entered Only when SNRM includes Communication Direction Control Flag Indicative of One-Way and Includes Upper Layer Data (Connect in OBEX))

The present communication method of the present invention may be the communication method [29], wherein the upper layer data includes at least a CONNECT command in an OBEX layer.

(32. Upper Layer Data is Positioned in Disc)

The communication method [32] of the present invention may be a communication method for transmitting/receiving a predetermined amount of transfer data using an infrared ray, including the step of, in a connection state, positioning disconnection request data of an upper layer in a DISC command which is a disconnection request, and transmitting the disconnection request data.

(33. DISCONNECT in OBEX is Positioned in Upper Layer Data in DISC)

The communication method of the present invention may be the communication method [32], wherein the disconnection request data of the upper layer includes at least a DISCONNECT command in an OBEX layer.

(34. Upper layer data in DISC is in PI, PL, and PV Formats)

The communication method of the present invention is the communication method [32], wherein, before the disconnection request data of the upper layer, a predetermined identifier in accordance with a format of an identifier which is a connection parameter in existing IrDA and the length of the disconnection request data are positioned.

(35. Upper Layer Data is Positioned in UA when UA is Transmitted for DISC)

The communication method [35] of the present invention is a communication method for transmitting/receiving a predetermined amount of transfer data using an infrared ray, including the step of, in a connection state, upon transmission of a UA response to a received DISC command, positioning disconnection request data of an upper layer in the UA response.

(36)

The communication method of the present invention may be the communication method [35], wherein the upper layer data includes at least a SUCCESS response in an OBEX layer.

(37)

The communication method of the present invention may be the communication method [35], wherein, before the disconnection request data of the upper layer, a predetermined identifier in accordance with a format of an identifier which is a connection parameter in existing IrDA and the length of the disconnection request data are positioned.

(38. Upper Layer Data is Positioned in DM when DM is Transmitted after Establishment of Connection)

The communication method [38] of the present invention may be a communication method for transmitting/receiving a predetermined amount of transfer data using an infrared ray, including the step of, in a connection state, upon transmission of a DM response to a disconnection request from an upper layer, positioning disconnection request data of the upper layer in the DM response.

(39. Internal Server Error in OBEX is Positioned in DM when DM is Transmitted after Establishment of Connection)

The communication method of the present invention is the communication method [38], wherein the upper layer data includes at least an Internal Server Error response in an OBEX layer.

(40)

The communication method of the present invention may be the communication method [38], wherein, before the disconnection request data of the upper layer, a predetermined identifier in accordance with a format of an identifier which is a connection parameter in existing IrDA and the length of the disconnection request data are positioned.

(41. Transmission Circuit, Reception Circuit, Transmission and Reception Circuit)

The transmission circuit, reception circuit, transmission and reception circuit of the present invention can realize any one of the communication methods.

(42. Mobile Phone)

The mobile phone of the present invention can realize any one of the communication methods.

(43. Display Device)

The display device of the present invention can realize any one of the communication methods.

(44. Printing Device)

The printing device of the present invention can realize any one of the communication methods.

(45. Recording Device)

The recording device of the present invention can realize any one of the communication methods.

Further, the communication method of the present invention may be a communication method for transmitting a predetermined amount of transfer data using an infrared ray, including the step of transmitting an SNRM command to the other station without transmitting a station-search command (XID) for searching the other station, the SNRM command including connection parameters such as maximum transferable speed and maximum receivable data length of a transmitter.

Further, the communication method of the present invention may be a communication method for receiving a predetermined amount of transfer data using an infrared ray, including the step of transmitting a UA response including parameters such as maximum transferable speed and maximum receivable data length of a receiver, when a first command from a transmitter is an SNRM command including parameters such as maximum transferable speed and maximum receivable speed of the transmitter.

Further, the communication method of the present invention may be arranged so that 0xFFFFFFFF is assigned to a Destination Device Address field in an SNRM command.

Further, the communication method of the present invention may be arranged so that the UA response is immediately transmitted only when 0xFFFFFFFF is assigned to the Destination Device Address field in the received SNRM command.

Further, the communication method of the present invention may be arranged so that an SNRM command includes an area in which upper layer user data is put, and the upper layer user data as well as the connection parameters are transmitted.

Further, the communication method of the present invention may be arranged so that the upper layer user data includes a CONNECT command in OBEX.

Further, the communication method of the present invention may be arranged so that a UA response includes an area in which upper layer user data is put, and the upper layer user data as well as the connection parameters are transmitted.

Further, the communication method of the present invention may be arranged so that the upper layer user data includes a SUCCESS response in OBEX.

Further, the communication method of the present invention is a communication method for transmitting a predetermined amount of transfer data using an infrared ray to the receiver, including the step of transmitting upper layer user data by providing a DISC command with an area to which the upper layer user data is put.

Further, the communication method of the present invention may be arranged so that the upper layer user data includes a DISCONNECT command in OBEX.

Further, the communication method of the present invention may be arranged so that a connection or a disconnection of all layers (from lower layers to upper layers) is carried out by only one exchange of packets.

Further, the communication method may be a communication method including the step of transmitting an XID command, when a UA response from the other station is not received after a predetermined time has passed since transmission of the SNRM command.

Further, the communication method of the present invention may be a method including the steps of, upon reception of an XID response to the XID command, transmitting an XID-END command and thereafter transmitting an SNRM command in IrDA, so that a connection process in IrDA is entered.

Further, the communication method of the present invention may be a communication method including the steps of: transmitting the XID command; transmitting an XID-END command when an XID response is not received from the other station after a predetermined time has passed since transmission of the XID command; and transmitting the SNRM command again after a predetermined time has passed.

Further, the communication method may be a communication method including the steps of: when an XID command is received as a first command, storing reception of the XID command and thereafter; when an SNRM command is not received but an XID command which is not an XID-END command is received again, transmitting an XID response in accordance with a rule defined by IrDA.

Further, the communication method of the present invention may be a communication method, including the steps of: when an XID command is received as a first command, storing reception of the XID command and thereafter; when an SNRM command is received without a receiver's transmission of an XID response, transmitting the UA response.

Further, the communication method of the present invention may be a communication method, including the steps of: when an XID command is received as a first command, checking a value in a Discovery Flag area in the XID command and thereafter; when the XID slot indicates 6, 8, or 16, transmitting an XID response in accordance with a rule defined by IrDA.

Further, the communication method of the present invention may be arranged so that a flag indicative of one-way communication or two-way communication is added to an SNRM command and the flag as well as the connection parameters are transmitted.

Further, the communication method of the present invention may be a communication method, including the steps of: transmitting an SNRM command in which a flag indicates one-way communication and thereafter; starting data transmission without waiting for a response from a receiving end.

Further, the communication method of the present invention may be arranged so that, when receiving an SNRM command to which a flag indicative of a communication direction is added and the communication direction is set to be one-way communication, a data packet receivable state is entered without transmitting a UA response.

Further, the transmission and reception circuit of the present invention includes circuit elements allowing the communication methods.

Further, the transmitter and receiver of the present invention include circuit configurations allowing the communication methods.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

INDUSTRIAL APPLICABILITY

Since the present invention allows reduction of a connection time, the present invention is widely applicable to communication devices. Particularly, the present invention is preferably applicable to communication devices having optical communication function, e.g. portable wireless communication devices used for notebook computers, PDAs, mobile phones, and digital cameras etc.

The invention claimed is:

1. A communication device, serving as a primary station which carries out communication with a secondary station, comprising:
   a first protocol control section for, without transmitting a station-search command to confirm a presence of the secondary station so as to establish a communication connection between the communication device and the secondary station, transmitting a first connection request command including upper layer data, so that a communication connection between the communication device and the secondary station is established;
   a second protocol control section for transmitting a station-search command to confirm a presence of the secondary station and then transmitting a second connection request command, so that a communication connection between the communication device and the secondary section is established; and
   a protocol switching section for causing the second protocol control section to transmit the station-search command so as to establish a communication connection with a communication device which does not support a first protocol but supports a second protocol, when the first protocol control section transmits the first connection request command and then does not receive a connection response to the first connection request command from the secondary station within a predetermined time.

2. The communication device as set forth in claim 1, wherein, when the second protocol control section transmits the station-search command and then does not receive a station-search response to the station-search command from the secondary station within a predetermined time, the protocol switching section causes the first protocol control section to transmit the first connection request command.

3. A communication device, serving as a secondary station which carries out communication with a primary station, comprising:
   a first protocol control section for, without transmitting a station-search response to a station-search command, transmitted from the primary station to confirm a presence of the secondary station, so that a connection is established, when receiving a first connection request command from the primary station, transmitting a connection response to the first connection request command, so that a connection is established;
   a second protocol control section for transmitting a station-search response to a station-search command from the primary station, and then transmitting a connection response to a second connection request command, so that a connection is established; and
   a protocol switching section for causing the second protocol control section to transmit the station-search response, when the communication device receives two or more of the station-search commands in which whole slot numbers are set to 1, or receives one of the station-search commands in which whole slot numbers are set to a number other than 1, without receiving the first connection request command from the primary station.

4. The communication device as set forth in claim 3, wherein when the communication device receives one of the station-search commands in which whole slot numbers are set to 1 and then receives the first connection request command, the protocol switching section causes the first protocol control section to transmit the connection response to the first connection request command.

5. A communication method of a communication device serving as a primary station which carries out communication with a secondary station, comprising the steps of:
   without transmitting a station-search command to confirm a presence of the secondary station so as to establish a communication connection between the communication device and the secondary station, transmitting a first connection request command including upper layer data in accordance with a first protocol defining that the first connection request command is to be transmitted so as to establish a communication connection with the secondary station, and thereafter;
   when the communication device does not receive a connection response to the first connection request command within a predetermined time, transmitting a station-search command to confirm a presence of the secondary station so as to establish a communication connection with a communication device which does not support a first protocol but supports a second protocol, in accordance with a second protocol defining that the station-search command is to be transmitted and then a second connection request command is to be transmitted so as to establish a communication connection with the secondary station.

6. A communication method of a communication device serving as a secondary station which carries out communication with a primary station, comprising the step of:

when the communication device does not receive a first connection request command from the primary station not in accordance with a first protocol defining that (i) no connection is established on a basis of a station-search response to a station-search command transmitted from the primary station to confirm a presence of the secondary station and that (ii) a connection response is to be transmitted in response to the first connection request command so as to establish a communication connection with the primary station, and when the communication device receives two or more station-search commands in which whole slot numbers are set to 1 or receives a station-search command in which whole slot numbers are set to a number other than 1, transmitting a station-search response in accordance with a second protocol defining that the station-search response is to be transmitted to the station-search command from the primary station and then a connection response is to be transmitted in response to a second connection request command, so as to establish a communication connection with the primary station.

7. A communication system, comprising the communication device as set forth in claim 1 and a communication device serving as the secondary station which carries out communication with the primary station, the communication device serving as the secondary station comprising:

a third protocol control section for, when receiving a first connection request command from the primary station, transmitting a connection response to the first connection request command, so that a connection is established;

a fourth protocol control section for transmitting a station-search response to a station-search command from the primary station, and then transmitting a connection response to a second connection request command, so that a connection is established; and a second protocol switching section for causing the second protocol control section to transmit the station-search response, when the communication device serving as the secondary station receives two or more of the station-search commands in which whole slot numbers are set to 1, or receives one of the station-search commands in which whole slot numbers are set to a number other than 1, without receiving the first connection request command from the primary station.

8. A communication system, comprising the communication device as set forth in claim 1 and a communication device serving as the secondary station which gets connected with the primary station using an SNRM frame, the SNRM frame being a transmission/reception frame used in IrLAP (Infrared Link Access Protocol) and having a control field set to an SNRM (Set Normal Response Mode), when receiving the SNRM frame in which information indicative of any secondary station is assigned to a destination address field, said communication device serving as the secondary station transmitting a UA (Unnumbered Acknowledgement) frame to carry out a connection response.

9. A communication system, comprising a communication device serving as a primary station and a communication device serving as a secondary station which carries out communication with the primary station, said communication device serving as the primary station gets connected with the secondary station using an SNRM frame, the SNRM frame being a transmission/reception frame used in IrLAP (Infrared Link Access Protocol) and having a control field set to an SNRM (Set Normal Response Mode), said communication device serving as the primary station transmitting the SNRM frame in which information indicative of any secondary station is assigned to a destination address field which is a component of a frame obtained by adding to the SNRM frame used in IrLAP a field to which upper layer data is to be written, so as to establish a connection with the secondary stations;

said communication device serving as the secondary station comprising:

a first protocol control section for, when receiving a first connection request command from the primary station, transmitting a connection response to the first connection request command, so that a connection is established;

a second protocol control section for transmitting a station-search response to a station-search command from the primary station, and then transmitting a connection response to a second connection request command, so that a connection is established; and a protocol switching section for causing the second protocol control section to transmit the station-search response, when the communication device serving as the secondary station receives two or more of the station-search commands in which whole slot numbers are set to 1, or receives one of the station-search commands in which whole slot numbers are set to a number other than 1, without receiving the first connection request command from the primary station.

10. A communication circuit for causing a communication device as set forth in claim 1 or 3 to operate, said communication circuit functioning as each section of the communication device.

11. A mobile phone, comprising a communication device as set forth in claim 1 or 3, said mobile phone carrying out communication using the communication device.

12. A display device, comprising a communication device as set forth in claim 1 or 3, said display device carrying out display based on data received by the communication device.

13. A printing device, comprising a communication device as set forth in claim 1 or 3, said printing device carrying out printing based on data received by the communication device.

14. A recording device, comprising a communication device as set forth in claim 1 or 3, said recording device recording data received by the communication device.

* * * * *